(12) United States Patent
Thuo et al.

(10) Patent No.: US 11,752,666 B2
(45) Date of Patent: Sep. 12, 2023

(54) COATED IRREGULAR SURFACES

(71) Applicant: Iowa State University Research Foundation, Inc., Ames, IA (US)

(72) Inventors: Martin Thuo, Ames, IA (US); Thomas Ward, III, Des Moines, IA (US); Andrew Martin, Ames, IA (US); Julia Jinling Chang, Ames, IA (US); Chuanshen Du, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 17/463,248

(22) Filed: Aug. 31, 2021

(65) Prior Publication Data
US 2022/0063144 A1 Mar. 3, 2022

Related U.S. Application Data

(60) Provisional application No. 63/072,495, filed on Aug. 31, 2020.

(51) Int. Cl.
*B29C 33/38* (2006.01)
*C22C 28/00* (2006.01)
*B29K 83/00* (2006.01)

(52) U.S. Cl.
CPC .......... *B29C 33/3842* (2013.01); *C22C 28/00* (2013.01); *B29K 2083/00* (2013.01); *B29K 2905/00* (2013.01)

(58) Field of Classification Search
CPC . B29C 33/3842; C22C 28/00; B29K 2083/00; B29K 2905/00
See application file for complete search history.

(56) References Cited

U.S. PATENT DOCUMENTS

| 2017/0014958 A1* | 1/2017 | Thou | C22C 28/00 |
| 2018/0257322 A1* | 9/2018 | Thuo | C08J 3/12 |
| 2018/0354037 A1* | 12/2018 | Thuo | B29C 64/135 |

OTHER PUBLICATIONS

Martin, Andrew, et al. "Heat-Free Fabrication of Metallic Interconnects for Flexible/Wearable Devices." Advanced Functional Materials 29.40 (2019): 1903687. (Year: 2019).*
Yi, Liting, et al. "Liquid-solid phase transition alloy as reversible and rapid molding bone cement." Biomaterials 35.37 (2014): 9789-9801. (Year: 2014).*
Gitlin, Leonid, Philipp Schulze, and Detlev Beider. "Rapid replication of master structures by double casting with PDMS." Lab on a Chip 9.20 (2009): 3000-3002. (Year: 2009).*
Çinar, Simge, et al. "Mechanical fracturing of core-shell undercooled metal particles for heat-free soldering." Scientific reports 6.1 (2016): 1-12. (Year: 2016).*

(Continued)

*Primary Examiner* — Leith S Shafi
(74) *Attorney, Agent, or Firm* — Schwegman Lundberg & Woessner, P.A.

(57) ABSTRACT

Coated irregular surfaces, replicas made therefrom, and methods of making the same. A particle-coated substrate includes a coating including undercooled liquid metallic particles. The particles include a solid shell comprising a metal oxide, and a liquid metallic core that is below the melting point of the liquid metallic core. The particle-coated substrate also includes a substrate including an irregular surface, wherein the coating is on the irregular surface.

18 Claims, 32 Drawing Sheets
(9 of 32 Drawing Sheet(s) Filed in Color)

(56) References Cited

OTHER PUBLICATIONS

Chang, Boyce S., et al. "Rapid prototyping of reconfigurable microfluidic channels in undercooled metal particle-elastomer composites." Industrial & Engineering Chemistry Research 58.10 (2019): 4137-4142. (Year: 2019).*

Sun, Xuyang, et al. "Liquid metal enabled injectable biomedical technologies and applications." Applied Materials Today 20 (2020): 100722. Available online on Jun. 19, 2020. (Year: 2020).*

Cademartiri, Ludovico, et al., "Electrical Resistance of $Ag^{TS}$-$S(CH_2)_{n-1}CH_3$//$Ga_2O_3$/EGaIn Tunneling Junctions", *The Journal of Physical Chemistry C*, 116, (2012), 10848-10860.

Cutinho, Joel, et al., "Autonomous Thermal-Oxidative Composition Inversion and Texture Tuning of Liquid Metal Surfaces", *ACS Nano*, 12, (2018), 4744-4753.

Farrell, Zachary J., et al., "Control of Gallium Oxide Growth on Liquid Metal Eutectic Gallium/Indium Nanoparticles via Thiolation", *Langmuir*, 34, (2018), 234-240.

Martin, Andrew, et al., "Heat-Free Fabrication of Metallic Interconnects for Flexible/Wearable Devices", *Adv. Funct. Mater.*, 29(40), 1903687, (2019), 9 pgs.

Sodhi, Rana N. S., et al., "Surface and buried interface layer studies on challenging structures as studied by ARXPS", *Surf. Interface Anal.*, 49, (2017), 1309-1315.

\* cited by examiner

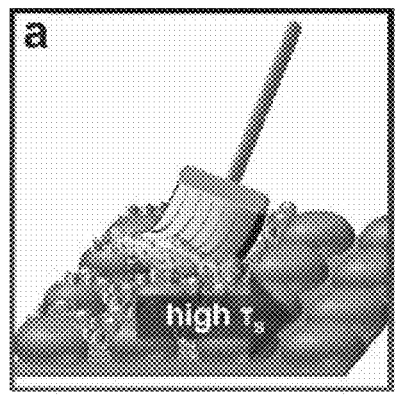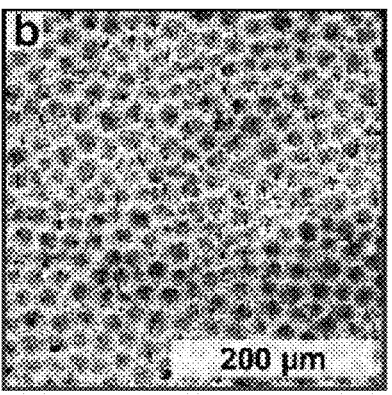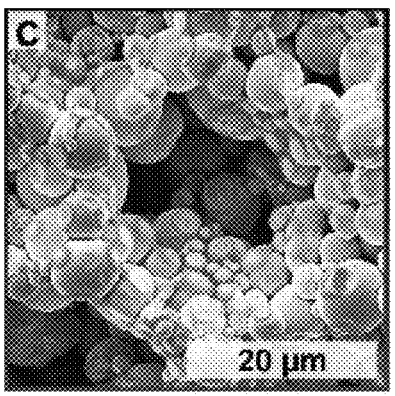
FIG. 3A  FIG. 3B  FIG. 3C
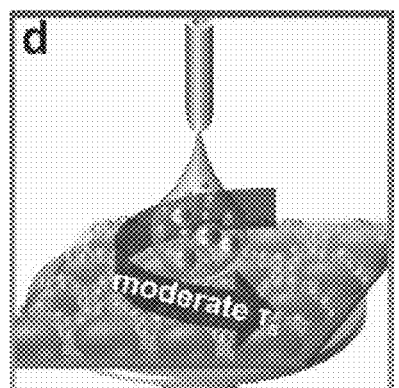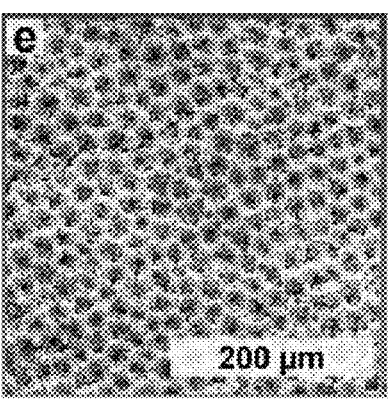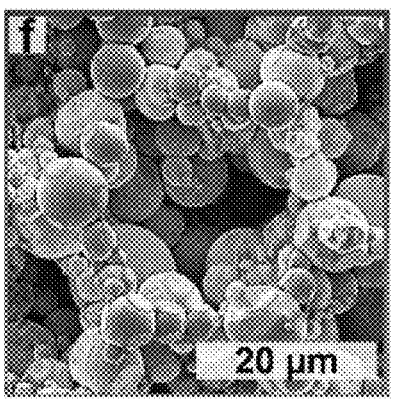
FIG. 3D  FIG. 3E  FIG. 3F
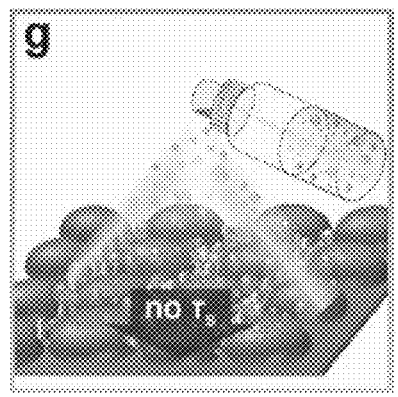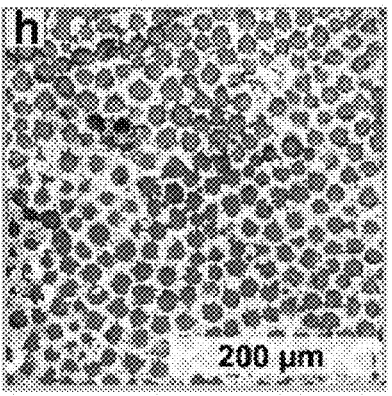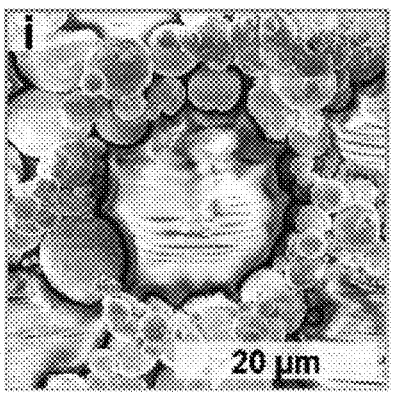
FIG. 3G  FIG. 3H  FIG. 3I

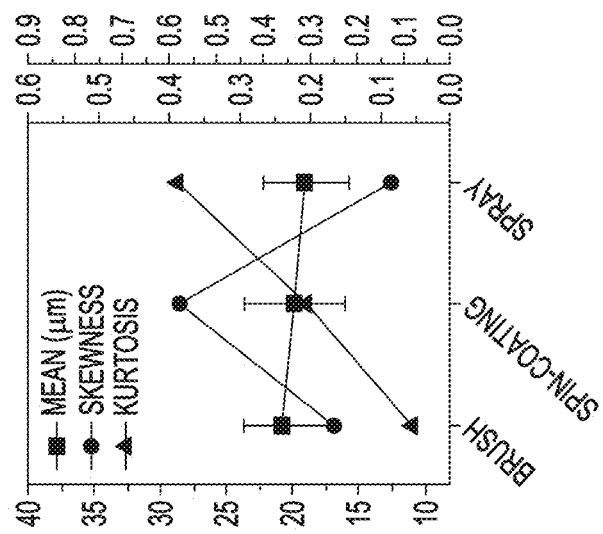
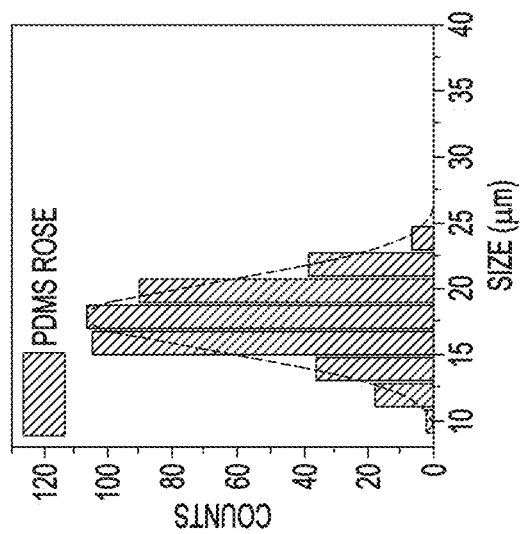
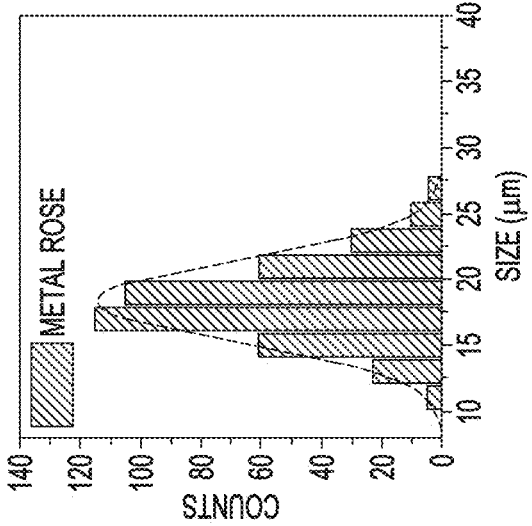
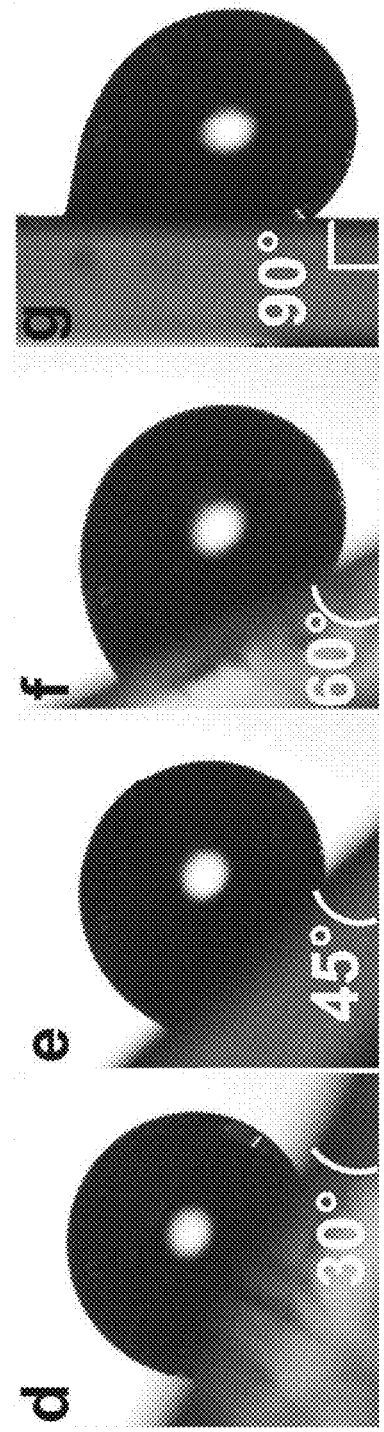
FIG. 7A  FIG. 7B  FIG. 7C  FIG. 7D  FIG. 7E  FIG. 7F  FIG. 7G 3 HERTZIAN-CONTRACTING SPHERES
(R:r) -> 7:1

4 HERTZIAN-CONTRACTING SPHERES
(R:r) -> 3:1

NON-HERTZIAN SPHERES

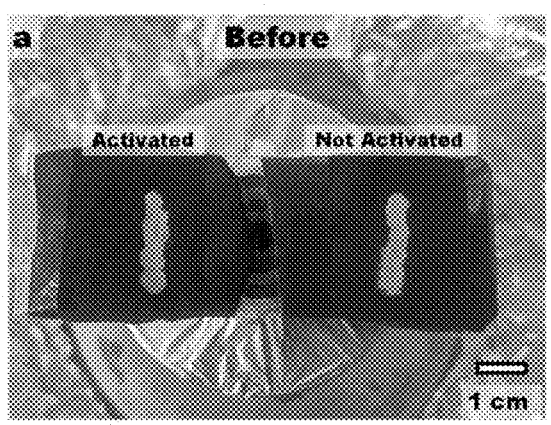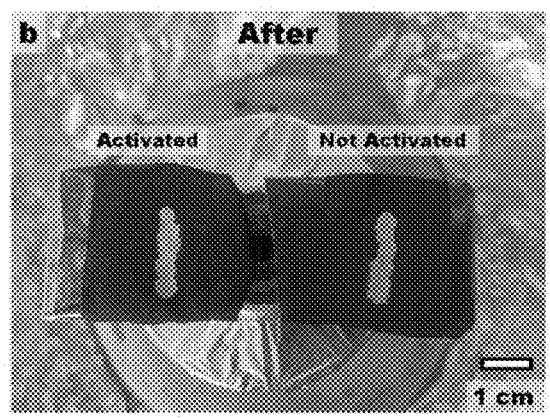
FIG. 16A  FIG. 16B
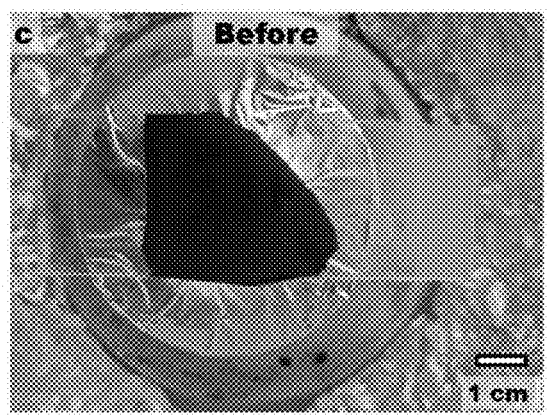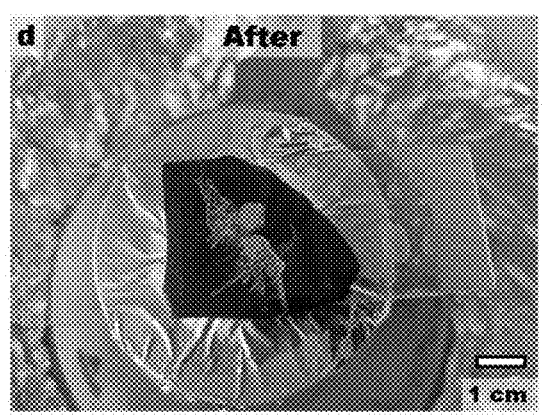
FIG. 16C  FIG. 16D
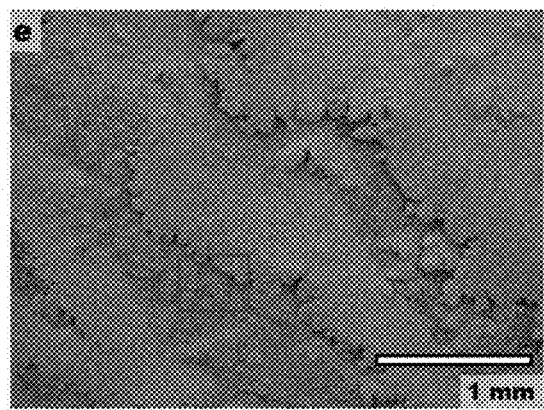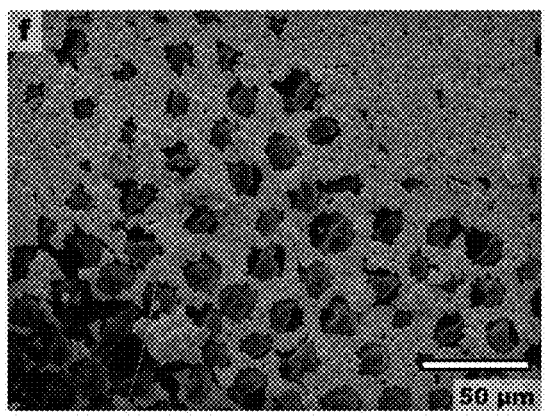
FIG. 16E  FIG. 16F

COATED IRREGULAR SURFACES

CROSS-REFERENCE TO RELATED APPLICATION

This application claims the benefit of priority to U.S. Provisional Patent Application Ser. No. 63/072,495 filed Aug. 31, 2020, the disclosure of which is incorporated herein in its entirety by reference.

BACKGROUND

Nature is endowed with a plethora of functional surface textures albeit on mechanically delicate or heat sensitive surfaces. These features have evolved, over eons, for protection (e.g., camouflage, or illusion), color (e.g., morpho butterfly), movement (e.g., shark skin), and survival in xeric environments (e.g., the desert lizard or Namib beetle), among others. Despite their obvious uniqueness and uses, adoption of these biostructures is limited by ability to replicate them, largely due to differences in processing condition needs (e.g., heat for metals). Various efforts to capture these patterns have been limited to replica molding with elastomeric materials or using sophisticated tools for biomimicry on hard materials. The latter is driven by a realization of the utility of biomimetic or analogous patterns on high modulus materials, like metals and ceramics. For example, efforts to create ultra- or superhydrophobic surfaces on hard materials have focused on etching patterns, often using harsh reagents with/without concomitant use of expensive tools and/or skilled labor, with most of these approaches not being amenable to scale up.

Advances in wearable, flexible, and printed electronics, inevitably calls for integration of electronics onto organic substrates and tissue. A major caveat is ability to interface these rather dissimilar outfits due to mismatch in modulus, surface energy, reactivity, conductivity, processing temperature, among other properties. Inorganic (e.g., metals) and organic materials have diametrically opposite surface energies' hence, organics do not readily adhere to metals.

SUMMARY OF THE INVENTION

In various aspects, the present invention provides a particle-coated substrate that includes a coating including undercooled liquid metallic particles. The particles include a solid shell including a metal oxide. The particles also include a liquid metallic core that is below the melting point of the liquid metallic core. The particle-coated substrate also includes a substrate including an irregular surface. The coating is on the irregular surface of the organic substrate.

In various aspects, the present invention provides a metallic-coated substrate that includes a coating including a solidified metal and/or metal alloy and solid metal oxide shells. The metallic-coated substrate also includes a substrate including an irregular surface. The coating is on the irregular surface of the organic substrate.

In various aspects, the present invention provides a metallic inverse surface replica including a metallic film including solidified metal and/or metal alloy and solid metal oxide shells. The metallic film is an inverse replica of an irregular surface of a substrate.

In various aspects, the present invention provides a surface replica including a solid material that includes a surface including a non-inverted replica of an irregular surface of a substrate.

In various aspects, the present invention provides a method of forming the surface replica. The method includes applying the solid material or a precursor thereof to the metallic inverse surface replica. The method optionally includes allowing the precursor to react or set to form the solid material. The method also includes removing the metallic film from the solid material to form the surface replica.

In various aspects, the present invention provides a method of forming the metallic inverse surface replica. The method includes removing the coating including the solidified metal and/or metal alloy from the metallic-coated substrate to form the metallic inverse surface replica.

In various aspects, the present invention provides a method of forming the metallic-coated substrate. The method includes rupturing the solid shells of the undercooled liquid metallic particles of the particle-coated substrate to form the metallic-coated substrate.

In various aspects, the present invention provides a method of forming the particle-coated substrate. The method includes applying a solution including the undercooled liquid metallic particles to the irregular surface of the substrate to form the particle-coated substrate.

Various aspects of the present invention provide certain advantages over other methods of coating and forming replicas. For example, in various embodiments, the present invention can provide a secure coating of metallic particles on an organic surface despite the differences in polarity between the particles and the surface. In various embodiment, the present invention provides a heat-free method of coating a surface, such as to form a conductive coating thereof and/or to form a replica thereof. The heat-free nature of various embodiments allows the coating and replication of surfaces that cannot be treated using other methods that include the use of heat, such as delicate surfaces and biological surfaces. In various embodiments, the present invention provides a method of coating and/or replicating extremely fine details of an irregular surface which cannot be coated or replicated using other methods. In various embodiments, the present invention provides a method of coating and/or replicating irregular surfaces that leaves the surface intact after the completion of the method. In various embodiments, the present invention provides a method of bonding particles to a surface that is entirely mechanically driven (e.g., via inter-particle friction and friction between the particles and the surface), avoiding contamination of the surface and/or the texture thereof with adhesive materials, allowing for more precise replication of the surface than other methods.

In various embodiments, the method of the present invention provides a high resolution (e.g., micro- to nano-meter), such as due to the self-filtration process not being dependent on the carrier liquid's viscosity; such embodiments have various advantages over the use of conductive ink which are limited to the capillary length of the medium (mm to cm). In various embodiments, during the method of the present invention, gaps and spaces being filled are supported by the weight of the undercooled liquid metallic particles suspended within the solvent, providing better filling of gaps and spaces than other methods. In various embodiments, the spread and/or density of the undercooled liquid metallic particles can be adjusting during the method of the present invention, such that mimicry of an entire surface texture or only one or more portions of the surface texture can be performed. In various embodiments of the present invention, the formation of the inverse surface replica on a surface can provide structural reinforcement of the surface and/or of the material including the surface. In various embodiments of the present invention, the method can be used to provide electrodes on irregular surfaces, such as 3-D multi-scale electrodes.

In various embodiments, the undercooled liquid metallic particles can be derived from different metal elements but with each composition of particles having a particular size. Mixing the different-sized particles and allowing them to self-organize can create layers/regions that are composed of different elemental compositions. As an example, particles formed from BiSn (e.g., 500-800 nm diameter), Sn (e.g., 900-1400 nm diameter), and InSn (e.g., >2000 nm) can be mixed and deposited onto an irregular surface to give an inverse metallic replica of the surface but with different regions having different compositions. The size-differentiated particles can be sintered to create a layered solid metal product having compositional variations. In various embodiments, the differences in composition can be used to tune/adjust density, mechanical, thermal transport, electrical conductivity, or optical properties of the form. In various embodiments, the technique of the present invention of forming inverse metal replicas having different regions having different compositions can be used to control optical properties of the resulting material; for example, the surface replicas formed can have optical properties (e.g., color) that is dependent on the angle at which the surface is viewed. For example, smaller particles (e.g., nanoscale) on the surface may only reflect certain wavelengths but allow transmission of others. When the incidence angle is low, the surface can reflect lower wavelengths of light (depending on their size), allowing the surface to appear colored.

In various embodiments of the present invention, the type of carrier fluid used in the solution including undercooled metal particles to the irregular surface can be adjusted to control capillary pressure of the particles during the coating and jamming of particles onto the surface, which can control how tightly the particles pack. The tightness of the packing can affect the density of the inverse metal replica formed from the particles as it can dictate the size of inter-particle distances in the particle-coated substrate. Although using a closely related set of different carrier fluids (e.g., similar structures, similar polarity) generally will not affect self-filtration to the same degree, it will affect how tightly the particles are drawn to one another since the formed capillary bridges of carrier fluid between the particles will be of different size and so will the capillary force drawing the particles together.

In various embodiments, the method of the present invention can be carried out using undercooled metal particles having different organic surface species that can be installed during the preparation of the particles. The combination of surface chemistry and resulting structures can lead to tunable tribological properties of the resulting inverse metallic replica; for example, the surfaces can be tuned to repel water, one or more organic liquids, or a combination thereof. Adjusting the organic surface species on the surface of the particles can be useful for creating self-cleaning metallic surfaces to control friction, icing/frost formation (e.g., with potential applications in the aerospace industry), heat exchange (e.g., with potential applications for improving heat exchange systems), lustre, corrosion prevention, anti-fouling, or a combination thereof.

In various embodiments of the present invention, the coating/placement of the particles onto a soft substrate gives an induced texture on the soft substrate (e.g., see FIG. 18 and discussion thereof herein). In some examples, the creation of the induced texture can give stronger mechanical bonding between the inverse metallic replica and the substrate.

In various embodiments of the present invention, the particles can be deposited and the shells can be broken on a substrate that is or includes a pre-stretched textured surface. Such a technique can be used to create pre-stretched fiber composite materials. In some embodiments, the pre-stretched fiber composite materials can be high-strain materials (e.g., the strain can be locked-into a material. Such techniques can be used to form adaptable materials by storing energy in a system, locking it in with the conformally fitting coating, and then releasing the energy during a particular event, such as upon heavy impact that causes deformation of the metal.

In various embodiments, the multi-scale roughness of textiles can be coated with the undercool metal particles at high resolution, which can allow for creating conductive traces on such surfaces which can provide conductive textiles.

In various embodiments, the particles can be coated onto two or more textured surfaces, creating a conformal joint therebetween upon rupturing of the particle shells. Such an embodiment can be used to quickly and conveniently "heal" a fracture that generates two or more textured surfaces, such as broken bones.

In various embodiments, the method of present invention can be used to perform soft lithography, such as at ambient temperature; such embodiments have various advantages over soft lithography techniques based on polymers/elastomers.

BRIEF DESCRIPTION OF THE FIGURES

The patent or application file contains at least one drawing executed in color. Copies of this patent or patent application publication with color drawing(s) will be provided by the Office upon request and payment of the necessary fee.

The drawings illustrate generally, by way of example, but not by way of limitation, various embodiments of the present invention.

FIG. 1 part a illustrates macro- and micro-structure of a rose flower template, in accordance with various embodiments. FIG. 1 part b illustrates ULMCS jammed into template after deposition and capillary densification, in accordance with various embodiments. FIG. 1 part c illustrates inverse metal rose replica pattern shows the same micro-structure as the rose's Male, (+), template after lift-off, in accordance with various embodiments. FIG. 1 part d illustrates a zoom-in of a unit block of the inverse metal rose from FIG. 1 part c showing effect of self-filtration on particle size distribution, in accordance with various embodiments. FIG. 1 part e illustrates converting an elastomeric lift-off structure from the rose into a mold, in accordance with various embodiments. ULMCS deposition, densification leads to conformal packing as shown in FIG. 1 part f, in accordance with various embodiments. FIG. 1 part f illustrates conformal packing resulting from ULMCS deposition and densification, in accordance with various embodiments. FIG. 1 part g illustrates a metal rose after lift-off from a synthetic mold, in accordance with various embodiments. FIG. 1 part h illustrates a zoom-in of the metal rose from FIG. 1 part g, in accordance with various embodiments. FIG. 1 part i illustrates an overview of the BIOMAP process, in accordance with various embodiments.

FIG. 3a illustrates a hand brush (painting) deposition method, in accordance with various embodiments.

FIG. 3b illustrates an example of generated replica patterns from hand brush deposition methods, in accordance with various embodiments.

FIG. 3c illustrates a zoomed-in portion from FIG. 3b, in accordance with various embodiments.

FIG. 3d illustrates a spin-coating deposition method, in accordance with various embodiments.

FIG. 3e illustrates an example of generated replica patterns from spin-coating deposition methods, in accordance with various embodiments.

FIG. 3f illustrates a zoomed-in portion from FIG. 3e, in accordance with various embodiments.

FIG. 3g illustrates a spray deposition method, in accordance with various embodiments.

FIG. 3h illustrates an example of generated replica patterns from spray deposition methods, in accordance with various embodiments.

FIG. 3i illustrates a zoomed-in portion of FIG. 3h, in accordance with various embodiments.

FIG. 6a, right side, illustrates a metallic rose replica fabricated from the template shown on the left side of FIG. 6a, in accordance with various embodiments.

FIG. 6c, right side, illustrates PDMS rose patterns fabricated from the pattern shown in the left side of FIG. 6c, in accordance with various embodiments.

FIG. 7a illustrates pattern feature sizes of a metal rose, in accordance with various embodiments.

FIG. 7b illustrates pattern feature sizes of a PDMS rose, in accordance with various embodiments.

FIG. 7c illustrates statistical summary of distribution fittings of metal and PDMS rose compared with rose template, in accordance with various embodiments.

FIG. 7d illustrates water droplet shape change on a fresh rose petal surface tilted to 30 degrees, in accordance with various embodiments.

FIG. 7e illustrates water droplet shape change on a fresh rose petal surface tilted to 45 degrees, in accordance with various embodiments.

FIG. 7f illustrates water droplet shape change on a fresh rose petal surface tilted to 60 degrees, in accordance with various embodiments.

FIG. 7g illustrates water droplet shape change on a fresh rose petal surface tilted to 60 degrees, in accordance with various embodiments.

FIG. 16a illustrates activated and not activated particles deposited on rose petals before a spin coating process, in accordance with various embodiments.

FIG. 16b illustrates activated and not activated particles deposited on rose petals after a spin coating process, in accordance with various embodiments.

FIG. 16c-d illustrates deposition of particles on a spinning rose petal, in accordance with various embodiments.

FIG. 16e-f illustrate SEM micrographs at various magnification of particles deposited as shown in FIG. 16d, in accordance with various embodiments.

DETAILED DESCRIPTION OF THE INVENTION

Figure 1:
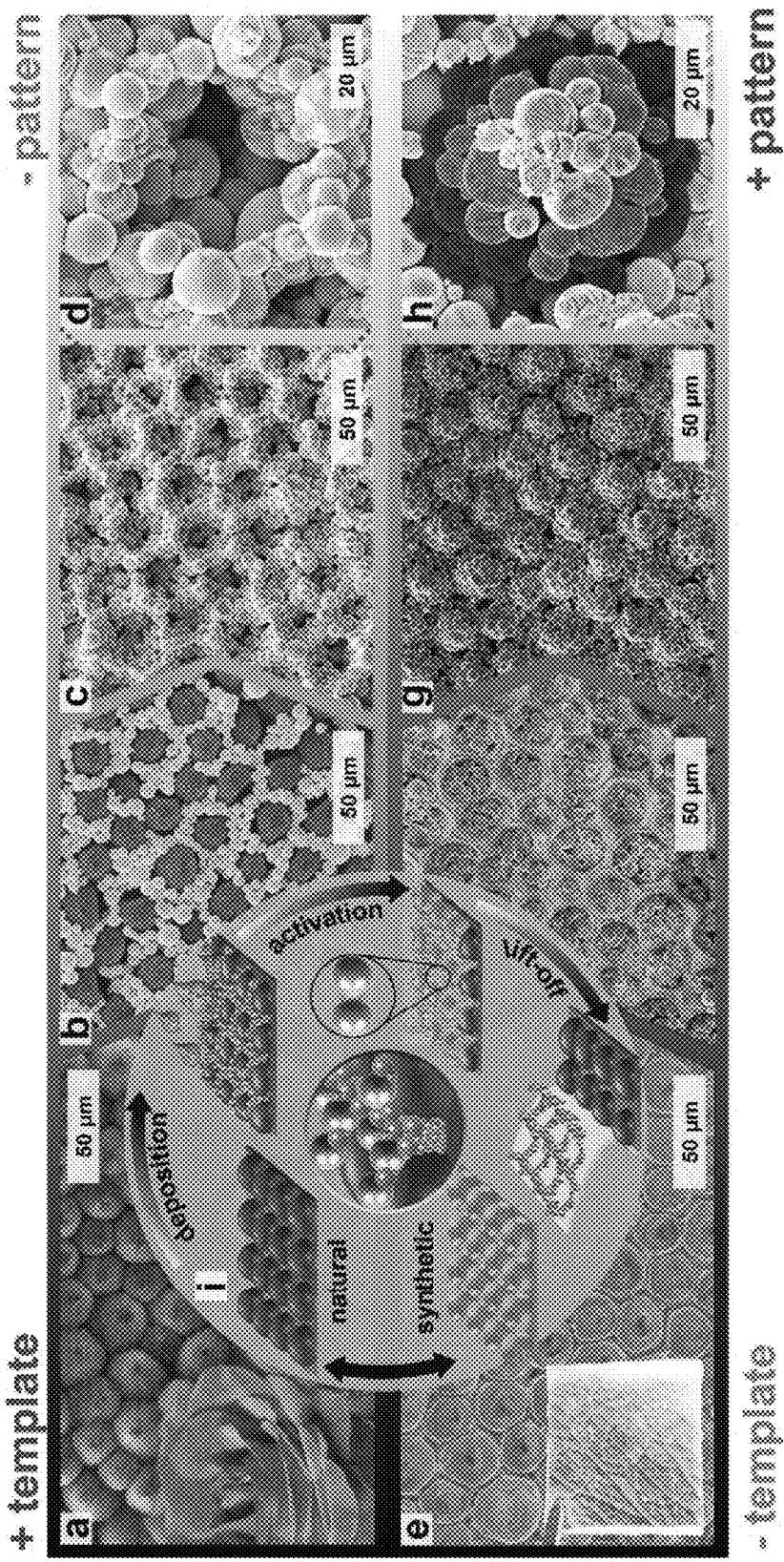
FIG. 1 is a schematic illustration of heat-free bio-mimetic metal patterning.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

As used herein, the term "polymer" refers to a molecule having at least one repeating unit and can include copolymers.

Various embodiments provide a particle-coated substrate. The particle-coated substrate includes a coating including undercooled liquid metallic particles. The particles include a solid shell including a metal oxide. The particles also includes a liquid metallic core that is below the melting point of the liquid metallic core. The particle-coated substrate also includes a substrate that includes an irregular surface, wherein the coating is on the irregular surface of the substrate.

The metastable, undercooled (supercooled) liquid metallic core-shell (ULMCS) particles can be selected from any suitable metallic material that can be undercooled by the SLICE process or other process to a metastable state having a liquid metallic core contained within a protective solid shell. The SLICE process is described by I. D. Tevis, L. B. Newcomb, and M. Thuo in Langmuir 2014, 30, 14308, the disclosure of which is incorporated by reference herein. Such metallic materials include, but are not limited to, an alloy comprising Bi, In, Sn, Ag, Au, or a combination thereof; Field's metal (Bi:In:Sn 32.5:51:16.5 weight %; melting point-about 62° C.); a Bi—Sn alloy (Bi:Sn:58:42 weight %; melting point about 139° C., Rose's metal (Bi:Pb:Sn 50:25:25 weight %; melting point-about 98° C.), and others.

The particles can be adhered to the surface via inter-particle friction and friction between the particles and the surface. The particles can be adhered to the surface solely via friction forces and the coating and substrate can be free of adhesive materials or any other material that can assist the particles in adhering to the irregular surface.

The particles can have any suitable diameter, such as 1 nm to 10 microns, or 1 micron to 5 microns, or less than or equal to 10 microns but greater than or equal to 1 nm, 5, 10, 15, 20, 25, 50, 75, 100, 150, 200, 250, 500, 750 nm, 1 micron, 1.5, 2, 2.5, 3, 3.5, 4, 4.5, 5, 6, 7, 8, or 9 microns.

The coating can be an inverse replica of the irregular surface of the substrate.

The substrate can be any suitable substrate that includes an irregular surface. An irregular surface includes portions that are not flat. The irregular surface can includes pores, crevices, or a combination thereof. The substrate can be organic or inorganic. The substrate can include a bone, a vitrified surface, a mineralized surface, or a combination thereof. The substrate can be a hard substrate or a soft (e.g., easily deformable) substrate. The organic substrate can include a biological substrate (e.g., a substrate that is part of or that is taken from a biological organism). The organic substrate can be part of or taken from a human, animal, mammal, fish, insect, or combination thereof. The organic substrate can be part of or taken from a tissue, an organ, a skin, a bone, an insect, a reptile skin, a plant, a flower, a tree, a marine animal skin, or a combination thereof.

Various embodiments provide a metallic-coated substrate. The metallic-coated substrate can include a coating including a solidified metal and/or metal alloy and solid metal oxide shells. The metallic-coated substrate can include a substrate including an irregular surface, wherein the coating is on the irregular surface of the substrate.

The metallic-coated substrate can be formed by rupturing the solid shells of the undercooled liquid metallic particles of the particle-coated substrate. Rupturing the solid shells can allow the undercooled liquid to be released from the shell which it conglomerates together and rapidly solidifies into a solid metallic coating. The coating can be uniform and continuous. The coating can be electrically conductive, thermally conductive, or a combination thereof. The coating can be an inverse replica of the irregular surface of the substrate.

Various embodiments provide a metallic inverse surface replica. The metallic inverse surface replica can include a metallic film including solidified metal and/or metal alloy and solid metal oxide shells. The metallic film can be an inverse replica of an irregular surface of a substrate (e.g., a partial or complete replica). The metallic film of the metallic inverse surface replica can be made from the metallic-coated substrate by removing the coating including the solidified metal and/or metal alloy and solid metal oxide shells from the irregular surface of the substrate. The removal can be conducted in any suitable manner, such as by peeling the metal film from the irregular surface, or by destroying the organic substrate (e.g., pyrolyzing, dissolving, and the like). Solid metal oxide shells can be detected in a metallic surface replica via various characterization methods, such as via methods using X-rays.

The metallic film, or the coating on the metallic-coated substrate, can have any suitable thickness, such as 10 nm to 100 microns, or less than or equal to 100 microns but greater than or equal to 10 nm, 20, 30, 40, 50, 75, 100, 125, 150, 200, 250, 500, 750 nm, 1 micron, 2, 3, 4, 5, 10, 15, 20, 25, 30, 40, 50, 60, 70, 80, or 90 microns.

In various embodiments, the present invention provides a surface replica. The surface replica includes a solid material that includes a surface including a non-inverted replica of an irregular surface of a substrate. The surface replica can be made from the metallic inverse surface replica by applying the solid material or a precursor thereof to the metallic film, optionally allowing the precursor to react or set (e.g., the precursor can be a heated thermoplastic material that is allowed to cool after in contact with the metallic film) to form the solid material, and removing the metallic film from the solid material.

The solid material can include a metal, a metal alloy, a polymer, or a combination thereof. In various embodiments, the solid material includes a crosslinked PDMS. In various aspects, the solid material can be applied to the metallic film by applying a mixture of PDMS and crosslinker and these materials can be allowed to react to form the solid material.

Various embodiments provide a method of forming the surface replica. The method can include applying the solid material or a precursor thereof to the metallic inverse surface replica, optionally allowing the precursor to react or set to form the solid material, and removing the metallic film from the solid material to form the surface replica.

Various embodiments provide a method of forming the metallic inverse surface replica. The method can include removing the coating including the solidified metal and/or metal alloy from the metallic-coated substrate to form the metallic inverse surface replica.

Various embodiments provide a method of forming the metallic-coated substrate. The method includes rupturing the solid shells of the undercooled liquid metallic particles of the particle-coated substrate to form the metallic-coated substrate. The rupturing can be performed in any suitable way. The rupturing can include a chemical trigger (e.g., treatment with one or more compounds that cause rupturing of the shells), light impingement (e.g., laser light impingement or focused beam light impingement), ultrasound impingement, vibrational forces, heat application, or a combination thereof.

Various embodiments provide a method of forming the particle-coated substrate. The method can include applying a solution including the undercooled liquid metallic particles to the irregular surface of the substrate to form the particle-coated substrate.

The applying can be conducted in any suitable way. In various aspects, the applying can include brushing (e.g., brushing by hand), spin-coating, spray deposition, or a combination thereof.

The method can further include drying the applied solution on the irregular surface, to form the particle-coated substrate. The drying can be conducted in any suitable way, such as at room temperature, with heating, under vacuum, at atmospheric pressure, or a combination thereof.

The applied solution can have any suitable polydispersity of the undercooled liquid metallic particles. For example, the solution can include a polydispersity of large-to-small sizes of the undercooled liquid metallic particles of 1:1 to 1:10, or 1:3 to 1:7, or less than, equal to, or greater than 1:1, 1:2, 1:3, 1:4, 1:5, 1:6, 1:7, 1:8, 1:9, or 1:10.

The solution can include any one or more suitable organic solvents, water, or other materials. For example, the solution can include one or more organic solvents and/or organic liquids. The solution can include an alcohol, acetic acid, methanol, ethanol, cellulose, a cellulose derivative, hydroxyethyl cellulose, ethylene glycol, water, or a combination thereof.

The solution and the irregular surface can be free of adhesives or other materials that can aid in the adhesion of the particles to the irregular surface. The particles can be adhered to the surface solely via inter-particle friction and friction between the particles and the surface (e.g., jamming).

The method of forming the particle-coated substrate can further include rupturing the solid shells of the undercooled liquid metallic particles of the particle-coated substrate to form the metallic-coated substrate. The method can be a method of printing the coating on the irregular surface of the substrate, and can allow room temperature application of the metallic coating on the irregular surface, which can have electrically conductive and/or thermally conductive properties.

The method of forming the particle-coated substrate can further include removing the coating including the solidified metal and/or metal alloy and solid metal oxide shells from the irregular surface of the substrate to form the metallic inverse surface replica.

The method of forming the particle-coated substrate can further include applying a solid material or a precursor thereof to the metallic film, optionally allowing the precursor to react or set to form the solid material, and removing the metallic film from the solid material to form the surface replica.

EXAMPLES

Various embodiments of the present invention can be better understood by reference to the following Examples which are offered by way of illustration. The present invention is not limited to the Examples given herein.

Part I. Heat-Free Biomimetic Metal Molding on Soft Substrates.

Statistical Data analysis: Statistical analysis was done with software Origin 2019b. Parameters were calculated with equation provided in webpage: https://www.originlab.com/doc/X-Function/ref/moments#Related_X-Functions. Bin size for particle size and pattern features size distribution histograms were 0.5 and 2.0 µm, respectively. All data were fitted with normal (Gaussian, normal-gauss) distribution except for ULMCS size and top particle size for sprayed metal rose pattern.

The random close packing factor $\phi_{RCP}$ of hard spheres is affected by polydispersity $\delta$ and skewness S of particle size distribution with following equation:

$$\phi_{RCP} = \phi^*_{RCP} + c_1\delta + c_2 S\delta^2 \quad (1)$$

With $\phi^*_{RCP}=0.634$ for random packed hard spheres when $\delta$ equals to 0. Constants $c_1$ and $c_2$ possess values of 0.0658 and 0.0857 correspondingly. Definition of $\delta$ is:

$$\delta = \frac{\sqrt{\langle\Delta R^2\rangle}}{\langle R\rangle} \quad (2)$$

Where R is the particle size.

By applying above equation, $\phi_{RCP}$ could be calculated for polydisperse particles. The larger the $\phi_{RCP}$, the denser the packed structure.

Example 1. Experimental Procedure

Polydisperse ULMCS Field's metal (51% In, 32.5% Bi and 16.5% Sn w/w) particles were synthesized via the SLICE (Shearing Liquids Into Complex particlEs) method as previously reported (I. D. Tevis et al., Langmuir 2014, 30, 14308 and by WO2015089309 published June, 2015, the disclosures of which are incorporated by reference herein). The SLICE process can produce particles<10 nm, but for enhanced self-filtration and ease of characterization in current study, larger size (mm) and higher polydispersity is desired (see Equation 1). Particles used in this study were 2.71±1.58 µm diameter (FIGS. 2a-b), hence a predicted packing ration of ca. $\phi$=0.70 based on Equations 1 and 2. These soft deformable ULMCS, as expected, form denser structures than the random close packing observed with hard spheres ($\phi$=0.64). We infer that the densification is likely due to capillary pressure driven shape change and autonomous size ordering that has been shown to increase densification. These processes, however, can be perturbed by external stresses during particle deposition. To investigate effect of deposition process on packing density, methods with varying degrees of applied shear stress ($\tau_s$) were adopted. The particles were deposited on the biological templates, in our case rose petals, and template-stripped using copper tape, creating a biomimetic metallic structure albeit of an inverse relief.

Inverse PDMS rose: Mixture of PDMS and cross-linker (10:1) was applied on the Mann® ease release sprayed rose surfaces and stored in 40° C. oven overnight. After fully cross-linking, the inverse PDMS rose was lifted up with tweezers.

PDMS rose: Liquid metal particle solution was deposited on rose template and activated as described in the main manuscript. Resulting patterns were lifted-up on Scotch tape and glued on the bottom of polyethylene containers. Patterns were sprayed with Mann® ease release before submerging with the mixture of PDMS and cross-linker (10:1). Containers holding PDMS were store in 40° C. oven overnight. After fully cross-linking, the PDMS rose was lifted up with tweezers.

CAP and PDMS reference: For making CAP reference, ULMCS solution was spin-coated on Si substrate at a speed of 1000 rpm, attained over 10 seconds and held for another 20 seconds. Then 1:1 glacial acetic acid in ethanol solution was dropped on the surface (particles 2-3 drops/cm$^2$) to activate particles using a Pasteur pipette. PDMS reference was made by cross-linking mixture of PDMS and cross-linker (10:1) in polyethylene containers and used directly.

Elemental analysis: Energy Dispersive X-ray Spectrometer (EDS) was applied to carry out elemental analysis. 15 kV accelerating voltage and 10 mm working distance of was applied for high spectral resolution. Maps were taken at 1024 pixel resolution with 500 ms dwell time.

False coloring: Non-grayscale SEM images shown in paper were forced colored with Adobe Photoshop CC with cautious design. Image brightness and contrast was adjusted accordingly.

Example 2. Results and Discussion

FIG. 1 is a schematic illustration of heat-free bio-mimetic metal patterning. BIOMAP, with CLMCS. FIG. 1 part a illustrates macro- and microstructure of a rose flower template. FIG. 1 part b illustrates ULMCS jammed into template after deposition and capillary densification. FIG. 1 part c illustrates inverse metal rose replica pattern shows the same micro-structure as the rose's Male, (+), template after lift-off. FIG. 1 part d illustrates a zoom-in of a unit block of inverse metal rose showing effect of self-filtration on particle size distribution. FIG. 1 part e illustrates converting an elastomeric lift-off structure from the rose into a mold. ULMCS deposition, densification leads to conformal packing as shown in FIG. 1 part f. FIG. 1 part f illustrates conformal packing resulting from ULMCS deposition and densification. FIG. 1 part g illustrates an metal rose after lift-off from synthetic template, and FIG. 1 part h illustrates a zoom-in of the metal rose. FIG. 1 part i illustrates an overview of the BIOMAP process, with false-coloring used for clarity and to highlight changes in particle sizes in the zoomed in images.

Recently, undercooled metal particles have emerged as a versatile material state. Solvent-suspended polydisperse, soft, non-Hertzian Undercooled Liquid Metal Core-Shell (ULMCS) particles, however, offers the ability to conform, tightly pack, and self-sort through complex multi-scale surface textures such as that of a rose petal (FIG. 1 parts a-b). Upon deposition, and solvent evaporation, soft particles tend to form randomly close packed structures (RCP) and jam at a packing factor, $\phi$=0.64. The packing factor is driven by the relation. $\phi$=Nv$_0$/V, where N is the number of particles, v$_0$ is unit volume and V is volume. Furthermore, given the existence of multiscale patterns and channels on a rose surface (FIG. 1 part a), these particles would undergo a self-filtration process assisted by capillary self-assembly. Upon drying and reaching a pendular state, they would eventually self-lock and jam within the crevices of the surface textures (FIG. 1 part b). The jamming occurs when inter-particle cavity dimensions, slurry concentration, and particle sizes satisfy Equation (3):

$$\frac{R}{r} = \left[\frac{4(n-1)}{3} + 1\right]^{1/2} \quad (3)$$

Where R is capillary radius, r is particle radius, and n is the number of particles. Equation 3 allows for prediction of size (r) or number (n) of particles needed to jam for a given recess size (R). Relying on the direct dependence on R and n (Equation 3), analogous structures can be readily distinguished based on structure of this jammed state. The jammed state also ensures that deposited ULMCS particles are mechanically stabilized and, therefore, can be sintered into surface-templated conformal networks (FIGS. 1c-d). Deploying heat-free chemical sintering (the so-called Coalescence of Undercooled Particles through a Chemical Trigger, CUPACT), joining and solidification of jammed ULMCS particles leads to a solidified structure that can be lifted off without damaging the rose petal or analogous soft substrate. This process is also compatible with synthetic, heat-sensitive and soft, motifs such as PDMS (FIG. 1 part e). When inverse biomimetic structures are templated onto elastomeric materials on which ULCMS particles are packed and chemically sintered, an exact replica of the natural pattern is realized (FIG. 1 parts f-h).

Figure 2A:
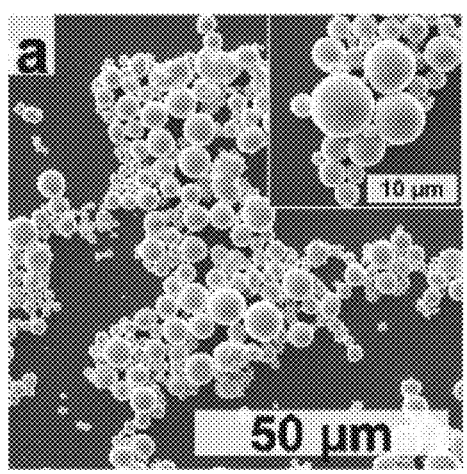
FIG. 2a illustrates morphology of ULMCS particles synthesized with SLICE, in accordance with various embodiments.
Figure 2B:
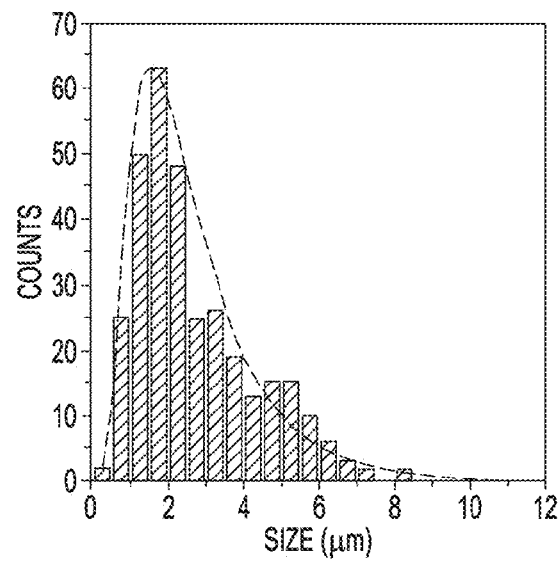
FIG. 2b illustrates size distribution of ULMCS particles synthesized with SLICE, in accordance with various embodiments.
Figure 2C:
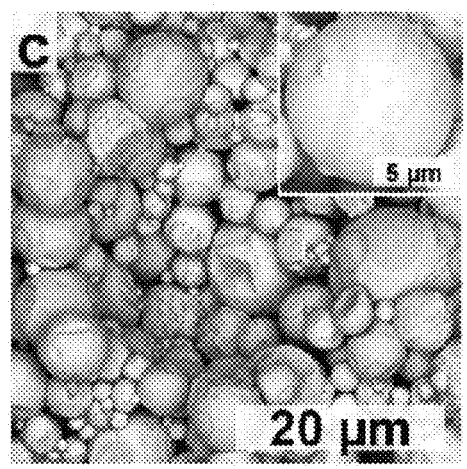
FIG. 2c illustrates a back scatter SEM image showing the camouflage pattern of inverse metal rose, in accordance with various embodiments.
Figure 2D:
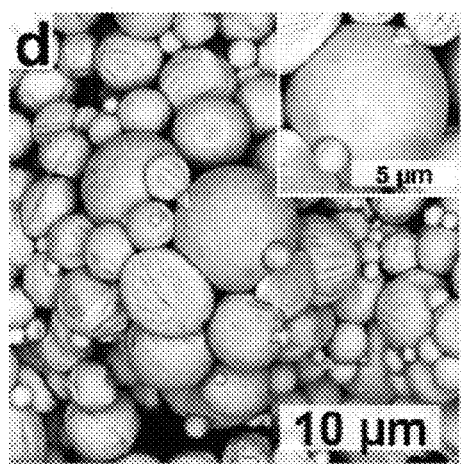
FIG. 2d illustrates a back scatter SEM image showing the camouflage pattern of metal rose, in accordance with various embodiments.
Figure 2E:
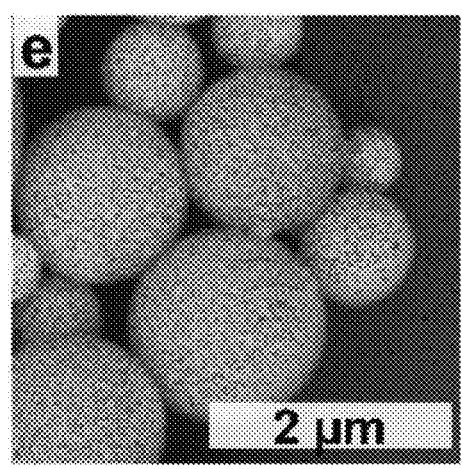
FIG. 2e illustrates EDS analysis showing the field's metal element distribution in ULMCS before chemical activation, in accordance with various embodiments.
Figure 2F:
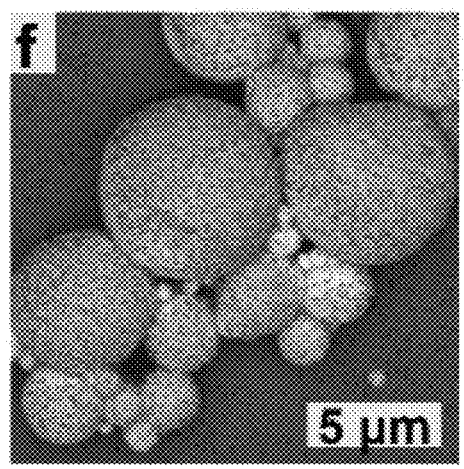
FIG. 2f illustrates EDS analysis showing the field's metal element distribution in ULMCS after chemical activation, in accordance with various embodiments.

FIG. 2a illustrates morphology of ULMCS particles synthesized with SLICE. FIG. 2b illustrates size distribution of ULMCS particles synthesized with SLICE. FIG. 2c illustrates a back scatter SEM image showing the camouflage pattern of inverse metal rose. FIG. 2d illustrates a back scatter SEM image showing the camouflage pattern of metal rose. FIG. 2e illustrates EDS analysis showing the field's metal element distribution in ULMCS before chemical activation, and FIG. 2f illustrates EDS analysis showing the field's metal element distribution in ULMCS after chemical activation, as captured by In: red. Sn: green and Bi: yellow. Biomimetic solid metallic structures can be fabricated without heat by exploiting autonomous processes such as capillary densification (jamming and capillary forces), kinetics frustrated processes (undercooling and CUPACT, FIG. 2e-f), and self-assembly/sorting (self-filtration of polydisperse particles, FIG. 2c-d) processes. Using undercooled metal particles and associated strain propagation, we demonstrate that a combination of self-filtration and jamming leads to tight packing on a delicate rose petal without inducing damage to the surface. Once densely packed, a chemical sintering process (FIGS. 2c-d) locks the particle in place leading to solidification and replication of the structure at a multi-scale level albeit as an inverse of the parent pattern. The envisioned process entails three steps viz; i) deposition and densification, ii) activation of solidification, and iii) reveal the replicated structure by lift off. For brevity, we abbreviate this BIOmimetic MetAl Patterning as BIOMAP (FIG. 1i).

Figure 3J:
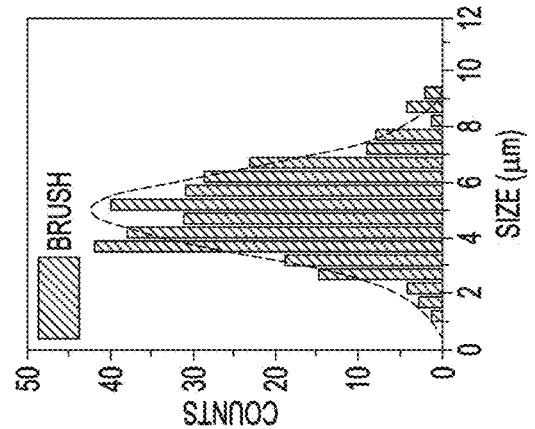
FIG. 3j illustrates size distribution of top layer particles formed via a hand brush deposition method, in accordance with various embodiments.
Figure 3K:
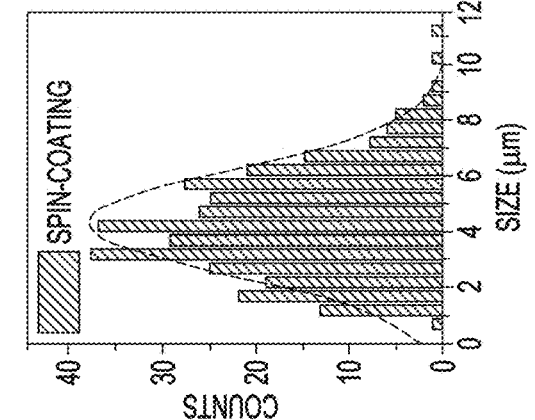
FIG. 3k illustrates size distribution of top layer particles formed via a spin-coating deposition method, in accordance with various embodiments.
Figure 3L:
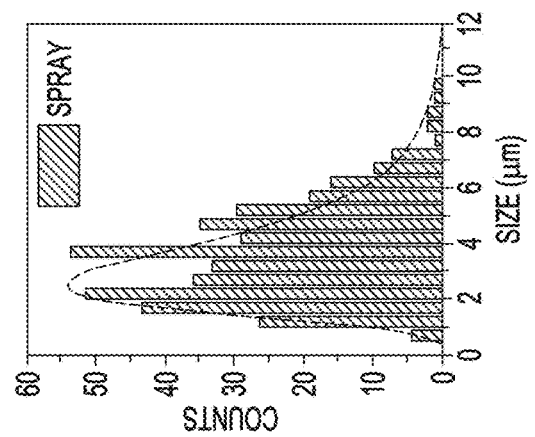
FIG. 3l illustrates size distribution of top layer particles formed via a spray deposition method, in accordance with various embodiments.

FIGS. 3a-1 illustrate the effect of deposition method on formed features. a) Hand brush (painting) deposition methods, and (b) example of generated replica patterns with c) a zoom-in on one of the patterns. d) Deposition by spin-coating, and e) produced surface features with associated zoom-in f). g) Spray-based deposition and i) associated product, f) where a zoom-in shows shallow features. (for clarity false color highlight different layers: top layer: red, 2nd layer: yellow, 3rd layer: green, 4th layer: blue, 5th layer: purple. Metallic orange represents copper tape.) Size distribution of the top layer particles differentiated by deposition method; brush (j), spin-coating (k) and spray (l) methods. Trends in statistical parameters associated with top-layer and starting particle size distributions (m). FIGS. 3a, 3d and 3g schematically shows various deposition methods ranging from high $\tau_s$ (brushing), moderate $\tau_s$ (spin-coating) and no $\tau_s$ (spraying). The Spraying method is considered to bear minimal $\tau_s$ as particles are deposited normal to the surface of the petal. Direct brushing method (FIG. 3a) induces low $\tau_s$ on the particle slurry during the deposition resulting in thick (>10 µm), multi-layer (>7 layers) patterns (FIGS. 3b-c). This method is the most facile, yet the most non-uniform due to user-dependency (i.e. high entropy). Spin coating—dropwise deposition at 1000 rpm (FIG. 3d), allows for a more controlled and reproducible deposition process since the shear speed, hence $\tau_s$, can fixed. Spin coating, however, shears-off the outermost layer of deposited particles, resulting in slightly thinner films (<10 µm, ~4-5 layers) compared to those obtained through brush-based spreading (FIGS. 3e-f). Surprisingly, spin coating allows for slightly better self-filtration as shown by autonomous size-sorting on the top layer of the lifted structure (false colored red, FIG. 3c vs 3f). The spraying process (FIG. 3g), in contrast, gives much thinner films (~3 layers), with significant defects/disconnections (FIG. 3h-i). We infer that this is likely due to challenges in pumping the rather dense metallic particles out of the hand spray system, which will bias towards depositing smaller and fewer particles. Sedimentation of larger particles in the solution being sprayed can also contributes to low concentration and size-selectivity hence the generation of thinner films. Although we see smaller particles on the top surface of spray generated structures (FIG. 3i) we exercise caution in deducing improved self-filtration in light of the process limitations.

With granular matter, however, self-filtration can lead to better packing into surface features leading to more conformal packing across different size scales. Self-filtration would manifest in size distribution of particles across the topmost layer of captured features. Comparing particle size distribution of the as-prepared particles (FIG. 2b) to those that deposit deepest in the rose petal crevices (i.e. presenting as the topmost layer of the metallic features), we observed a significant shift. In the polydisperse parent slurry a large positive skew is observed (FIG. 2b), while in the deposited particles, larger particles seem to have been filtered out (FIGS. 3j-m). Fitting a Gaussian over the distribution of particle sizes of the topmost layer of the lifted off structures shows that brush (~5 µm)>spin-coating (~4 µm)>spray (~3 µm).

Figure 3M:
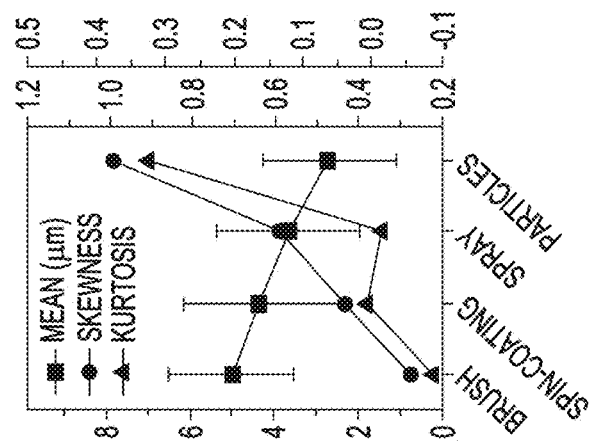
FIG. 3m illustrates statistical analysis of the size distribution shown in FIGS. 3j-l, in accordance with various embodiments.

Although a general decline is observed, the size differences are within margin of error. Moving to higher statistical moments, however, reveals that the peakedness (kurtosis) drops into negative values indicating smaller tails than a normal distribution (FIG. 3m). Kurtosis, therefore, increases with increase in skewness with this rise inversely correlating with magnitude of shear stress $\tau_s$ and average particle size (FIG. 3m). Trend skewness implies that a higher stress may interfere with the self-assembly process by either; i) accelerating carrier fluid removal hence low capillary packing, and ii) compressing the soft ULCMS particles reducing the interparticle pores needed for autonomous size-sorting through self-filtration. Based on the more symmetric distribution in the brush applied patterns (FIG. 3j), we infer that moderate amount of stress and slow evaporation of carrier fluid would lead to better packing albeit with potential challenges in scalability. We, therefore, infer that spin-coating, although with a slight relative skewness, is amenable to rapid and scalable fabrication of these features.

Figure 4A:
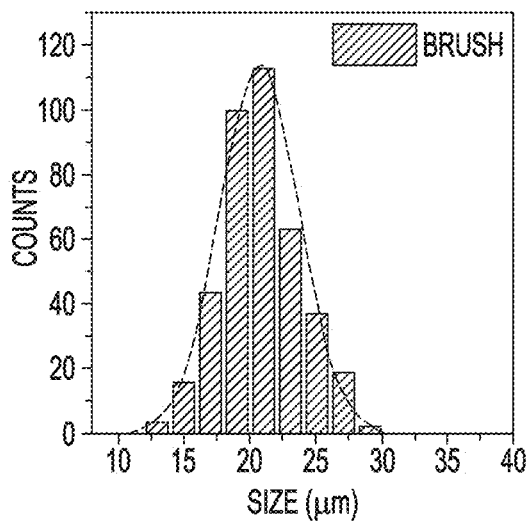
FIG. 4a illustrates feature size distribution of patterns deposited with a brush deposition method, in accordance with various embodiments.
Figure 4B:
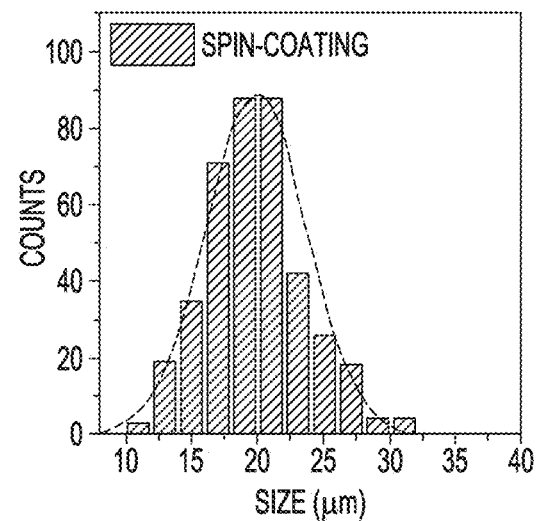
FIG. 4b illustrates feature size distribution of patterns deposited with a spin-coating deposition method, in accordance with various embodiments.
Figure 4C:
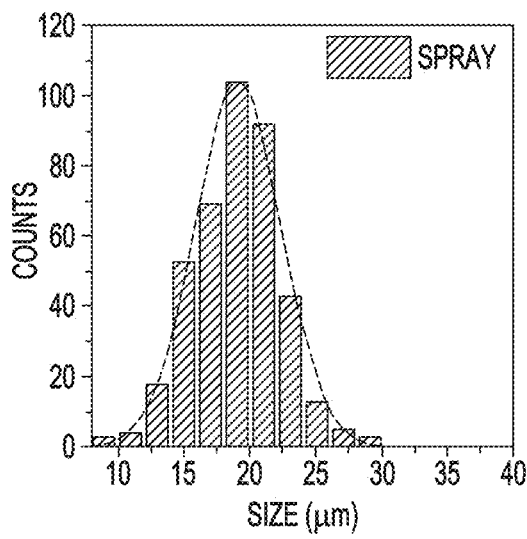
FIG. 4c illustrates feature size distribution of patterns deposited with a spray deposition method, in accordance with various embodiments.
Figure 4D:
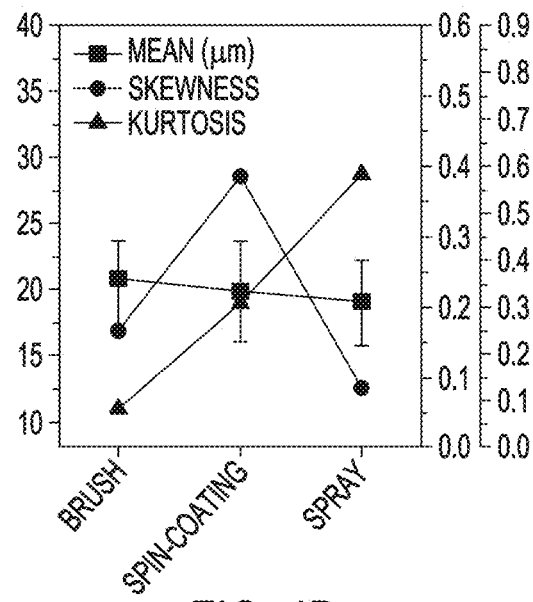
FIG. 4d illustrates statistical analysis of the size distribution shown in FIGS. 4a-c, in accordance with various embodiments.

To evaluate BIOMAP, we compared size of the radial structures derived from rose petals using different deposition methods (FIGS. 4a-d). FIGS. 4a-d illustrate feature size distribution of patterns deposited with brush (a), spin-coating (b) and spray (c) and corresponding statistical analysis (d). Efficiency of a replication method is best determined by how well the produced features match those of the mold and/or how well the method can distinguish similar structures. We observe that all features derived from the red rose had an average size in the order brush>spin-coating>spray but all within the margin error of each other and falling around ca. 20 µm (FIG. 4d). Skewness was also within a margin of error (±0.15) but kurtosis was inversely correlated to $\tau_s$ (FIGS. 4a-d).

Figure 5A:
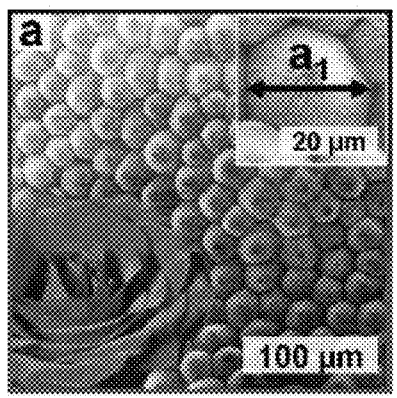
FIG. 5a illustrates macro- and microstructure (inset) of rose type 1 (red) with feature size labelled as a1, in accordance with various embodiments.
Figure 5B:
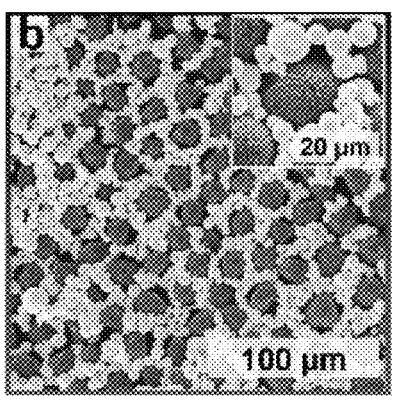
FIG. 5b illustrates ULMCS deposited onto rose 1 template, with the inset showing a zoomed-in portion, in accordance with various embodiments.
Figure 5C:
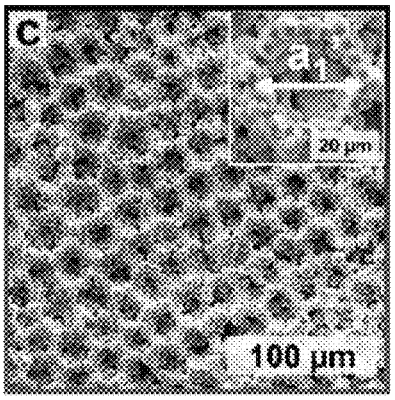
FIG. 5c illustrates activated and lifted-off patterns from rose 1 with pattern feature size labelled as a1', with the inset showing a zoomed-in portion, in accordance with various embodiments.
Figure 5D:
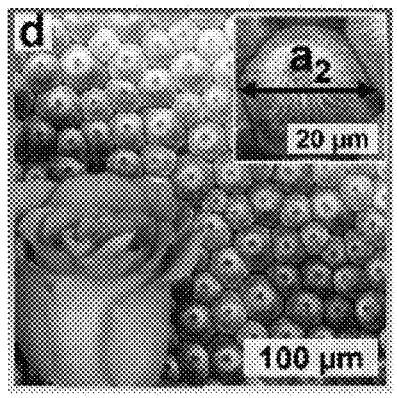
FIG. 5d illustrates macro- and microstructure (inset) of rose type 2 with feature size labelled as a2, in accordance with various embodiments.
Figure 5E:
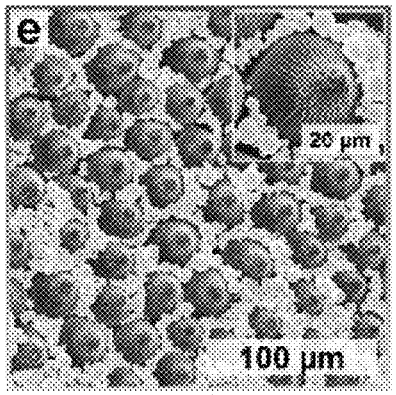
FIG. 5e illustrates ULMCS deposited onto rose 2 template, with the inset showing a zoomed-in portion, in accordance with various embodiments.
Figure 5F:
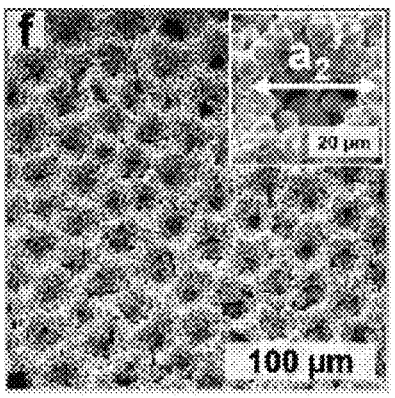
FIG. 5f illustrates activated and lifted-off patterns from rose 2 with pattern feature size labelled as a2', with the inset showing a zoomed-in portion, in accordance with various embodiments.
Figure 5G:
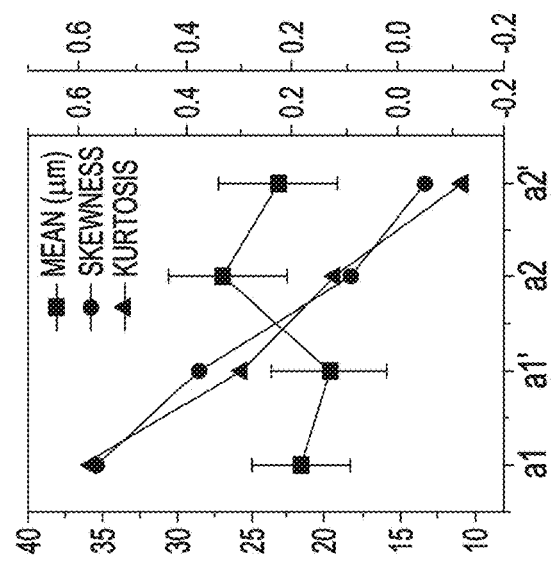
FIG. 5g illustrates a1 and a1' distribution, in accordance with various embodiments.
Figure 5H:
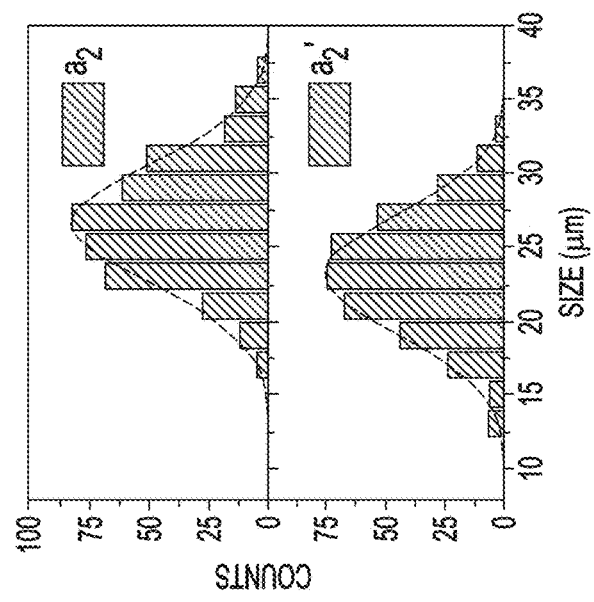
FIG. 5h illustrates a2 and a2' distribution, in accordance with various embodiments.
Figure 5I:
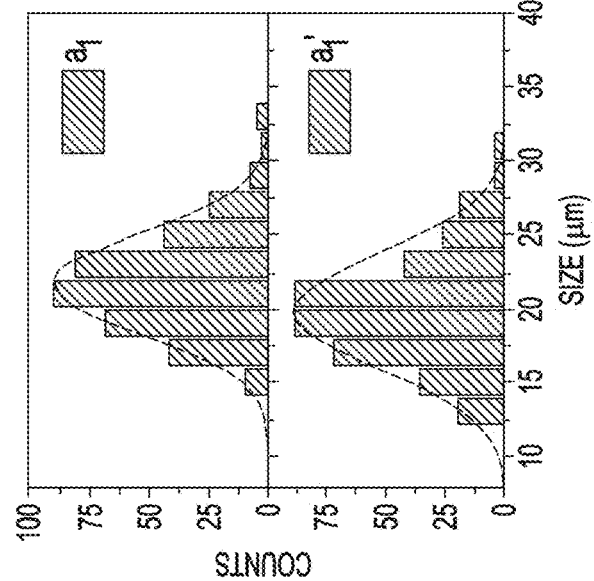
FIG. 5i illustrates statistical analysis of a1, a1', a2, and a2', in accordance with various embodiments.

FIGS. 5a-i illustrate that ULMCS biomimetic templating captures fin differences in templates: a) Macro- and microstructure of rose type 1 (red) with feature size labelled as a1; b) ULMCS deposited onto rose 1 template: c) Activated and lifted-off patterns from rose 1 with pattern feature size labelled as a1'; d-f) Macro/microstructure of a different cultivar. (a2), ULMCS deposition and pattern feature (a2') of rose 2 as template; g) a1 and a1' distribution; h) a2 and a2' distribution; i) Statistical analysis of a1, a1', a2 and a2'. To evaluate the resolution of BIOMAP different, but closely related, cultivars of roses were used as the template. Red rose, Mister Lincoln hybrid, (rose 1) has a feature diameter, $a_1=21.68\pm3.32$ µm (FIG. 5a). The Pink rose, Rosa Peace (rose 2) has a feature diameter, $a_2=26.63\pm4.00$ µm (FIG. 5b). Spin-coating of the same parent slurry onto similarly prepared petals was performed in an effort to capture differences in these templates. Patterns on rose 1 produces patterns with average feature diameter $a_1'=19.85\pm3.82$ µm (FIGS. 5b-c), a deviation of ~2 µm from the original pattern. We infer that the 10% size difference may emanate from deformation of petal features under capillary pressure and/or weight of deposited particles. For the second rose petal, the average size of templated patterns $a_2'=23.23\pm3.98$ µm (FIGS. 5e-f), indicating a deviation of ~3 mm from the template. These differences are also captured as shifts in Gaussian means of the resulting histograms (FIGS. 5g-h). Whereas the shape of the feature size distribution does not change from the petal to the BIOMAP surfaces—indicating good replication, higher moments (skewness and kurtosis) confirm that these subtle changes are systematic errors (FIG. 5i). FIG. 5i summarizes the average, variance, skewness, and kurtosis, indicating precision and reproducibility of BIOMAP. The ability of BIOMAP to capture subtle differences in two cultivars of the same plant may open opportunities in structural taxonomy where biological subspecies can be identified through their structure dimensions.

Figures 6A, 6B:
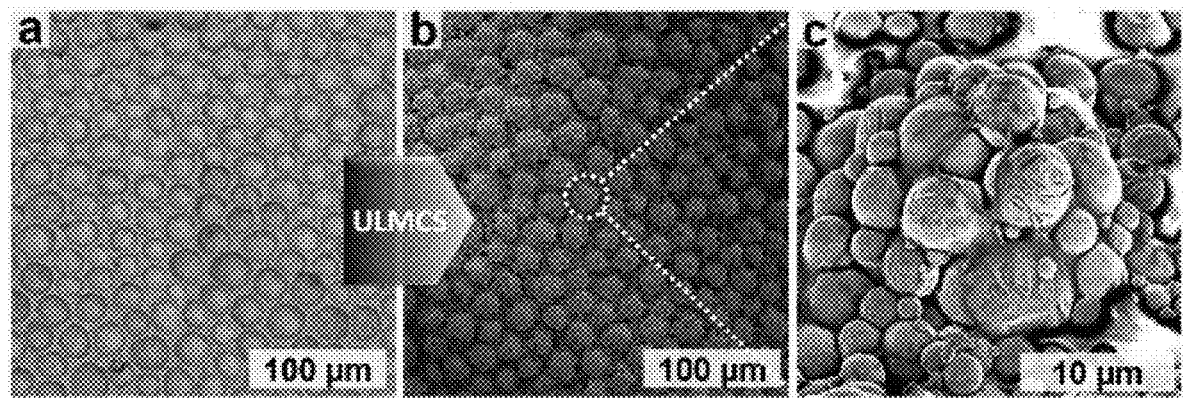
FIG. 6a, left side, illustrates an inverse PDMS rose as the template for creating a metallic rose replica shown in the right side of FIG. 6b, in accordance with various embodiments.
FIG. 6b illustrates a zoomed-in portion of the right side of FIG. 6a, in accordance with various embodiments.

Despite the high reproducibility discussed above, all the produced features are inverse reliefs of the natural pattern. Having successfully captured the female (−) version of the rose pattern, we inferred that an analog of the natural rose (male, +) pattern can be obtained by first creating a female mold from an elastomer, PDMS, then using BIOMAP to create a pattern similar to the rose petal. FIGS. 6a-f illustrate a process of creating a metallic and PDMS rose replica. a) (left side) Inverse PDMS rose as the template for creating metallic a) (right side) rose replica and b) associated zoom-in. c) (left side) inverse metal rose pattern used as a mold for PDMS, c) (right side) fabricated PDMS male rose patterns. d) zoom-in feature. e) Static contact angle formed by water droplets on formed surfaces. Difference between analogous structures on rose, metal, and PDMS, referenced to non-patterned PDMS (marked with top dotted line) and chemical activated ULMCS (marked with bottom dotted line). f) droplet shape variation on metal rose surface when the surface is tilted to 30, 45, 60 and 90 degrees. FIG. 6a-f show how robust BIOMAP is in generating a synthetic rose pattern. First a female (−) template is fabricated through replica molding with PDMS from the rose petal surface (FIG. 6a, left side). The PDMS mold is filled with ULMCS particles that are then sintered via CUPACT and patterns lifted-off as described above (FIG. 6a, right side, and FIG. 6b). A (+) ULMCS pattern is fabricated albeit with larger gaps in between the features compared to the rose flower (FIG. 5a), due to retention of sphericity of the particles after CUPACT (FIGS. 2c-d).

Figures 6C, 6D:
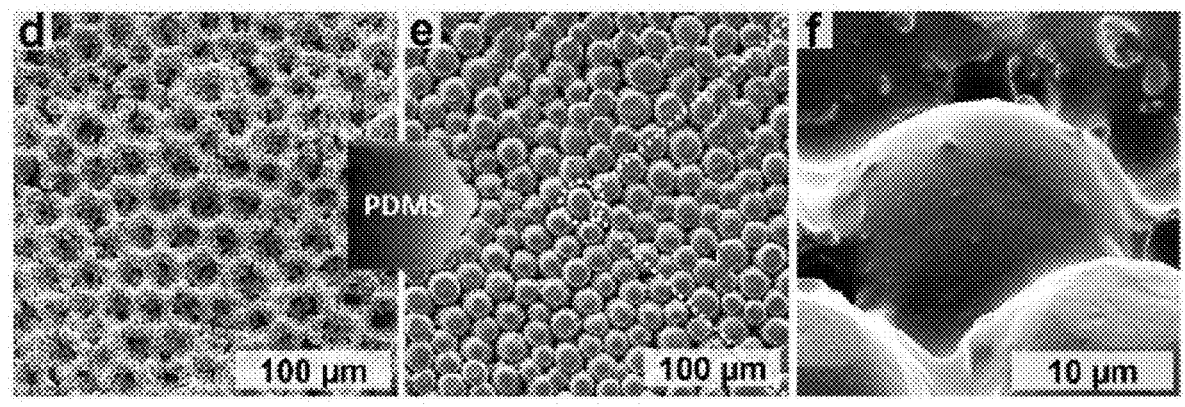
FIG. 6c, left side, illustrates an inverse metal rose pattern used as a mold for PDMS, in accordance with various embodiments.
FIG. 6d illustrates a zoomed-in portion of the right side of FIG. 6c, in accordance with various embodiments.

Despite the limitations in creating a fully continuous smooth surface, we demonstrate the closest analog of a metallic rose surface (FIG. 6a, right side) fabricated through physical chemistry and chemical kinetics principles. Besides the new surface texture, we also inferred that the metallic (−) relief replica of the petal surface can be used as a mold to generate an elastomeric analog of the rose petal since capillary forces would inhibit viscous uncross linked elastomer from permeating the pore network. Using our previously fabricated patterns (FIG. 6c, left side), we filled the metallic (−) features with PDMS, cross-linked it, and upon lift-off generated a (+) relief pattern analogous to the rose petal—albeit derived from PDMS (FIG. 6c, right side, and FIG. 6d). FIGS. 7a-g illustrate pattern feature sizes of metal rose (a) and PDMS rose (b); (c) Statistical summary of distribution fittings of metal and PDMS rose compared with rose template; (d-g) water droplet shape change on fresh rose petal surfaces tilted to 30, 45, 60 and 90 degrees. A 10% decrease in feature size was observed when the metal was used to lift-off patterns from the rose petal, there was no significant changes in feature sizes when the metal was used as a mold to create PDMS features (FIGS. 7a-c) or the rose features were lifted off with PDMS (FIG. 6c, right side, and FIG. 6d). These results further confirm our inference that capillary pressure and density difference likely cause the small feature shrinkage. We can, therefore, infer that BIOMAP is a versatile ambient condition method of replicating surface patterns from soft and delicate substrates using metals. Both positive and negative reliefs can be made with a high degree of accuracy and reproducibility, over large areas of surfaces. This enables soft lithography with a higher modulus, stiffer, solvent insensitive, lift off material without damaging the delicate substrate.

Figure 6F:
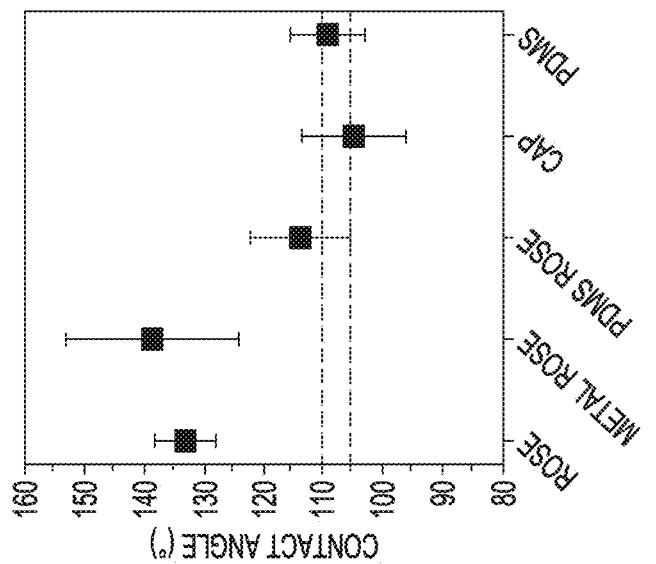
FIG. 6f illustrates droplet shape variation on metal rose surfaces when the surface was tilted to 30, 45, 60, and 90 degrees, in accordance with various embodiments.
Figure 6E:
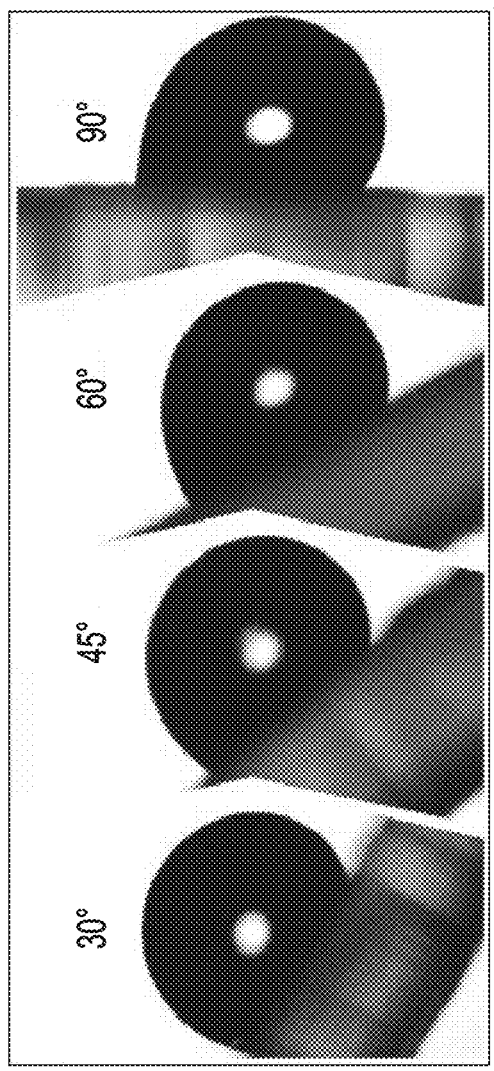
FIG. 6e illustrates static contact angles formed by water droplets on formed surfaces, in accordance with various embodiments.

Despite the structural differences, however, the wetting properties of the native and replicated rose patterns are comparable. FIG. 6e shows similarity in hydrophobicity measured through contact angle of water droplets on the biomimetic surface. The as-purchased rose petal was ultra-hydrophobic with an average contact angle of 133.1±5.0° whereas the biomimetic replica. (+) ULMCS pattern (FIG. 6a, right side), gave an average contact angle of 138.7±14.7°. The PDMS rose replica showed a lower contact angle of 115° (FIG. 60. Non-textured CUPACT sintered particles (CAP, FIG. 6f) and cured PDMS were used as references (FIG. 6f, dotted lines). Droplets on untextured sintered particle surfaces slowly diffused into the porous surface shows transient hydrophobicity. We infer the slight hydrophobicity observed on the sintered particle bed to be due to the presence of an essential methyl terminated surface ligand used to stabilize ULCMS. To further compare the wetting between the biomimetic and nature patterns, we tilted the droplets sitting on BIOMAP rose pattern (FIG. 6a right side) to illustrate the petal effect (FIGS. 7d-g). We observe that, as expected, the droplet adheres to the surfaces albeit with a large contact angle hysteresis with increase in tilt angle (FIG. 6f).

In conclusion, we demonstrate a method to fabricate biomimetic metallic patterns from delicate soft substrates, herein a rose petal. Exploiting versatility of the SLICE method to prepare ULMCS particles, resolution in replication can be improved by incorporating smaller particle sizes. The fabricated features closely mimic the bio-analog both in structure and wetting properties albeit with subtle diversions, artefacts of the BIOMAP processing method and asymmetry in material properties. Replication of the patterns with BIOMAP shows high accuracy and reproducibility, illustrating that ambient autonomous process can be used to overcome challenges in processing conditions. We hypothesize that BIOMAP, being compatible with a wide range of working conditions may find use in structural anatomy. e.g., identification of variants based on differences in expressed features as demonstrated here with rose petals or in structural materials where controlled wetting has implication in diverse fields as corrosion and heat transfer. BIOMAP advances soft lithographic methods by employing physical-chemical (CUPACT, jamming, undercooling, capillary densification) processes.

Part II. Polydispersity-Driven Printing of Conformal Solid Metal Traces on Non-Adhering Biological Surfaces.

Materials: Field's metal (eutectic indium, 51%-bismuth, 32.5%-tin, 16.5%) was purchased from Rotometals Inc. Glacial acetic acid (99.7%), ethyl acetate (99.9%) were from Fisher Scientific. Diethylene glycol (99.9%) was purchased from VWR. 2-Hydroxyethyl cellulose (~720,000 $M_v$) was purchased from Aldrich Chemistry. Preserved cow brain and cow heart were purchased from Bio Corporation, the samples were stored in a refrigerator and thawed before use. Bone samples were purchased from a local supermarket and boiled 3× in a pressure cooker before use—these cow femur sections are commonly sold as soup bones.

Self-Filtration.

Figure 8A:
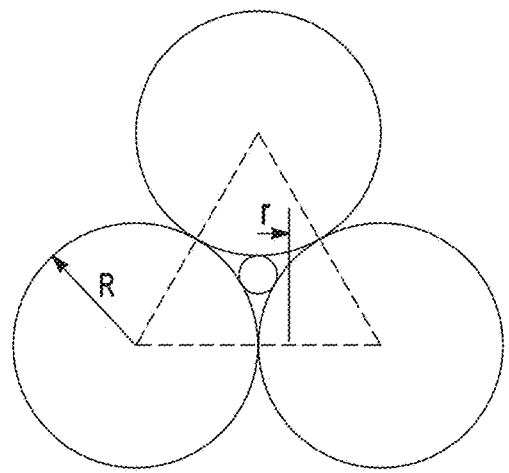
FIG. 8a illustrates a schematic of self-filtration in 3 Hertzian spheres, in accordance with various embodiments.
Figure 8B:
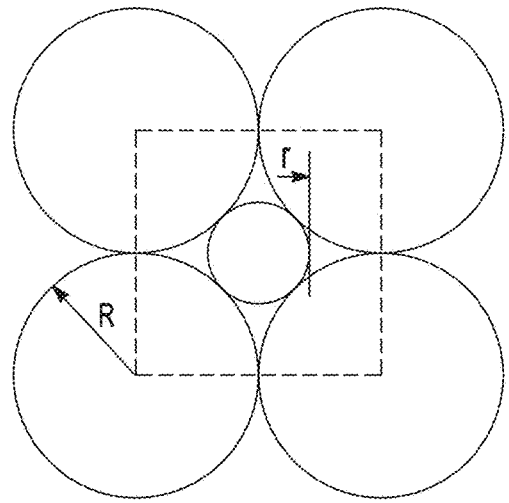
FIG. 8b illustrates a schematic of self-filtration in 4 Hertzian spheres, in accordance with various embodiments.
Figure 8C:
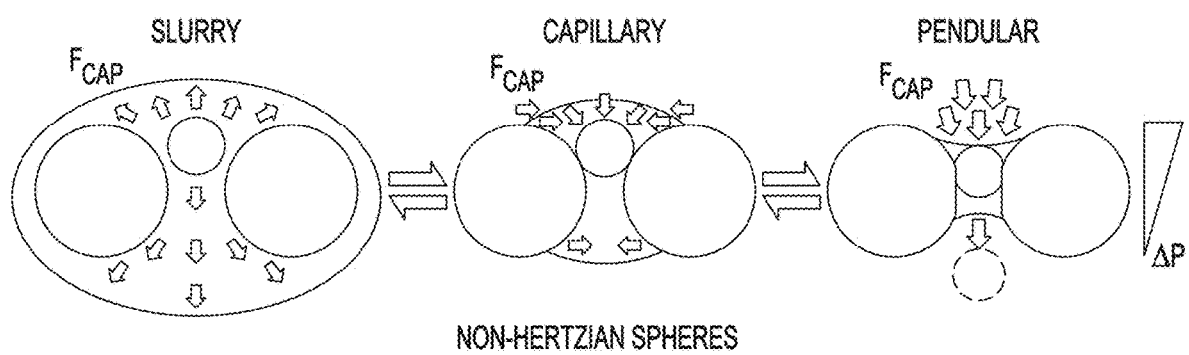
FIG. 8c illustrates a schematic of self-filtration in non-Hertzian spheres, showing the reversible process through slurry, capillary and pendular states, in accordance with various embodiments.

The driving force for particle migration through self-filtration has been modeled based on particle pressure. The particle pressure, $\Pi$, is the mean normal stress exerted by the particles in a sheared suspension. Under shearing conditions with pressure $\Pi$, these particles will tend to spread leading to liquid replacing particles. This generates an equal but opposite suction pressure in the liquid, $\Pi_{liq}=-\Pi(\dot{\gamma}, \phi)$, where $\dot{\gamma}$ is the shear rate and $\phi$ is the solid fraction. The shear rate, $\dot{\gamma}$ is further defined as $\dot{\gamma}=K(x)(\mu g H_1/\eta_s)$, where $K(x)$ accounts for spatial variation in shear rate from contraction, $\rho$ is density, g is gravitational acceleration, H is height of particle suspension from the exerted pressure and $\eta_s$ is the solid viscosity. FIGS. 8a-c Schematically illustrate self-filtration for particles bearing different ratios in their radii. FIGS. 8a-c illustrate a schematic of self-filtration in (a) 3 Hertzian spheres and (b) 4 Hertzian spheres; (c) Non-Hertzian spheres, displaying the reversible process through slurry, capillary and pendular states.

Kulkarni et. al. (S. D. Kulkarni. B. Metzger. J. F. Morris, *Phys. Rev. E* 2010, 82, 010402), developed a mechanistic model for self-filtration based on pressure differences in concentrated suspensions. Previous constitutive models and simulations at uniform shear and $\phi$ have shown that pressure on these particles can be expressed as $\Pi=\eta_n\dot{\gamma}$ for non-Brownian (granular) suspensions, where $\eta_n$ is the normal stress viscosity of the suspension. Combining the local particle pressure $\Pi$ and shear rate $\dot{\gamma}$, an approximation can be created where.

$$\frac{\Pi}{\rho g H_1} \approx K(x) q(\phi) \quad (4)$$

Here, $q(\phi)=\eta_n/\eta_s$ is the ratio of normal to shear stress which will increase based on the solid fraction $\phi$. This relationship implies that for fixed configuration and $\phi$, particle pressure is independent of liquid viscosity. Variations in fluid pressure within the suspension is estimated from Darcy flow, creating a contraction and bulk region. Darcy flow will create a suction that draws the liquid towards the contraction. The suction force can be estimated as, $$\left(\prod_1 - \prod_2\right)_{\phi=\phi_{in}} = \left(\frac{K_1}{K_2} - 1\right)\prod_2 \quad (5)$$

The numbers 1 and 2 indicates different locations in the suspension, with $H_2 < H_1$. The flow of the liquid of the suspension relative to the particles ($\Delta V = V_1 - V_p$) is therefore:

$$\frac{\Delta V}{V_p} \sim \frac{\prod_2/\eta_s}{\rho g H_1/\eta_s} \sim \frac{\prod_2}{\rho g H_1} \quad (6)$$

Approximation of outlet fraction $\phi_{out}$, or the amount of self-filtration can be then written as, $$\phi_{out} = \frac{\phi_{in} V_p}{\phi_{in} V_p + (1-\phi_{in}) V_l} = \frac{\phi_{in}}{1+A\frac{\prod_2}{\rho g H_1}(1-\phi_{in})} \quad (7)$$

Where A is a dimensionless value calculated from Equation 5, which is ultimately dependent on K (spatial dependence of shear rate experienced by the particles). This value was determined to be ca. 0.34±0.04, based on empirical data.

Characterization and Statistical Analysis Methods.

SEM and EDS Characterization: The as-synthesized particles were imaged using scanning electron microscopy (FEI-SEM Quanta 250). Dilute suspensions of particles were drop-cast onto clean pieces of silicon wafer, attached onto an SEM stub (Ted Pella Inc.) using copper tape. An accelerating voltage of 10 kV at spot size of 3 and working distance of ca. 10 mm was used for the imaging. Images were obtained using an Everhart-Thornley secondary electron detector and low-kV high contrast detector (vCD) for backscatter images. Elemental mapping was carried out using Energy Dispersive X-ray Spectrometer (EDS). Accelerating voltage of 15 kV and a higher spot size of 5, a working distance of 10 mm was used to attain high spectral resolution. Maps were taken at 1024-pixel resolution with 500 μs dwell time.

Light Microscopy Imaging of tissue Cross-Sections: Images were taken using a Zeiss AxioZoom V.16 using Zen Pro software (www.zeiss.com) to create extended depth of focus images from original z-stack multi-image collections.

Particle Size Analysis: Particle size analysis were done using the ImageJ software using the images taken from SEM. Scales are set to be constant due to images taken at same magnifications. These images were converted to binary and then threshold adjusted to display clear black and white circles for the particle analyzer to distinguish. The watershed function was then activated to create clear boundaries between particles that are overlapping or close to each other. Some corrections in the threshold is done by hand. The analyze particle function was then run at high sphericity 0.5-1.0 to highlight and measure the dimension of each circle found on the image. Collected data was then plotted and analyzed in Origin.

Differential Scanning Calorimetry (DSC) analysis: DSC Q2000 from TA Instruments were used to investigate phase change behavior of the synthesized undercooled metal particles. ~10 mg of undercooled metal particles were deposited to hermetically sealed aluminum pan, an empty aluminum pan was also used for the reference pan. These samples were then placed into the system. The DSC process was run using liquid nitrogen cooling and helium purge gas at 50 ml/min. The samples were then run through a heating/cooling process as follows, 1. Equilibrate at 40° C., 2. Ramp 10° C./min to 100° C., 3. Ramp 10° C./min to −70° C. and then 4. Ramp 10° C./min to 100° C. The final ramp process shows the original melting peak of the metal that may not be visible in the first cycle due to high undercooling yield.

Resilience and resistivity measurements: The measurements were done using a Keithley 6430 Sub-Femtoamp Remote Sourcemeter. For traces on paper two electrodes were attached to two 0.002 mm$^3$ EGaIn droplet pre-deposited on each side of the sample, 0.9 cm apart from each other. The resistance was measured by taking IV curves from 0 to 1V for 10,000 cycles and an average trace generated based on this data. Over the course of 10.000 cycles, the current remained around 45 mA consistently. For traces on the brain, one electrode was connected to a small EGaIn droplet attached onto the particle circuit, while the other electrode is a gold needle piercing into the particle line. The IV curve was taken between 1V to 5V, and 1,500 IV sweeps were taken. The current started off high, up to around 0.5 mA, where the LED attached to the circuit can be visibly observed lit. After the first 200 cycles, the circuit entered a second phase, where the resistance remained around 0.5-1 MΩ. The stable phase remained through the 1,500 cycles, where the EGaIn droplet electrode detached from the circuit due to Joule heating and induced shrinkage of the fixed tissue—a phenomenon not expected in live tissue.

Statistical Analysis of particle size distribution: Skewness and Kurtosis of the distribution were determined using equations:

$$\text{Skewness} = \frac{\sum_{i=1}^{N}(\frac{x-\mu}{\sigma})^3}{N} \quad (7)$$

$$\text{Kurtosis} = \frac{\sum_{i=1}^{N}(\frac{x-\mu}{\sigma})^4}{N} \quad (8)$$

Where $\mu$ is the mean and $\sigma$ is the standard deviation, and N is the population of the sample. The raw data was then distributed into 50 equally spaced bins to form a probability distribution and normalized to have total probability (area underneath the curve) equal to one.

A skewed normal distribution, using equation:

$$P(x) = \frac{2}{\sigma\sqrt{2\pi}} e^{-\frac{1}{2}(\frac{x-\mu}{\sigma})^2} \int_{-\infty}^{x} \frac{2}{\sigma\sqrt{2\pi}} e^{-\frac{1}{2}(\frac{\alpha t-\mu}{\sigma})^2} dt \quad (9)$$

was then fitted to match the probability distribution of the data. Here, both $\mu$ and $\sigma$ were acquired as fitting parameters while $\alpha$ is the skewness calculated previously.

Example 1. Experimental Procedures

Undercooled particles synthesis: Undercooled metal particles made from Field's metal were synthesized following the SLICE method. Applications of mechanical work are often utilized in synthesis of colloidal metal particles. Processes such as sonication, droplet emulsion technique (DET), microfluidic, and gas atomization utilizes shear stress through various media to divide bulk molten metal into particles in the micro- and nano-regime with high yields. Droplet formation mechanism ultimately relies on the Plateau-Rayleigh limit (i.e. $r_{droplet}$>1.5 $r_{cylinder}$) to which the applied forces on the liquid are responsible to separate these droplets from its cylindrical form. The work distribution in such process are dictated heavily by the surface of the material since acts as an active energy barrier and dynamic dissipation boundary of a system. Previous study shows that the mechanical limit of this applied work is proportional to the Laplace pressure jump condition ($W_{limit} \approx \Delta P = 2\gamma/R$), hence, comparable amount of non-expansive work in the form of interfacial surface tension ($\gamma_{int}$) is simultaneously being done to the system during synthesis. Utilizing this translated surface work allows for the fabrication of undercooled liquid metal droplets with tunable metastability dependent on size and curvature. Non-expansive work ($\delta w'$) is derived directly from $\gamma_{int}$ at a given surface area, in the micron- to nano-scale the surface area-to-volume ratio of a droplet exponentially increases, resulting in a surge of surface stress into the system (FIG. 9$a$). This stress, in turn acts as a hypothetical energy barrier ($E_a \approx \Delta G$) that stabilizes these undercooled metal particles in ambient conditions.

SLICE Synthesis Method: 200 ml of diethylene glycol was preheated in a commercial soup maker (Cuisinart SBC-1000) using its built-in heating element at maximum setting. The glass jug of the soup maker was wrapped in heating tape to help create a uniform temperature gradient across the whole system. The heating tape was connected via a variable transformer and was set on 140V output with setting at half maximum. Diethylene glycol was transferred into the soup maker and preheated to ~110° C., Field's metal pellet (~10 g) were then added and equilibrated for 2 minutes. Once ready, 2 ml of glacial acetic acid were added into the mixture and the metal were then sheared at various time and shear rate. The soup maker had 4 built-in shear settings where each setting is 6000, 9000, 13000 and 17000 rpm respectively (measured using an infrared tachometer). The slurry was then cooled to ambient in ethanol, then filtered with Whatman GF/F paper filter placed on a Buchner funnel. Filtered particles were washed with copious amounts of ethanol, then stored in ethyl acetate.

Preparation of Field's metal ink for direct printing: Methanol and water were mixed in a 1:1 solution to form the carrier fluid. Hydroxyethyl cellulose (HEC) (2%, 0.02 g/mL) was dissolved in the carrier fluid while stirring at 70° C. The solution was then cooled to room temperature. A 75 wt % metal ink was then created by adding the cellulose solution into dried ULMCS particles. The dispersion was homogenized using a vortex mixer (Fisher brand). Deposition of the slurry was done either with a paint brush onto a screen made from painter's tape or using direct deposition using pipet.

Chemical Sintering: CUPACT method was previously published in A. Martin, B. S. Chang, Z. Martin, D. Paramanik, C. Frankiewicz, S. Kundu, I. D. Tevis, M. Thuo, *Adv. Funct. Mater.* 2019, 29, 1970278. Printed particles were dried out on desired substrates. Chemical fluxes were made using 60% v/v acetic acid diluted in ethanol and a drop of water. This flux was then applied on the particle film followed by drying under ambient conditions to sinter the particle bed.

Example 2. Results and Discussion

Figure 9C:
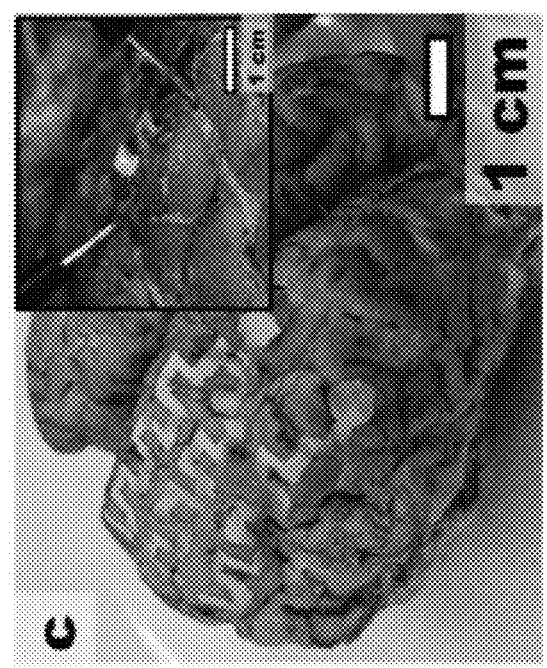
FIG. 9c illustrates a cow brain with printed circuits, with the inset showing activated LED soldered on the brain surface, in accordance with various embodiments.
Figure 9B:
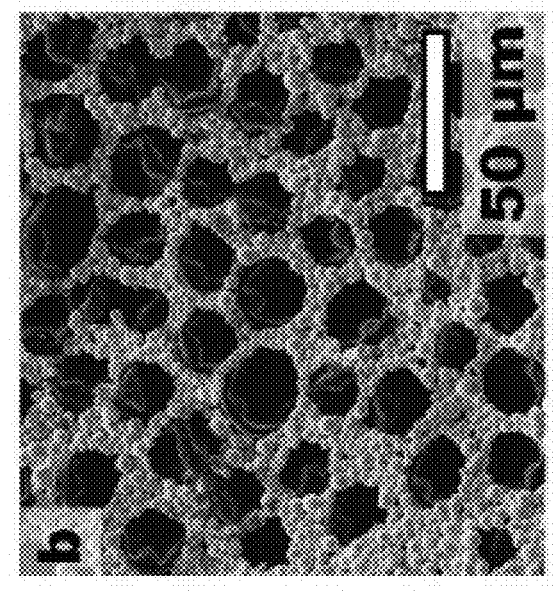
FIG. 9b illustrates SEM image of particles printed on a rose petal illustrating templating, in accordance with various embodiments.
Figure 9A:
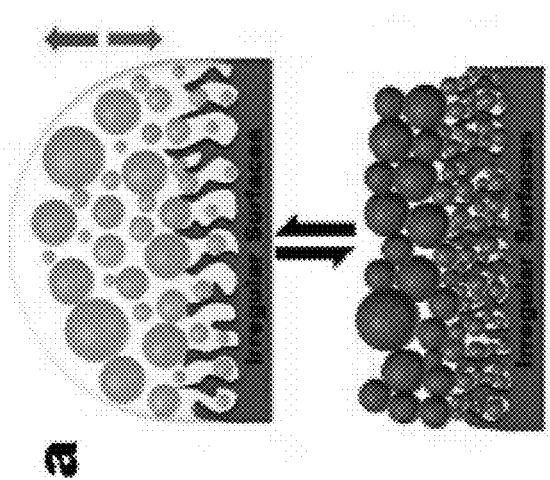
FIG. 9a illustrates a schematic of particle self-filtration and jamming on irregular surfaces, in accordance with various embodiments.

Deposition of solvent-suspended polydisperse metal particles onto textured surfaces forms a self-sorted tightly packed sediment through solvent evaporation-driven capillary self-assembly combined with self-filtration. FIGS. 9a-e illustrate the design of the universal printing method across varied surfaces; (a) Schematic of particle self-filtration and jamming on irregular surfaces; (b) SEM image of particles printed on a rose petal illustrating templating; (c) Cow brain with printed circuits (insert: activated LED soldered on the brain surface); (d) Schematic of the SLICE process with estimation plots that reveal magnitude of the effect of shearing speed; (e) Histograms and associated Gaussian fits of particle size distribution from different synthesis condition (right: low shear speed and left: high shear speed). Self-filtration is the process by which relatively large particles will clog or 'jam' when passing through pores/fissures (FIG. 9a). Solvent evaporation begins at the gas-liquid interface then penetrates through the self-filtered larger particles (FIGS. 8a-c). For soft deformable particles the drying process induces capillary-driven packing resulting in higher densification than in non-deformable analogues. This process leads to reversible convergence of the particle ensemble stress field (FIG. 8c). Solvent evaporation also generates a capillary pressure gradient allowing smaller particles to pass through gaps formed by jammed larger ones (FIGS. 8a-b). For the phenomena to occur, particle size polydispersity (large-to-small particle diameter) can be on the order of 1:3-7 (FIG. 8a-c). With decreasing dimensions, or over multi-scale pore dimensions, this process repeats ad infinitum leading to an autonomous size-differentiated packing of polydisperse slurries. Capillary self-assembly combined with self-filtration ensures that these particles are immobilized (jammed), creating a multi-layer self-locking particle bed (FIGS. 9a-b).

Figure 12A:
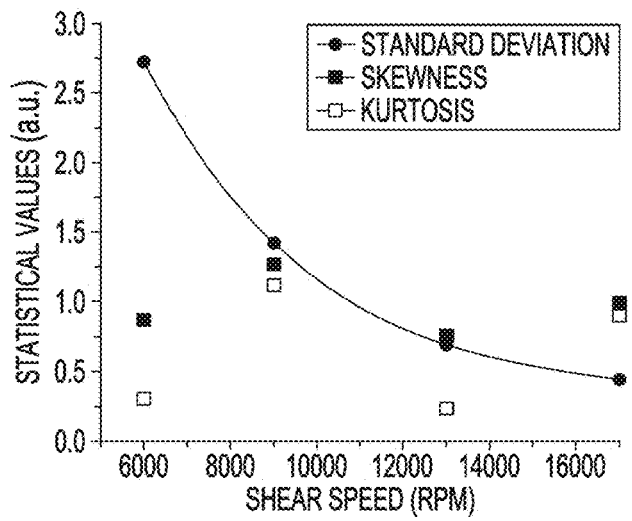
FIG. 12a illustrates change in statistical moments of particles sheared at different times, in accordance with various embodiments.
Figure 12B:
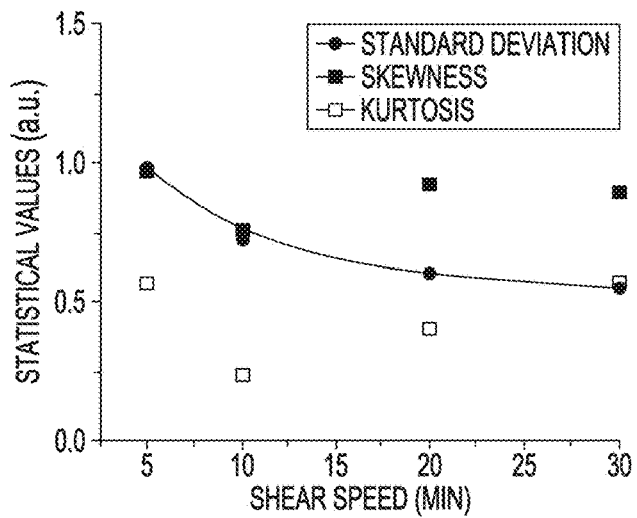
FIG. 12b illustrates change in statistical moments of particles sheared at different speeds, in accordance with various embodiments.
Figure 12C:
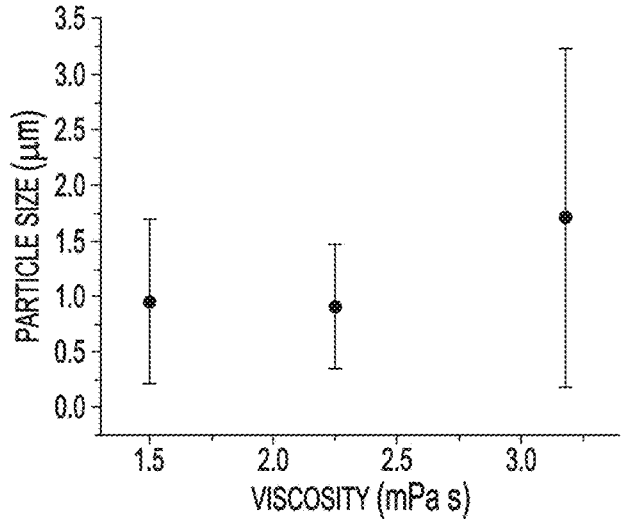
FIG. 12c illustrates changes in particle size as carrier fluid viscosity is changed, in accordance with various embodiments.
Figure 13A:
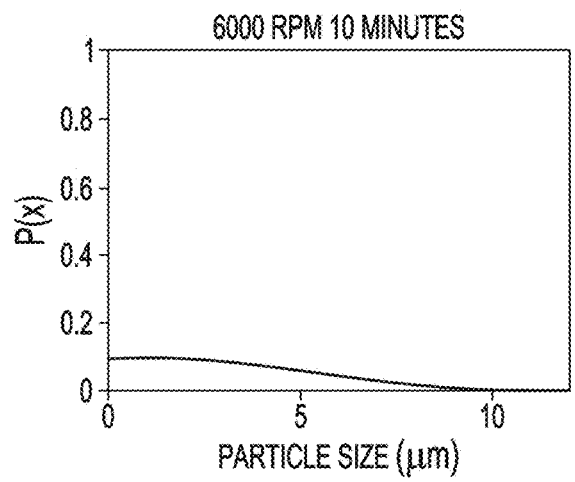
FIGS. 13a-d illustrate probability plots of particle size at different shear speeds, in accordance with various embodiments.
Figure 13B:
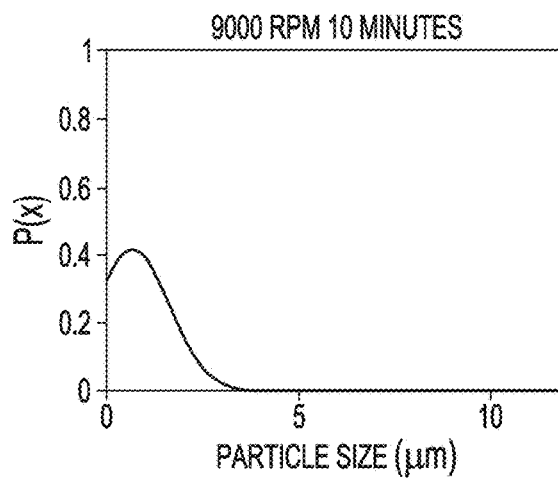
Figure 13C:
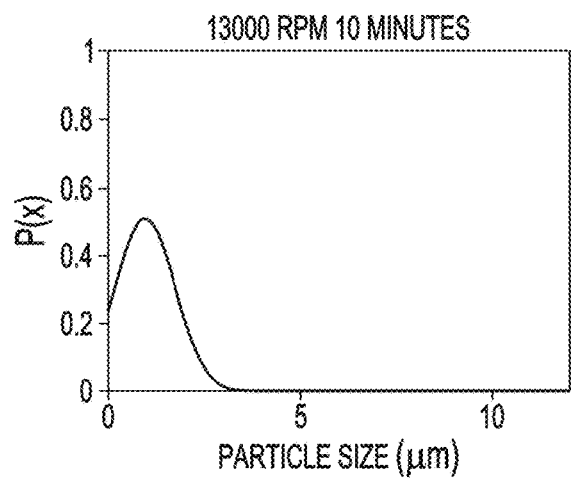
Figure 13D:
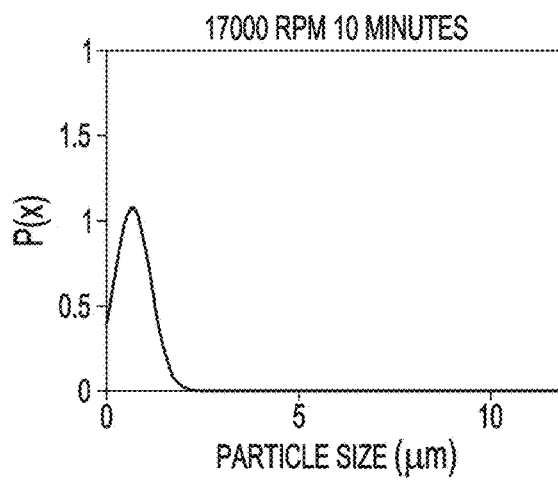
Figure 13E:
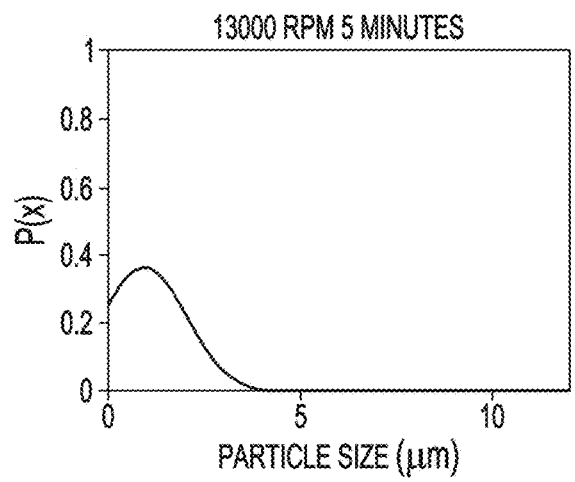
FIGS. 13e-h illustrate probability plots of particle size at different shear times, in accordance with various embodiments.
Figure 13F:
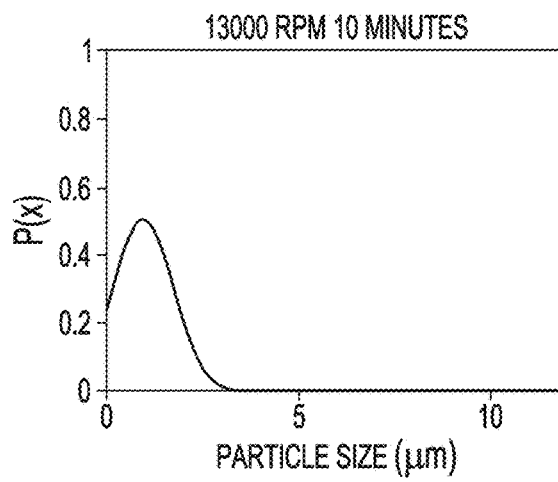
Figure 13G:
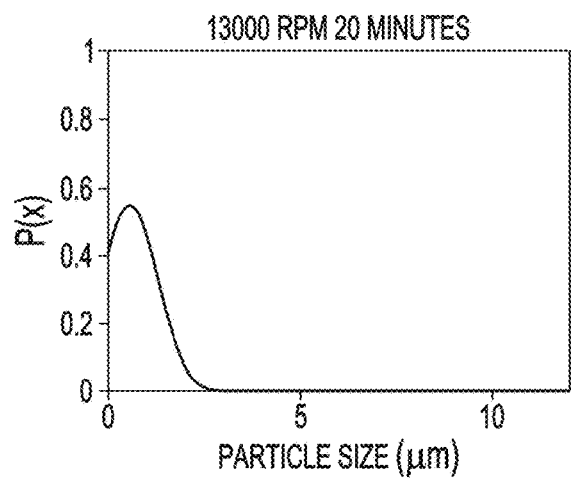
Figure 13H:
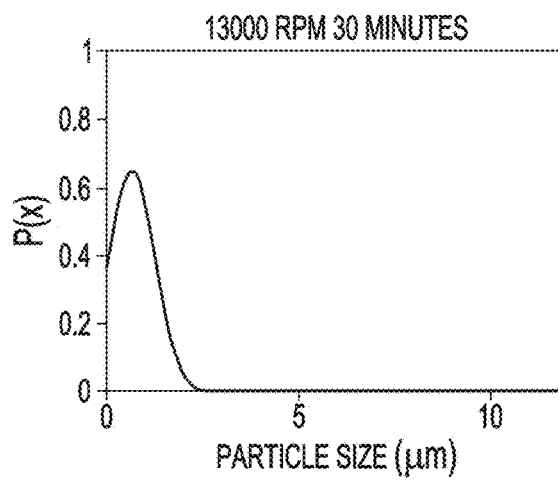

FIGS. 10a-d illustrate change in particle size distribution and undercooling for synthesized particles with change in shear rate ranging from (a) 6000 rpm, (b) 9000 rpm, (c) 13000 rpm and (d) 17000 rpm. FIGS. 11a-d illustrate change in particle size distribution and undercooling for synthesized particles with change in shear time ranging from (a) 5 minutes, (b) 10 minutes, (c) 20 minutes and (d) 30 minutes. FIGS. 12a-b illustrate change in statistical moments of particles sheared at (a) different times (b) different speeds. FIG. 12(c) illustrates changes in particle size as carrier fluid viscosity is changed. FIGS. 13a-h illustrate change of probability plots at (a-d) different shear speeds and (e-h) different shear times. FIGS. 10a-d shows histograms of particle size distribution with corresponding sample images from which these distributions were derived. A column showing raw DSC traces of one of the samples is shown. Similar data is also provided for our experiments investigating effect of time (FIGS. 11a-d). Having generated these distributions, we evaluate any correlations in processing conditions and shape of the distribution (captured by skewness and kurtosis). No clear trend in skewness and kurtosis (FIGS. 12a-b) can be observed but a gradual exponential decrease in the variance (standard deviation) is observed. As with particle size, shear speed (stress) showed a more rapid convergence in the spread than shear time. To ascertain that the applied work was critical, we altered the viscosity of the shear fluid (based on values at room temperature and ignoring temperature dependence). We observe that with a more viscous liquid, the distribution is large (FIG. 12c) likely due to lubricity on the surface of the particle and poor stress translation onto the surface of the particle (size is dictated by a balance between work done on the particle and opposing Laplace pressure jump). From the histograms, we normalize the spreads and extract probability plots leading us to conclude, as with the histograms, that the spread will give a single tail distribution (FIGS. 13a-h) which is confirmed by the estimation plots of undercooling (FIG. 14e).

Figure 9D:
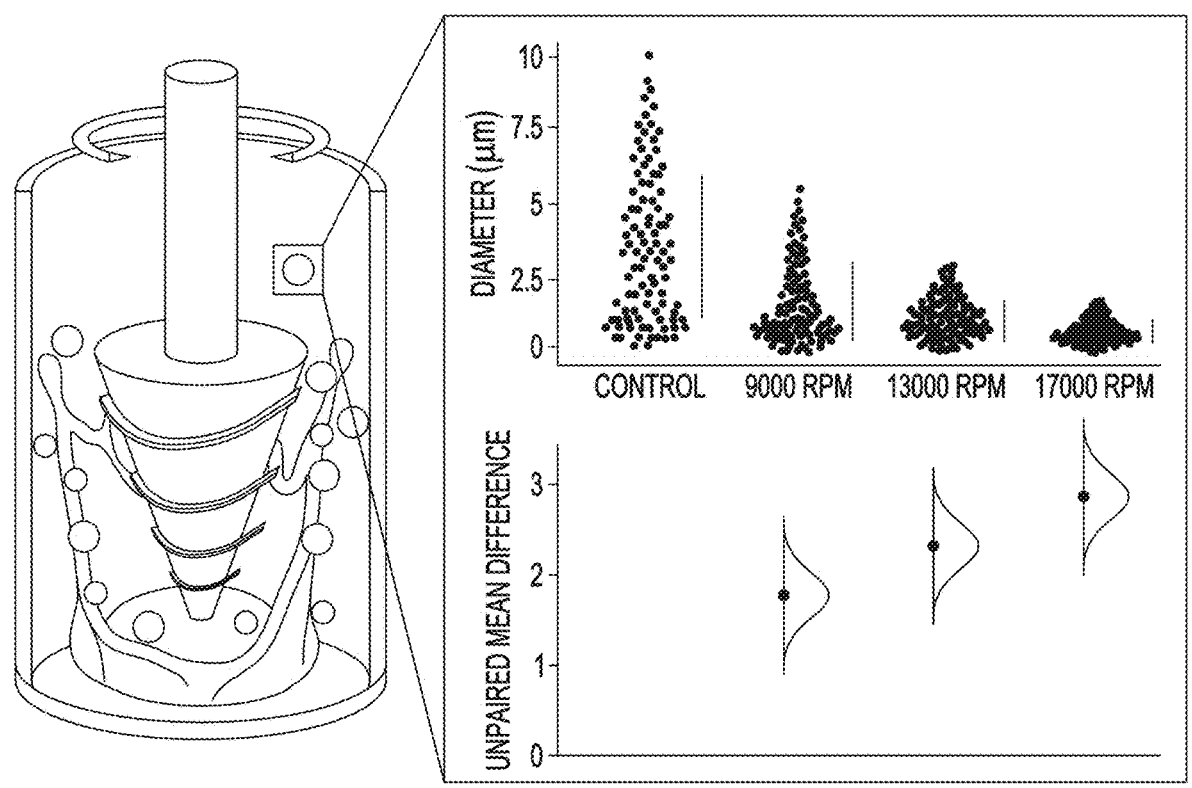
FIG. 9d illustrates a schematic of the SLICE process with estimation plots that reveal magnitude of the effect of shearing speed, in accordance with various embodiments.
Figure 9E:
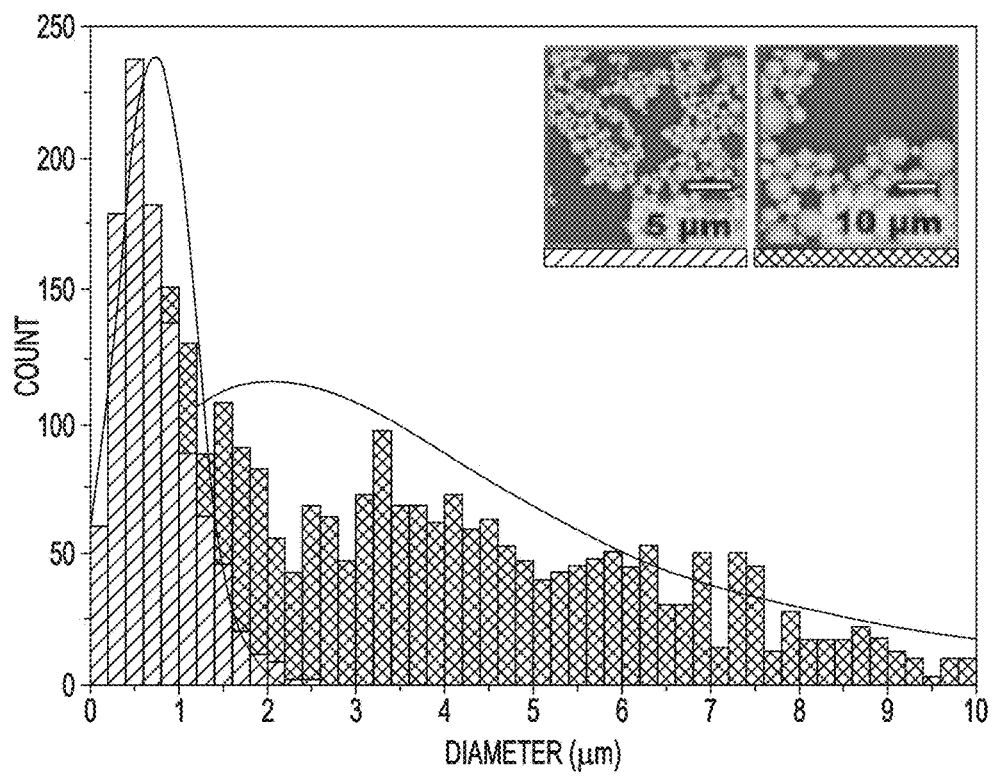
FIG. 9e illustrates histograms and associated Gaussian fits of particle size distribution from different synthesis condition, in accordance with various embodiments.
Figure 10A:
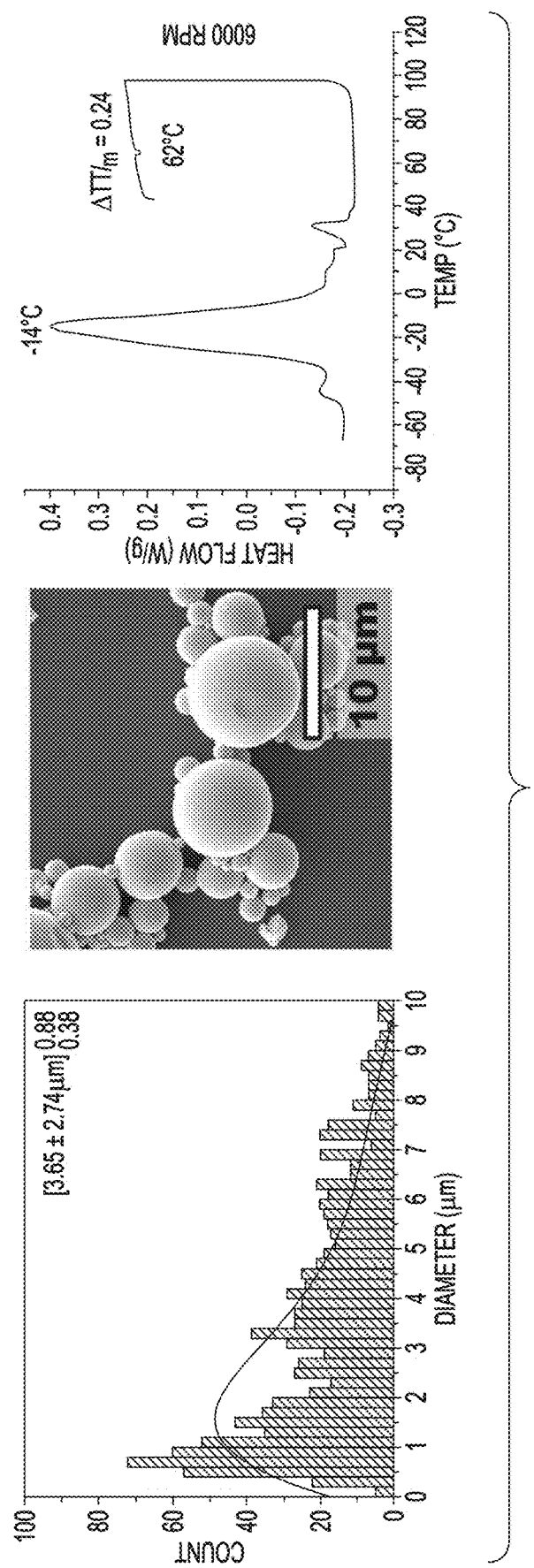
FIG. 10a a illustrates change in particle size distribution and undercooling for synthesized particles with change in shear rate of 6000 rpm, in accordance with various embodiments.
Figure 10B:
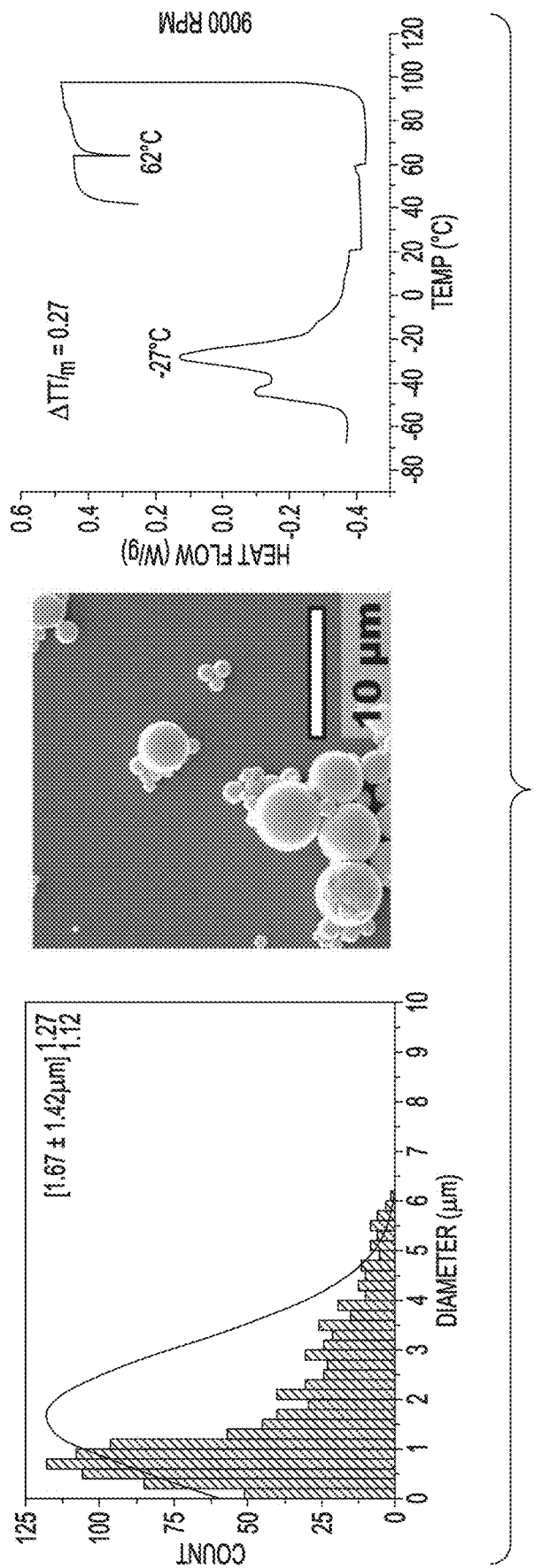
FIG. 10b illustrates change in particle size distribution and undercooling for synthesized particles with change in shear rate of 9000 rpm, in accordance with various embodiments.
Figure 10C:
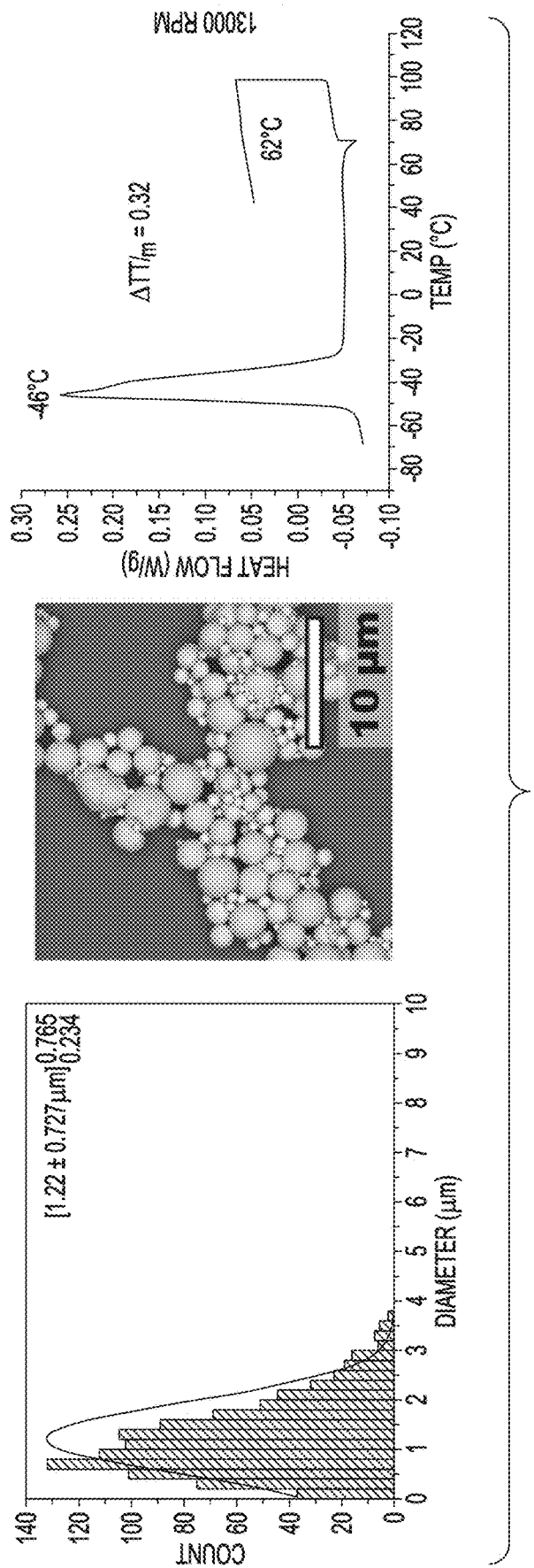
FIG. 10c illustrates change in particle size distribution and undercooling for synthesized particles with change in shear rate of 13000 rpm, in accordance with various embodiments.
Figure 10D:
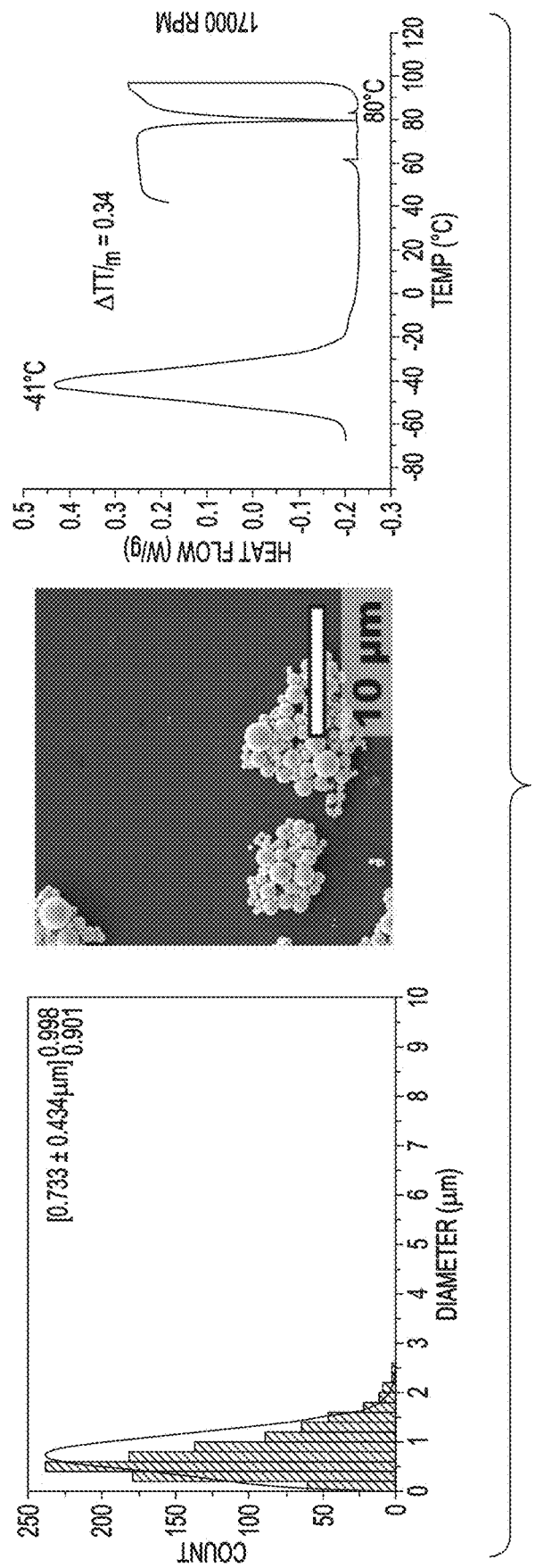
FIG. 10d illustrates change in particle size distribution and undercooling for synthesized particles with change in shear rate of 17000 rpm, in accordance with various embodiments.
Figure 11A:
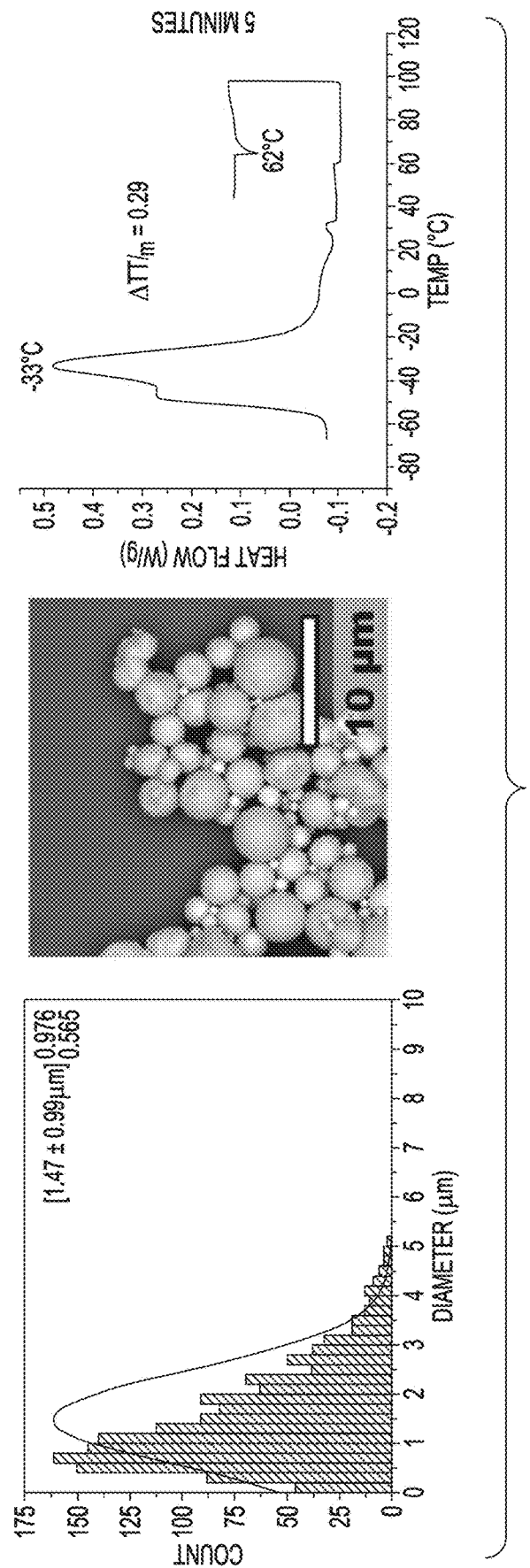
FIG. 11a illustrates change in particle size distribution and undercooling for synthesized particles with change in shear time of 5 minutes, in accordance with various embodiments.
Figure 11B:
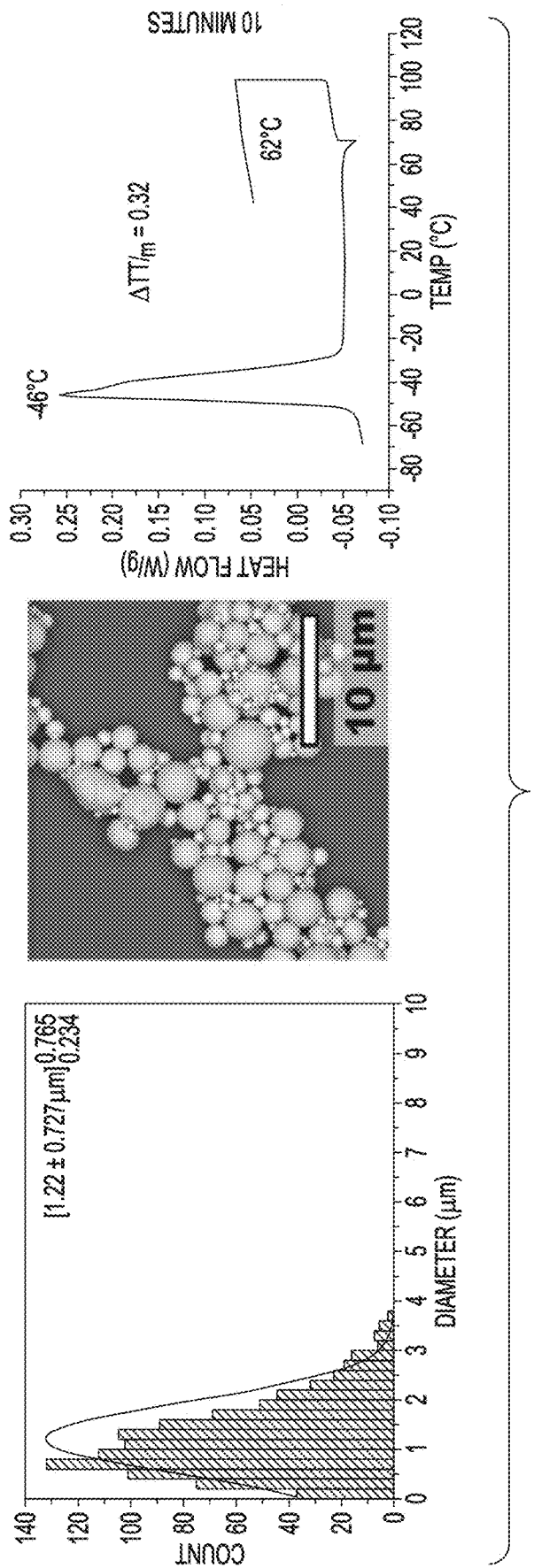
FIG. 11b illustrates change in particle size distribution and undercooling for synthesized particles with change in shear time of 10 minutes, in accordance with various embodiments.
Figure 11C:
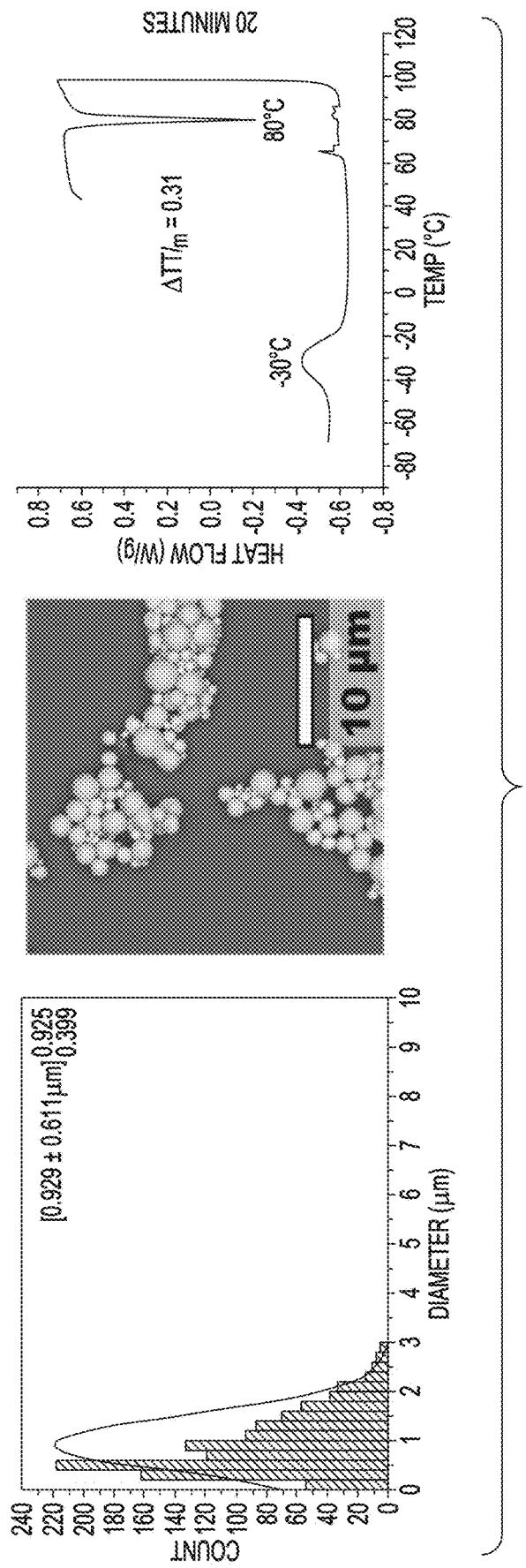
FIG. 11c illustrates change in particle size distribution and undercooling for synthesized particles with change in shear time of 20 minutes, in accordance with various embodiments.
Figure 11D:
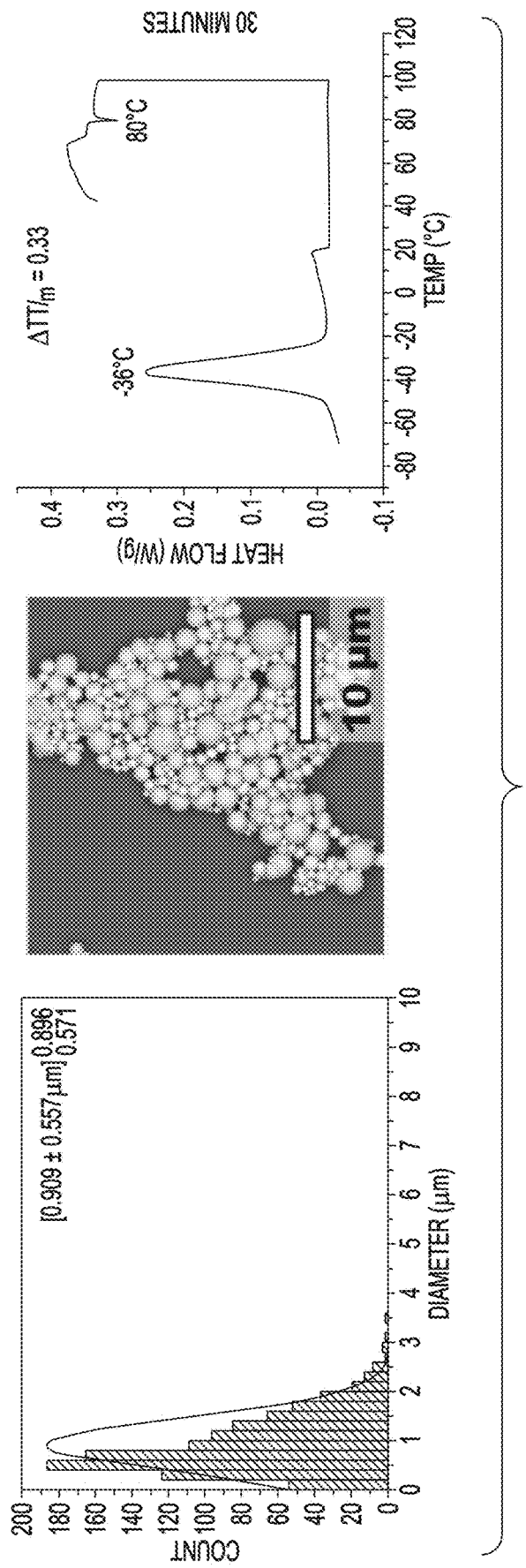
FIG. 11d illustrates change in particle size distribution and undercooling for synthesized particles with change in shear time of 30 minutes, in accordance with various embodiments.

The amount of self-filtration can be approximated through a pressure dependent relationship (Equation 10):

$$\phi_{out} = \frac{\phi_{in}}{1 + A \frac{\pi_2}{\rho g H_1}(1 - \phi_{in})} \quad (10)$$

Where $\phi_{out}$ is the outlet fraction of the self-filtering particle in solution. $\phi_{in}$ is the inlet fraction. A is a dimensionless value based on the spatial dependence in shear rate experienced by the particles (typically 0.34±0.04), $\Pi$ is particle pressure (compressive stress exerted by the particles under suspension), $\rho$ is density, g is gravitational acceleration, and H is height of the solvent. This equation predicts the amount of self-filtration by smaller particles between gaps formed by larger particles (FIGS. 8a-b) and further into the channels of textured surfaces. With further solvent evaporation, larger particles ultimately clog and get locked in place while smaller particles percolate through created gaps (FIG. 8c). The propensity to jam is related to the ratio of channel dimension to particle radius. This jammed state ensures that deposited materials are mechanically stabilized and, therefore, can be sintered into surface-templated conformal networks (FIGS. 9b and 9c). We infer, and demonstrate, that appropriately tuned particle polydispersity (FIGS. 9d-e, FIGS. S8a-e, FIGS. 10a-d, 11a-d, 12a-b) abets self-filtration and jamming on a wide-range of textured surfaces. In a multi-scale textured surface however, the wider the polydispersity the higher the likelihood of packing into all available fissures. Felicitous choice of processing conditions, backed by empirical statistical inferences in the Shearing Liquids Into Complex ParticlEs (SLICE) method, reliably gives desired particle polydispersity (FIG. 9d). It is, therefore, feasible that on multi-scale textured surfaces, polydisperse Undercooled Liquid Metal Core-Shell (ULMCS) particles can be tuned to enable autonomous size-driven percolative sorting and jamming leading to surface-templated printing of conductive metallic traces on surface energy mismatched surfaces. We demonstrate this concept over a range of biological substrates bearing varied surface asperities.

Here we also acquired the probability density function (PDF) associated with each of our data sets by curve fitting using a skewed normal distribution function. The probability of finding a particle with a size within any given interval can be found by integrating the PDF within the same interval. The probability plots provided below allows us to predict with confidence that we have the majority of our particles with below room temperature undercooling (>95% for shearing speed>9000 RPM), although the polydispersity can be large. Particle with large distribution that goes beyond 5 μm (FIG. 12a, although small) means that we could have some particles that would freeze above 25° C. which is confirmed in the DSC from FIG. 10a (small peak at ~30° C.), but the outliers within the population does not affect the overall average undercooling properties of the particles. Also, as shown in FIGS. 11a-d and 12a-b, the polydispersity of the distribution can be partially controlled by changing processing conditions, leading to even less outliers and improved convergence in the solidification peak. Therefore, fine tuning shearing time and speed, we can reliably control the distribution of particle size, creating population that remain liquid during the deposition process. All DSCs in FIGS. 10a-d and 11a-d display major peaks that sits below room temperature.

We infer that soft (deformable) ULMCS particles would show relatively higher packing ratio ($\Phi \approx 0.6$-$0.7$) and stress-driven densification compared to solid spheres. This densification is further abetted by attractive capillary forces. $F_b$, especially on reaching the pendular state in solvent-assisted deposition. Equation 11 shows that favorable wetting by carrier fluid enhances $F_b$ hence higher densification.

$$F_b = 2\pi b \gamma \cos \theta \qquad (1)$$

Where b is approximately 10% of particle radius $\gamma$ is surface tension, and $\theta$ is the Young-Dupré equation derived contact angle. With large particle size polydispersity, in a wetting carrier fluid, $F_b$ (Equation 11) and $\Pi$ (Equation 10) implies self-filtration and jamming. Incorporation of a kinetically-frustrated chemical trigger in the carrier fluid to induce heat-free sintering and phase change (so-called Coalescence of Undercooled Particles Through Chemical Trigger—CUPACT), results in solidification of the metal particles in their most conformal configuration. This delayed heat-free solidification of metals guarantees minimum perturbation of the underlying features and that the formed traces conform to surface features albeit limited by smallest particle size. The resulting porous network of metallic interconnects (particles joined only via loci of the capillary bridge), allows efficient fluid diffusion while offering stable conductive traces even on surface energy mismatched substrates. Herein, we validate this ansatz by: i) demonstrating a predictive approach to tuning particle size-polydispersity (FIGS. 9d-e), ii) Surface-feature templated deposition of ULMCS particles on surface-energy mismatched substrates—such as rose petals (FIG. 9b) and brain (FIG. 9c), iii) sintering the assembled particles to create electrically conductive traces, and, iv) exploiting fluid-solid duality of granular matter in a jamming-unjamming (convergence and divergence of stresses respectively) process (FIGS. 8a-e) to render fabricated traces recoverable via solvent-assisted shearing (akin to Reynolds dilation of wet sand).

Tunable Polydispersity: Packing and densification of granular matter strongly relates to particle size polydispersity and is enhanced by a positive skew in size distribution. To develop a generalized approach to tuning particle polydispersity, undercooled Field's metal (Bi: 32.5, In: 51, Sn: 16.5 wt %, $T_m$=62° C.) particles were synthesized via the SLICE method at various shear times and shear speeds (FIGS. 10a-d, 11a-d, 12a-b). To quantitatively delineate effect of processing conditions (time or shear) on size and degree of undercooling, we deployed statistics (probability plots, confidence bands, and estimation plots) tools to generate simplified design rules.

Figure 14A:
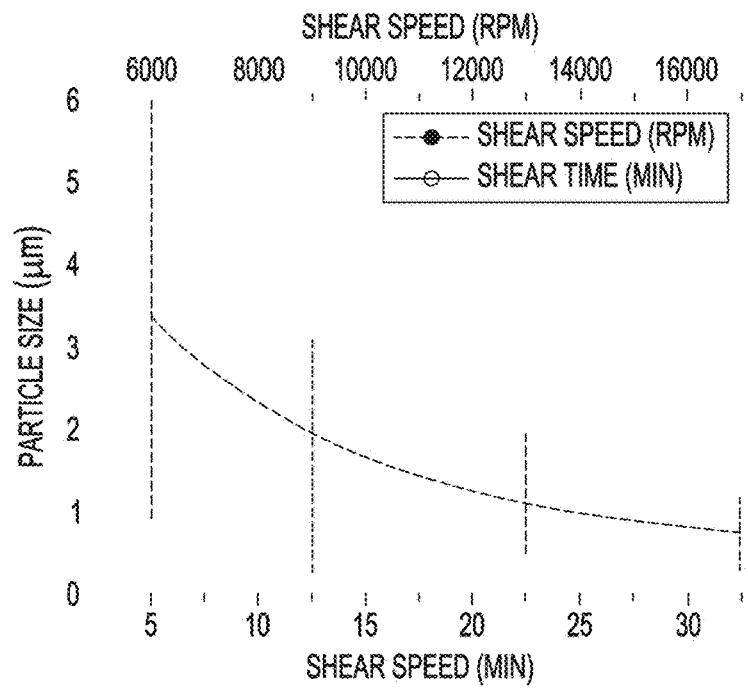
FIG. 14a illustrates statistical analysis showing dependence of particle size on synthesis condition, in accordance with various embodiments.
Figure 14B:
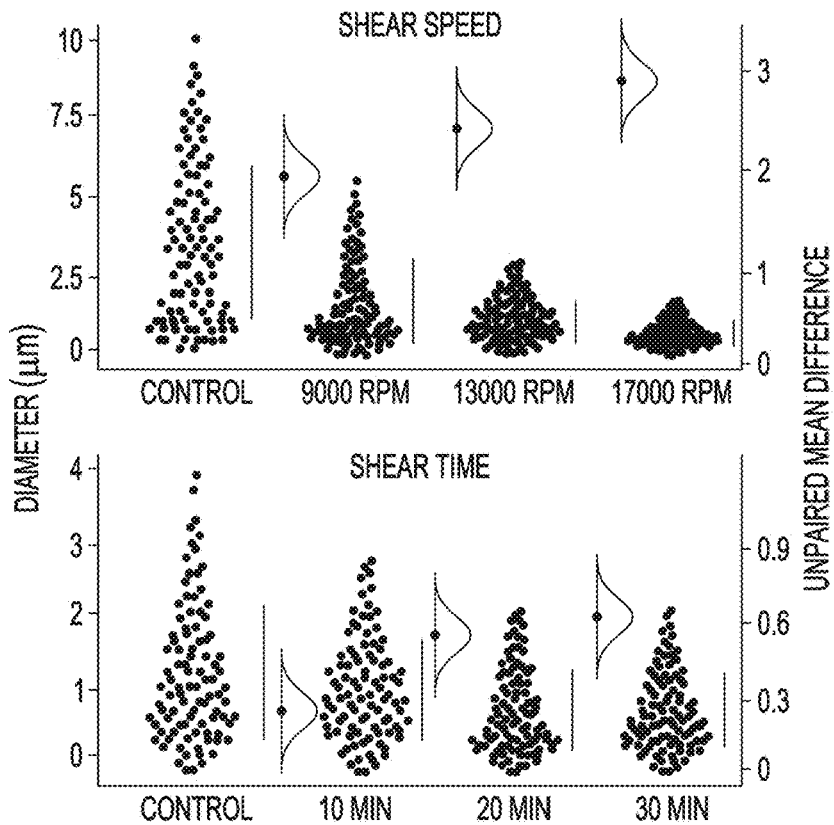
FIG. 14b illustrates statistical analysis showing differentiating magnitude of the effect of shear speed (stress) and shear time using estimation plots, in accordance with various embodiments.
Figure 14C:
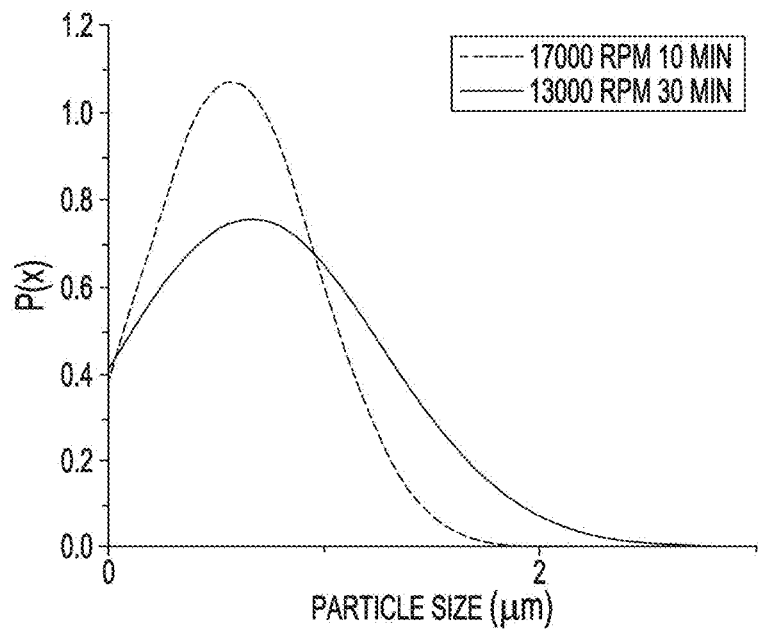
FIG. 14c illustrates statistical analysis showing representative Gaussian fits for evaluated maximum time and shear speed, in accordance with various embodiments.

To deduce effect of shear time, samples were sheared at 13,000 rpm for 5-30 mins. Similarly, to evaluate the effect of shear stress, all samples were prepared over 10 minutes but at 6000-17000 rpm. By keeping the shear tool, quantities of both processed metal and shearing liquid constant, rotor speed could be correlated to shear stress. FIGS. 14a-d illustrate statistical analysis of particle size polydispersity and undercooling of synthesized particles; (a) Dependence of particle size on synthesis condition, the lines are guides for the eye and are not meant to be fits to the data; (b) Differentiating magnitude of the effect of shear speed (stress) and shear time using estimation plots; (c) Representative Gaussian fits for evaluated maximum time and shear speed; (d) Effect of synthesis conditions on degree of undercooling. FIG. 14a shows trends in average particle size with change in shear time and shear speed (akin to stress). A general decrease in particle size is observed albeit with a larger response to speed than time. Reduction in particle size correlated with convergence in their size distribution (FIG. 14a-b). To quantify the magnitude of shear stress or shear time on average particle size, hence ascertain the most important parameter in engineering polydispersity, we utilized estimation plots (FIG. 14b). We observe that the unpaired mean difference is 5× higher for shear speed than for shear time. This affirms that, in the SLICE method, work done on the particle is significantly more important than any ensuing surface chemistry or equilibration. The unpaired mean for shear time rapidly asymptotes confirming that time is a limited parameter in tuning size distribution. Shear stress, however, shows a rapid increase over the entire evaluated range. By normalizing particle sizes distributions, polydispersity probability plots (FIGS. 14c and 13) are generated as guides to likelihood of attaining a desired size range.

Figure 14D:
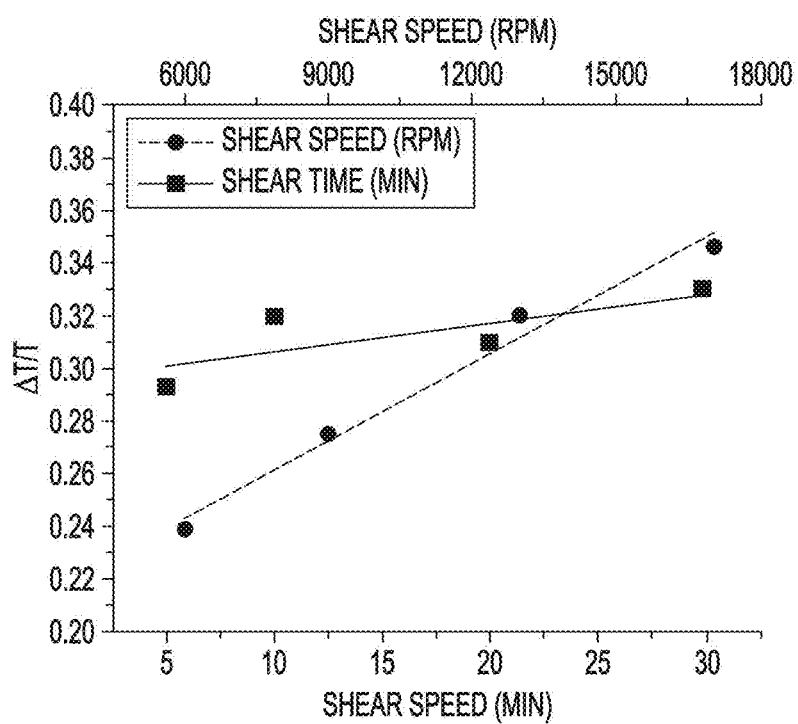
FIG. 14d illustrates statistical analysis showing effect of synthesis conditions on degree of undercooling, in accordance with various embodiments.

Effect of Polydispersity on Undercooling: Adopted synthesis conditions, however, should have no adverse effects on degree of undercooling ($\Delta T/Tm$) for the ansatz to be realized. Degree of undercooled is inversely correlated to particle size, hence, shear stress shows a rapid increase in $\Delta T/Tm$ than shear time (FIG. 14d). For ambient fabrication of Field's metal interconnected networks, a minimum $\Delta T/Tm \sim 0.11$ is needed, hence an upper limit of ~5 μm in the engineered dispersion. This prediction implies that particles need to be prepared at a shear rate≥9000 rpm (FIGS. 10a-d and 11a-d).

Figure 15A:
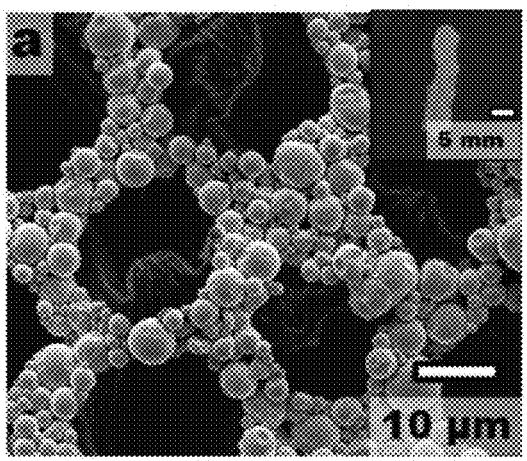
FIG. 15a illustrates SEM image of rose petal (false colored red) surface-templated metal particles after sintering through CUPACT, in accordance with various embodiments.
Figure 15B:
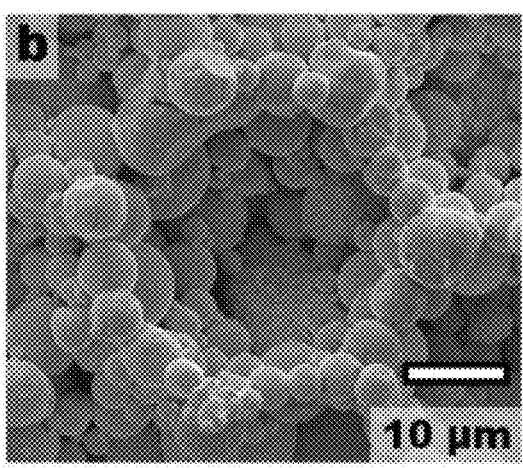
FIG. 15b illustrates template stripped patterns of particles sintered on rose petal displaying self-filtration, in accordance with various embodiments.

Universal Printing: Having established parameters to prepare polydisperse metal particle without loss of undercooling, we demonstrate use of capillary adhesion, self-filtration, and jamming to create physisorbed conductive traces between metals and an array of textured surfaces. First, we explored fit to multi-scale roughness on a rose petal given that bumps on a rose petal are <8.5 μm in height with a large slant (peak-width:mid-width ratio=1:3). This texture implies that for diameter≈4.5 μm, only a single particle can fit into the gloves, hence self-filtration occurs with the smallest particles settling at the bottom of the crevices (see FIGS. 9a-c). FIGS. 15a-j illustrate universal metal printing on various surfaces; (a) SEM image of rose petal (false colored red) surface-templated metal particles after sintering through CUPACT; (b) Template stripped patterns of particles sintered on rose petal displaying self-filtration and (c) SEM image of a cross-section of a line printed on paper with small particles false colored blue and larger particles red for clarity; (d) Line printed on the surface of brain's interior across a fatty flat region and a porous interlayer; (e) Metallic traces on the interior of the brain showing conductivity as soldered LED glows; (f) Metal printing on a cow heart, insert shows a close-up of the printed lines; (g) 200 cycles I-V curve and (h) resistance change over 20000 cycles on conductive line printed on paper; (i) 200 cycles I-V curve on conductive line printed on brain; (j) Resistance change overtime for repeated voltage cycle for conductive line printed on brain. FIG. 15a shows as-deposited particles (drop cast using 9000 rpm sample) on a rose petal, and as expected, larger particles are mostly trapped on top. The particles organize into hexagonal patterns across the petal surface templating the inter-bump space (FIGS. 9b and 15a).

FIGS. 16a-f illustrate mechanical integrity testing of particles deposited on rose petals; (a-b) displaying particles deposited on rose petals, both activated and not activated, before and after the spin coating process; (c-d) Deposition of particles on spinning rose petal; (e-f) SEM micrograph of particles deposited shown in (d). Chemical sintering through CUPACT (FIG. 15a) or applying shear stress in the dry state (FIGS. 16a-b) does not perturb these patterns indicating that they are jammed in place. Depositing particles under shear stress (spin coating) or by drop casting gives analogous structures (FIGS. 16c-f) suggesting that this method of printing is amenable to static (drop casting) and dynamic (spin coating) process. To capture the importance of capillary forces (self-filtration and jamming), we fabricated similar autonomous size-sorting structures on Whatman chromatography paper #1®—a porous, tortuous, multi-scale textured material, using polydisperse particles synthesized at 6000 rpm that have a large (up to 10 μm) size distribution (FIGS. 10a-d). Template-stripped inverted pattern from a rose (FIG. 15b) as well as a cross-section image of the paper with deposited particles (FIG. 15c) confirms self-filtration, with inner layer (false colored blue) filling with predominantly smaller particles while the outer layer (false colored red) is dominated by larger particles. Interestingly, the particles do not traverse the thickness of the paper which we infer to be due to $F_b$ (Equation 11). This observation implies that not only can the slurry of these polydisperse particles self-filter, but the capillary forces of the carrier fluid can be exploited to dictate percolation into a porous network. This is of critical importance while depositing these metallic traces across surface with varying degrees of porosity and where only surface contact and complete particle networks are desired (e.g., interior of the brain, FIG. 15d).

Figure 17A:
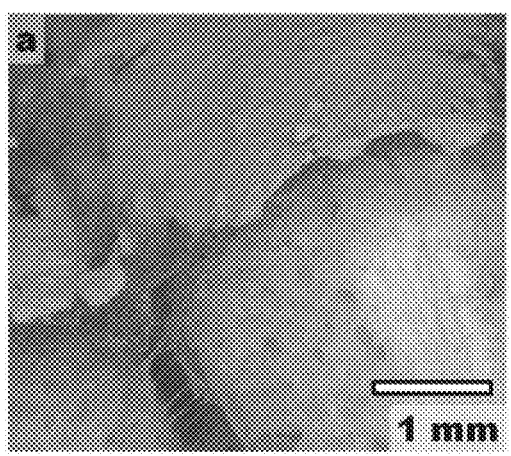
FIG. 17a-b illustrate universal metallic printing on a cow brain surface, in accordance with various embodiments.
Figure 17B:
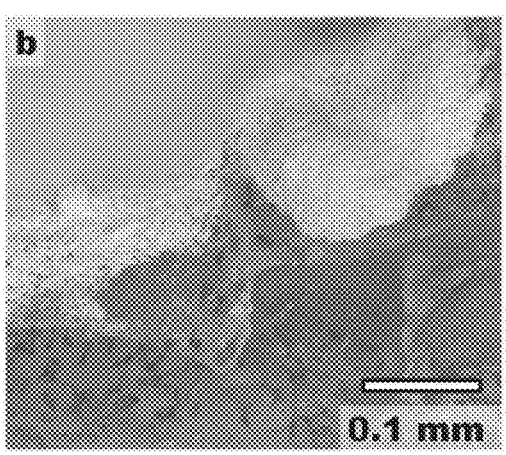
Figure 17C:
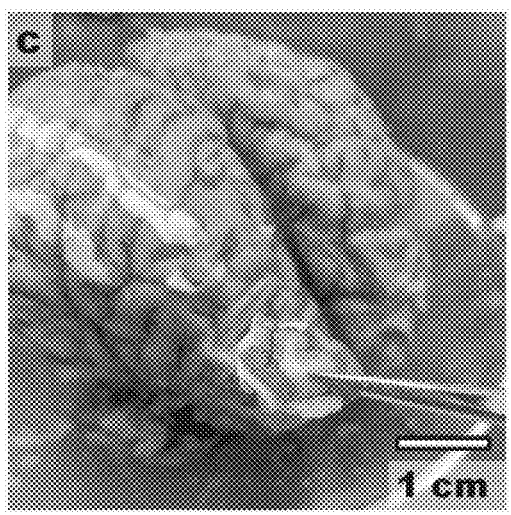
FIG. 17c illustrates universal metallic printing on a cow brain cerebellum surface, in accordance with various embodiments.
Figure 17D:
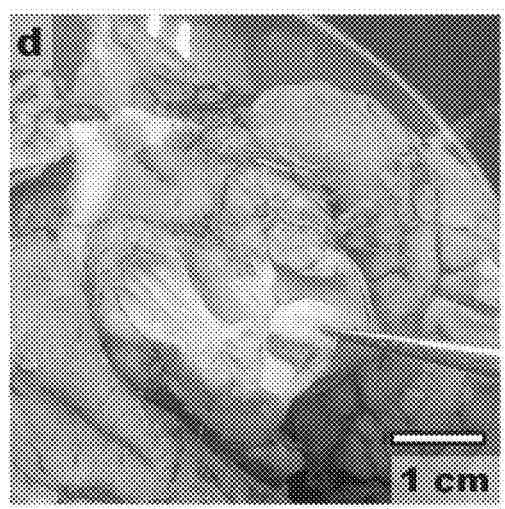
FIG. 17d illustrates universal metallic printing on a cow brain cerebellum on an internal surface, in accordance with various embodiments.
Figure 17E:
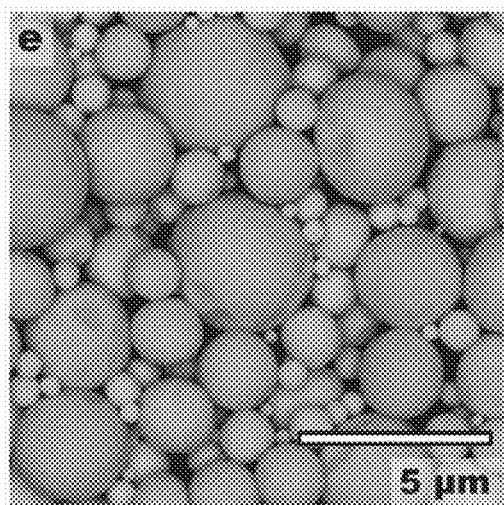
FIG. 17e-f illustrate SEM images of activated particles, showing necking interconnects through CUPACT, in accordance with various embodiments.
Figure 17F:
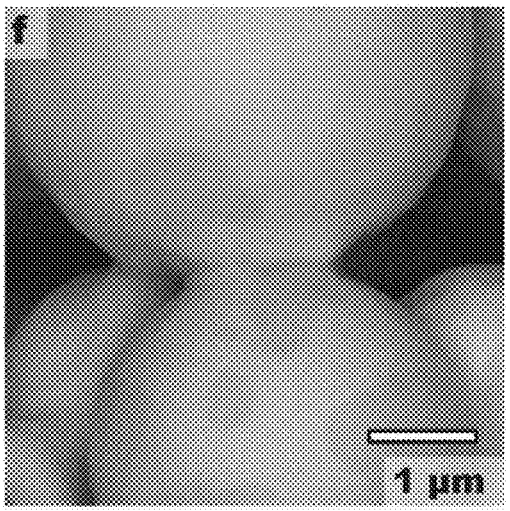

To ascertain the utility and versatility of this method, we explored printing conductive traces on soft membranes and tissue. Due to the abundance of these fusible alloy elements (e.g., Bi, In and Sn) in nature, the biocompatibility of said elements has been previously extensively researched. FIGS. 17a-f illustrate universal metallic printing on (a-b) Cow brain surface (c) brain Cerebrum surface and internal, (d) Cerebellum surface and internal, (e-f) SEM image of activated particles, showing necking interconnects through CUPACT. We fabricated traces on various cow tissues like brain (FIGS. 15d-e, 17a-b) and heart (FIG. 15f); followed by heat-free metal solidification and sintering via CUPACT to render the particles conductive (FIGS. 15g-j) without damaging the tissue. FIGS. 17a-b shows printing of electrically conductive lines on surface connective tissue without permeation into the brain. Due to the small particle interconnection bridges, films derived from CUPACT are more resistive than the bulk metal (63 mΩ-cm vs 52 mΩ-cm) depending on the activating chemical stimuli. These lines are, therefore, expected to be electrically conductive, albeit, with slightly increased resistive heating than the bulk metal.

Figure 15C:
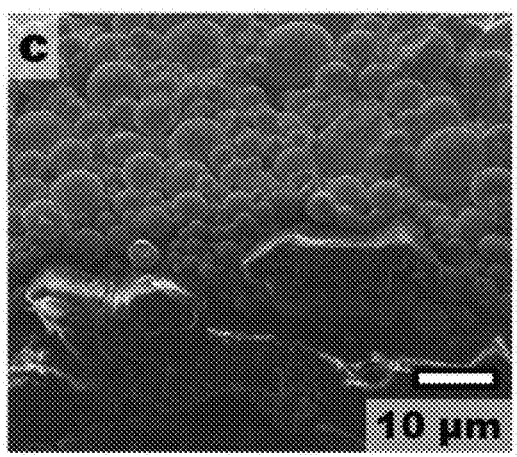
FIG. 15c illustrates SEM image of a cross-section of a line printed on paper with small particles false colored blue and larger particles red for clarity, in accordance with various embodiments.
Figure 15D:
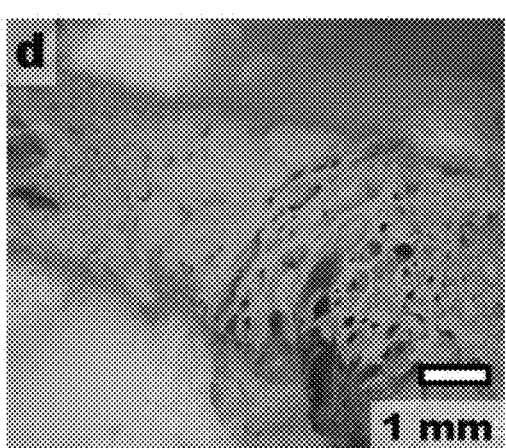
FIG. 15d illustrates a line printed on the surface of brain's interior across a fatty flat region and a porous interlayer, in accordance with various embodiments.
Figure 15E:
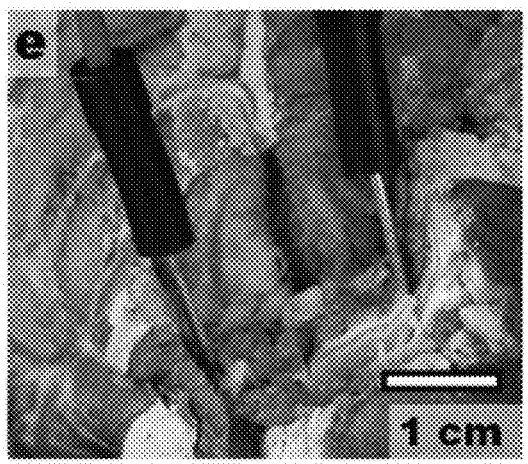
FIG. 15e illustrates metallic traces on the interior of the brain showing conductivity as soldered LED glows, in accordance with various embodiments.
Figure 18A:
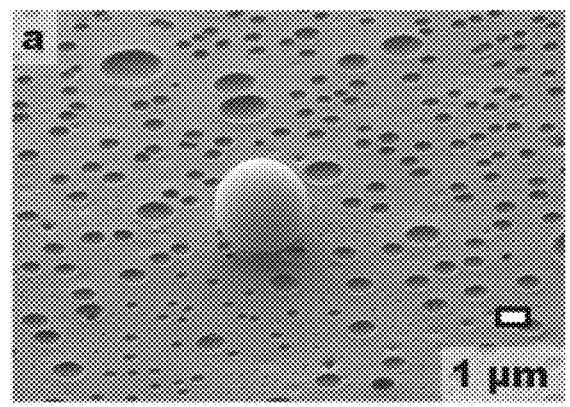
FIGS. 18a-b illustrate SEM images of a sample particle at various magnifications, in accordance with various embodiments.
Figure 18B:
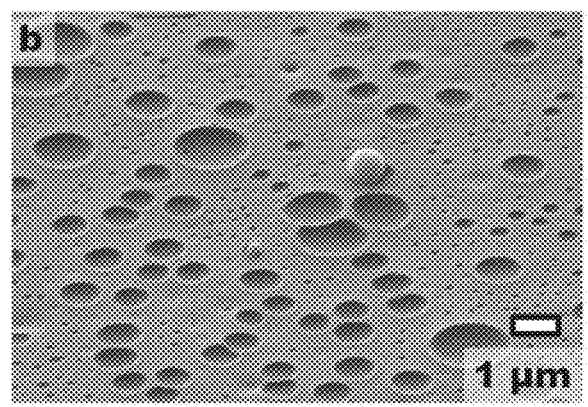
Figure 18C:
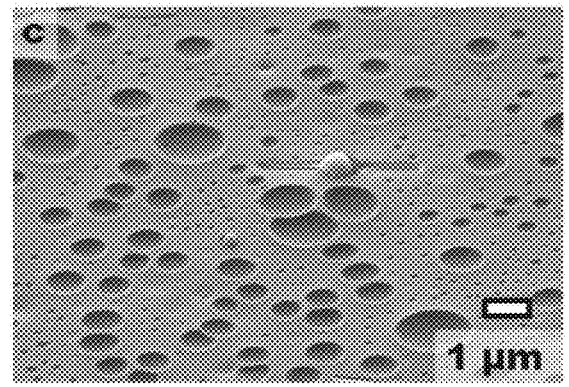
FIGS. 18c-d illustrate SEM images showing the slicing of the sample particle shown in FIGS. 18a-b via FIB to show the liquid characteristic, in accordance with various embodiments.
Figure 18D:
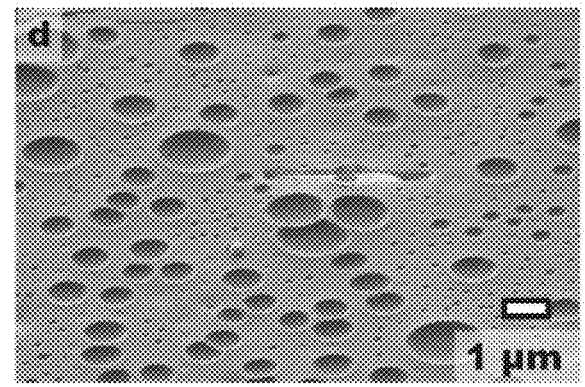

To illustrate this conjecture, we printed conductive traces inside the brain across different surface textures (FIGS. 15d-e and FIGS. 17c-d). Besides glial and neuronal cells, majority of the brain is lipophilic (almost 60% fat) hence not amicable to bonding with metals due to surface energy mismatch and/or mismatch in tolerance to heat. Differences in density (~1 g/cm³ vs 7 g/cm³), however, allows for precipitation-induced texturing as the metal particles settle on the surface of the low modulus tissue. FIGS. 18a-d illustrate SEM images of liquid metal induced texturing on a soft polymeric film. Distribution in indent size maps particle size polydispersity. A sample particle is capture for reference (FIGS. 18a-b). One particle was then FIB cut to show liquid characteristic (FIGS. 18c-d). For clarity, FIGS. 18a-d shows indents that can be created on a thin smooth polymer film via soft impingement with polydisperse liquid metal particles. Transition from a fat-rich region to a networked porous region enables capillary-limited deposition over the pores (FIG. 15d) akin to that observed above with paper (FIG. 15c). This precipitation-induced texturing also allows these conductive traces to indent and adhere to connective tissues (FIGS. 17a-b) implying that a conductive line can be deposited via screen printing across a varying set of surface roughness on a tissue. These examples demonstrate the potential of ULMCS-based conductive lines in brain stimulations.

Figure 15F:
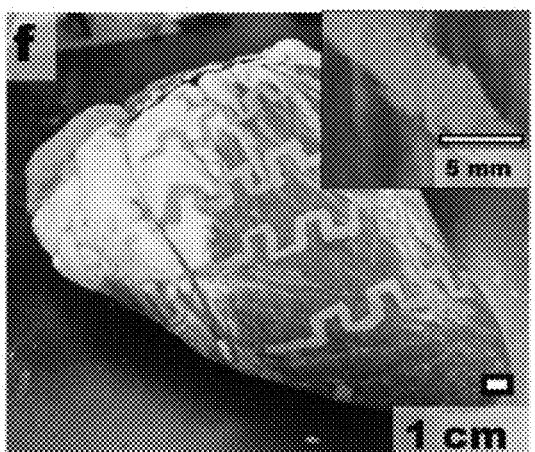
FIG. 15f illustrates metal printing on a cow heart, with the inset showing a close-up of the printed lines, in accordance with various embodiments.

Besides brain, electrical connectivity to the heart—though vital in cardiac intervention, is challenging in part due to the pericardium. The complexity in structure, modulus, and function, coupled with surface energy mismatch of the protective pericardium sac to metals renders fabrication of conductive networks on the heart surface challenging. Underlying pericardial fluid and flexibility of the surface of the heart, however, implies that deposition of the denser metallic particles would lead to induced texturing hence mechanical bonding. FIG. 15f shows conductive metallic traces fabricated on a heart where the lines form over fat and muscle tissue akin to the brain. Previous studies of films derived from CUPACT inspires us to infer that though these traces are formed on fixed tissue, similar functional structures can be made on living analogues.

Figure 15G:
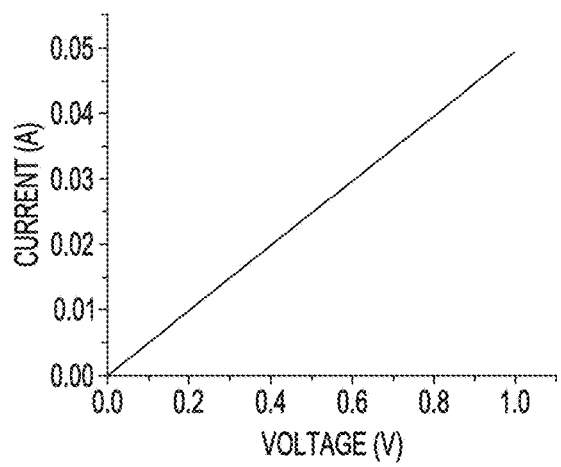
FIG. 15g illustrates a 200 cycles I-V curve a of conductive line printed on paper, in accordance with various embodiments.
Figure 15H:
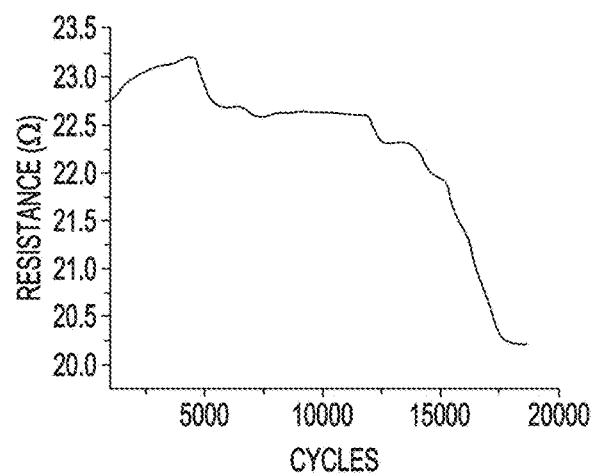
FIG. 15h illustrates resistance change over 20000 cycles of a conductive line printed on paper, in accordance with various embodiments.
Figure 15I:
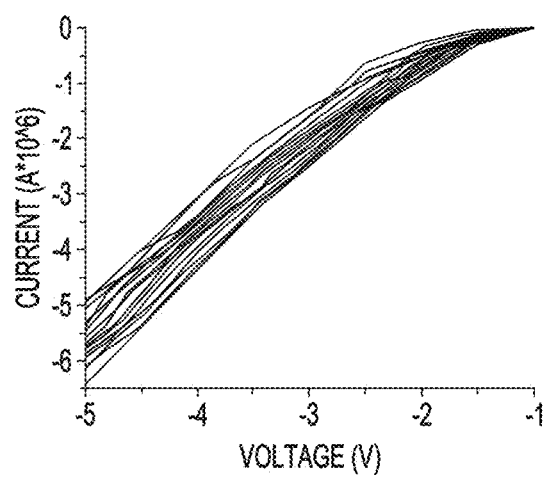
FIG. 15i illustrates a 200 cycles I-V curve on conductive line printed on brain, in accordance with various embodiments.
Figure 15J:
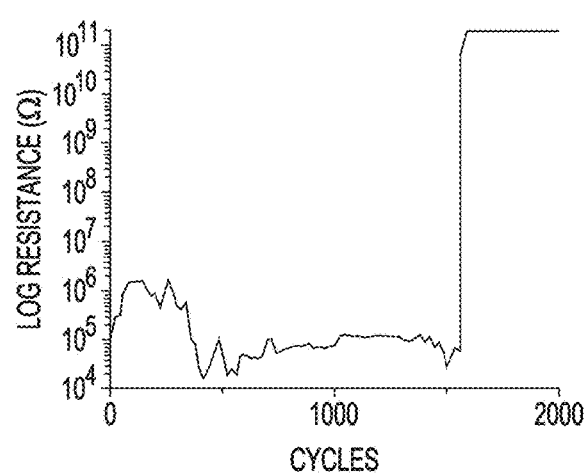
FIG. 15j illustrates resistance change overtime for repeated voltage cycle for conductive line printed on brain, in accordance with various embodiments.
Figure 19A:
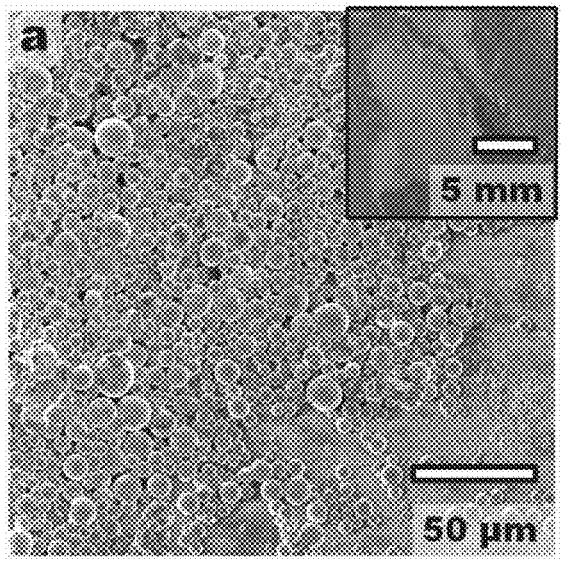
FIG. 19a illustrates an SEM image of a line printed on a brain, in accordance with various embodiments.
Figure 19B:
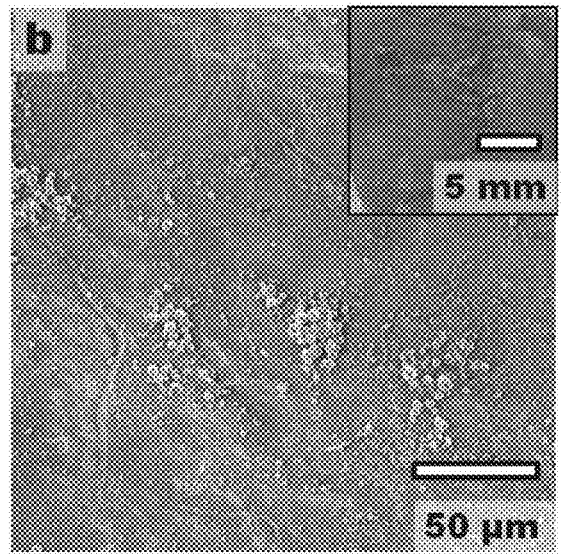
FIG. 19b illustrates a SEM image of the surface of the brain post-washing, in accordance with various embodiments.
Figure 19C:
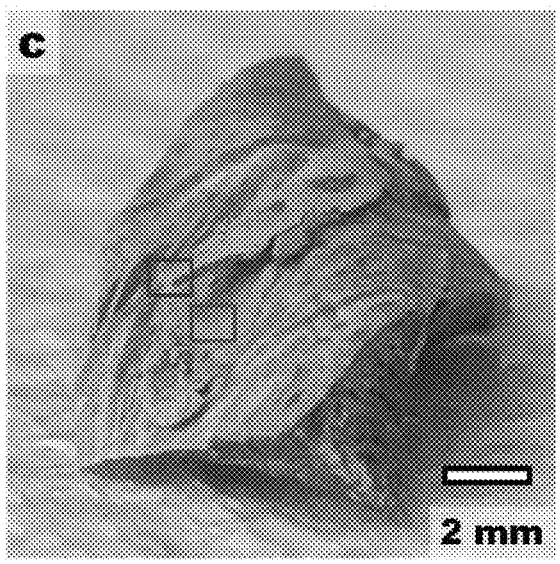
FIG. 19c illustrates SEM images at various magnifications showing a detached printed line on top of a shrinking heart tissue, in accordance with various embodiments.
Figure 19C:
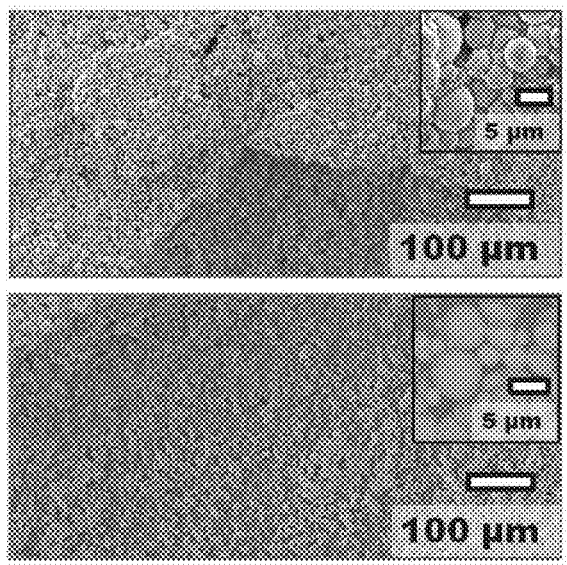

To ascertain that the metal particles are sintered, connected, and conductive, repeated voltage cycles were applied to the printed lines. For brevity, we evaluated printed lines on paper and brain and infer prior work on free standing CUPACT films. On a stable organic structure (paper), the printed lines are conductive and stable for >10,000 sweeps. Average resistivity, ρ=59 μΩ-m was observed under the current activation conditions (FIGS. 15g-h). On an uneven, malleable, heat-sensitive biological tissue, however, the line shows a decaying trend over the repeated cycles (FIG. 15i). Lines printed on brain are conductive for >1.000 cycles albeit with higher average ρ=110 mΩ-m. FIGS. 19a-c illustrate SEM images of (a) line printed on a brain, (b) surface of brain post-washing; (c) detached printed line on top of a shrinking heart tissue. We observed that this higher resistivity of traces on the brain lead to loss of contact (detachment) likely due to joule heating, this effect results on extreme deformation of the detached tissue (FIGS. 15j and 19c). This process, however, seems unlikely in a well hydrated tissue. The higher resistivity seen in the brain tissue compared to the paper is expected due to the non-uniformity and irregularity of the substrate and likely network contamination from occluded bio-adducts during the precipitation and CUPACT processes.

Finally, since the conductive traces on soft tissue are a mechanically physiorbed network (via jamming and small interparticle necks, FIGS. 17e-f) mechanical breakage of the connecting necks can be achieved without significant amount of work. Shear driven fracture of these necks in presence of a Newtonian fluid renders interparticle stress divergent. Fracture of the necks re-introduces flow and particle displacement under a small shear load (FIGS. 8c, 19a-b). This implies that the reported method is a heat-free mechanical-bonding driven reversible printing of metallic conductive traces on rather complex soft or textured substrates. A key advantage of this approach is the insensitivity to biological fluids since metals do not swell under aqueous media.

Conclusions. Herein, we illustrate the versatility of mechanical bonding on surface energy mismatched surfaces via a self-filtration, capillary assembly, jamming, and heat-free sintering across non-Hertzian contacts to print conductive metallic traces—without damaging sensitive tissue or underlying substrate surface asperities. The bedrock of this method is ability to predictively tune particle size polydispersity to match complexity of the substrate surface without compromising degree of undercooling. By adopting appropriate probabilistic predictive tools, appropriate processing conditions can be determined apriori to enable synthesis of desired particle sizes for maximal self-filtration and jamming. We exploit differences in density to induce texture on smooth soft surfaces, hence bonding. Besides deposition of mechanically robust metallic traces, tuning particle size polydispersity to match surface features can enable unprecedent templated patterning with delicate bio-surfaces like the rose flower or creation of stochastic surface texture on soft, thin films.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Embodiments

The following exemplary embodiments are provided, the numbering of which is not to be construed as designating levels of importance:

Embodiment 1 provides a particle-coated substrate comprising:
  a coating comprising undercooled liquid metallic particles, the particles comprising
    a solid shell comprising a metal oxide, and
    a liquid metallic core that is below the melting point of the liquid metallic core; and
  a substrate comprising an irregular surface;
  wherein the coating is on the irregular surface of the substrate.

Embodiment 2 provides the coated substrate of Embodiment 1, wherein the liquid metallic core comprises an alloy comprising Bi, In, Sn, Ag, Au, or a combination thereof.

Embodiment 3 provides the coated substrate of any one of Embodiments 1-2, wherein the liquid metallic core comprises Field's metal (51% In, 32.5% Bi and 16.5% Sn w/w).

Embodiment 4 provides the coated substrate of any one of Embodiments 1-3, wherein the particles are adhered to the surface via inter-particle friction and friction between the particles and the surface.

Embodiment 5 provides the coated substrate of any one of Embodiments 1-4, wherein the coating is an inverse replica of the irregular surface of the substrate.

Embodiment 6 provides the coated substrate of any one of Embodiments 1-5, wherein the particles are partially filled into one or more crevices in the irregular surface of the substrate, allowing the coating of particles to selectively capture a size-limited dimension of the irregular surface.

Embodiment 7 provides the particle-coated substrate of any one of Embodiments 1-6, wherein the particles have a diameter of 1 nm to 10 microns.

Embodiment 8 provides the particle-coated substrate of any one of Embodiments 1-7, wherein the particles have a diameter of 1 micron to 5 microns.

Embodiment 9 provides the particle-coated substrate of any one of Embodiments 1-8, wherein the substrate is an organic substrate.

Embodiment 10 provides the particle-coated substrate of any one of Embodiments 1-9, wherein the substrate is an inorganic substrate.

Embodiment 11 provides the particle-coated substrate of any one of Embodiments 1-10, wherein the substrate comprises a bone, a vitrified surface, a mineralized surface, or a combination thereof.

Embodiment 12 provides the particle-coated substrate of any one of Embodiments 1-11, wherein the organic substrate comprises a biological substrate.

Embodiment 13 provides the particle-coated substrate of any one of Embodiments 1-12, wherein the substrate is an organic substrate from a human, animal, mammal, fish, insect, or combination thereof.

Embodiment 14 provides the particle-coated substrate of any one of Embodiments 1-13, wherein the substrate is an organic substrate comprising a tissue, an organ, a skin, a bone, an insect, a reptile skin, a plant, a flower, a tree, a marine animal skin, or a combination thereof.

Embodiment 15 provides the particle-coated substrate of any one of Embodiments 1-14, wherein the irregular surface comprises a crevice.

Embodiment 16 provides a metallic-coated substrate comprising:
  a coating comprising a solidified metal and/or metal alloy and solid metal oxide shells; and
  a substrate comprising an irregular surface;
  wherein the coating is on the irregular surface of the substrate.

Embodiment 17 provides the metallic-coated substrate of Embodiment 16 formed by rupturing the solid shells of the undercooled liquid metallic particles of the particle-coated substrate of any one of Embodiments 1-15.

Embodiment 18 provides the metallic-coated substrate of any one of Embodiments 16-17, wherein the coating is electrically conductive, thermally conductive, or a combination thereof.

Embodiment 19 provides the metallic-coated substrate of any one of Embodiments 16-18, wherein the coating is an inverse replica of the irregular surface of the substrate.

Embodiment 20 provides the metallic-coated substrate of any one of Embodiments 16-19, wherein the substrate is a soft substrate, wherein the coating induces a texture on the substrate.

Embodiment 21 provides a metallic inverse surface replica comprising:
  a metallic film comprising solidified metal and/or metal alloy and solid metal oxide shells;
  wherein the metallic film is an inverse replica of an irregular surface of a substrate.

Embodiment 22 provides the metallic inverse surface replica of Embodiment 21, wherein the metallic film is a partial replica of the irregular surface.

Embodiment 23 provides the metallic inverse surface replica of any one of Embodiments 21-22, wherein the metallic film is a complete replica of the irregular surface.

Embodiment 24 provides the metallic inverse surface replica of any one of Embodiments 21-23, wherein the metallic film has a thickness of 10 nm to 100 microns.

Embodiment 25 provides the metallic inverse surface replica of any one of Embodiments 21-24, wherein the metallic film is made from the metallic-coated substrate of any one of Embodiments 16-20 by removing the coating comprising the solidified metal and/or metal alloy and solid metal oxide shells from the irregular surface of the substrate.

Embodiment 26 provides a surface replica comprising:
a solid material that comprises a surface comprising a non-inverted replica of an irregular surface of a substrate.

Embodiment 27 provides the surface replica of Embodiment 26, wherein the solid material comprises a metal, a metal alloy, a polymer, or a combination thereof.

Embodiment 28 provides the surface replica of any one of Embodiments 26-27, wherein the solid material comprises a crosslinked PDMS.

Embodiment 29 provides the surface replica of any one of Embodiments 26-28, wherein the surface replica is made from the metallic inverse surface replica of any one of Embodiments 21-25 by applying the solid material or a precursor thereof to the metallic film, optionally allowing the precursor to react or set to form the solid material, and removing the metallic film from the solid material.

Embodiment 30 provides a method of forming the surface replica of any one of Embodiments 26-29, the method comprising:
applying the solid material or a precursor thereof to the metallic inverse surface replica of any one of Embodiments 21-25;
optionally allowing the precursor to react or set to form the solid material; and
removing the metallic film from the solid material to form the surface replica of any one of Embodiments 26-29.

Embodiment 31 provides a method of forming the metallic inverse surface replica of any one of Embodiments 21-25, the method comprising:
removing the coating comprising the solidified metal and/or metal alloy from the metallic-coated substrate of any one of Embodiments 16-20 to form the metallic inverse surface replica of any one of Embodiments 21-25.

Embodiment 32 provides a method of forming the metallic-coated substrate of any one of Embodiments 16-20, the method comprising:
rupturing the solid shells of the undercooled liquid metallic particles of the particle-coated substrate of any one of Embodiments 1-15 to form the metallic-coated substrate of any one of Embodiments 16-20.

Embodiment 33 provides the method of Embodiment 32, wherein the rupturing comprises a chemical trigger, light impingement, ultrasound impingement, vibrational forces, heat application, or a combination thereof.

Embodiment 34 provides a method of forming the particle-coated substrate of any one of Embodiments 1-15, the method comprising:
applying a solution comprising the undercooled liquid metallic particles to the irregular surface of the substrate to form the particle-coated substrate of any one of Embodiments 1-15.

Embodiment 35 provides the method of Embodiment 34, wherein the applying comprises brushing, spin-coating, spray deposition, or a combination thereof.

Embodiment 36 provides the method of any one of Embodiments 34-35, further comprising drying the applied solution on the irregular surface, to form the particle-coated substrate of any one of Embodiments 1-15.

Embodiment 37 provides the method of any one of Embodiments 34-36, wherein the solution comprises a polydispersity of large-to-small sizes of the undercooled liquid metallic particles of 1:1 to 1:10.

Embodiment 38 provides the method of any one of Embodiments 34-37, wherein the solution comprises a polydispersity of large-to-small sizes of the undercooled liquid metallic particles of 1:3 to 1:7.

Embodiment 39 provides the method of any one of Embodiments 34-38, wherein the solution comprises one or more organic solvents and/or organic liquids.

Embodiment 40 provides the method of any one of Embodiments 34-39, wherein the solution comprises an alcohol, acetic acid, methanol, ethanol, cellulose, a cellulose derivative, hydroxyethyl cellulose, ethylene glycol, water, or a combination thereof.

Embodiment 41 provides the method of any one of Embodiments 34-40, wherein the solution and the irregular surface are free of adhesives.

Embodiment 42 provides the method of any one of Embodiments 34-41, further comprising rupturing the solid shells of the undercooled liquid metallic particles of the particle-coated substrate to form the metallic-coated substrate of any one of Embodiments 16-20.

Embodiment 43 provides the method of Embodiment 42, wherein the method is a method of printing the coating on the irregular surface of the substrate.

Embodiment 44 provides the method of any one of Embodiments 42-43, further comprising removing the coating comprising the solidified metal and/or metal alloy and solid metal oxide shells from the irregular surface of the substrate to form the metallic inverse surface replica of any one of Embodiments 21-25.

Embodiment 45 provides the method of Embodiment 44, further comprising applying a solid material or a precursor thereof to the metallic film, optionally allowing the precursor to react or set to form the solid material, and removing the metallic film from the solid material to form the surface replica of any one of Embodiments 26-29.

Embodiment 46 provides the method of any one of Embodiments 30-45, wherein the method is a method of soft-lithography.

Embodiment 47 provides the metallic-coated substrate of any one of Embodiments 16-20, the metallic inverse surface replica of any one of Embodiments 21-25, or the surface replica of any one of Embodiments 26-29, comprising a surface that is hydrophobic.

Embodiment 48 provides the metallic-coated substrate of any one of Embodiments 16-20, the metallic inverse surface replica of any one of Embodiments 21-25, or the surface replica of any one of Embodiments 26-29, comprising a surface that is oleophobic.

Embodiment 49 provides the metallic-coated substrate of any one of Embodiments 16-20, the metallic inverse surface replica of any one of Embodiments 21-25, or the surface replica of any one of Embodiments 26-29, comprising a surface that mitigates icing/frosting.

Embodiment 50 provides the metallic-coated substrate of any one of Embodiments 16-20, the metallic inverse surface replica of any one of Embodiments 21-25, or the surface replica of any one of Embodiments 26-29, comprising a property of asymmetric deformation under strain.

Embodiment 51 provides the metallic-coated substrate of any one of Embodiments 16-20, the metallic inverse surface replica of any one of Embodiments 21-25, or the surface replica of any one of Embodiments 26-29, comprising angle-dependent optical properties.

Embodiment 52 provides the metallic-coated substrate of any one of Embodiments 16-20, the metallic inverse surface replica of any one of Embodiments 21-25, or the surface replica of any one of Embodiments 26-29, comprising tunable density and/or porosity.

Embodiment 53 provides the metallic-coated substrate of any one of Embodiments 16-20, the metallic inverse surface replica of any one of Embodiments 21-25, or the surface replica of any one of Embodiments 26-29, comprising a metallic foam.

Embodiment 54 provides the metallic-coated substrate of any one of Embodiments 16-20, the metallic inverse surface replica of any one of Embodiments 21-25, or the surface replica of any one of Embodiments 26-29, comprising a particle size-differentiated composition along at least one dimension.

What is claimed is:

1. A method of forming a metallic inverse surface replica, the method comprising:
    applying a solution, the solution comprising suspended undercooled liquid metallic particles and one or more organic solvents and/or organic liquids, to an irregular surface of a substrate comprising an organic substrate, a biological substrate, a bone, or a combination thereof, the particles comprising
        a solid shell comprising a metal oxide, and
        a liquid metallic core that is below the melting point of the liquid metallic core, and
    drying the applied solution on the irregular surface, to form a particle-coated substrate;
    rupturing the solid shells of the particles of the particle-coated substrate, wherein the rupturing forms a metallic-coated substrate, the metallic-coated substrate comprising a metallic coating on the irregular surface of the substrate, the metallic coating comprising a solidified metal and/or metal alloy and solid metal oxide shells; and
    removing the metallic coating comprising the solidified metal and/or metal alloy from the metallic-coated substrate to form the metallic inverse surface replica.

2. The method of claim 1, wherein the rupturing comprises a chemical trigger, light impingement, ultrasound impingement, vibrational forces, heat application, or a combination thereof.

3. The method of claim 1, wherein the metallic coating is electrically conductive, thermally conductive, or a combination thereof.

4. The method of claim 1, wherein the particle coating induces a texture on the substrate.

5. The method of claim 1, wherein the liquid metallic core comprises an alloy comprising Bi, In, Sn, Ag, Au, or a combination thereof.

6. The method of claim 1, wherein the liquid metallic core comprises Field's metal (51% In, 32.5% Bi and 16.5% Sn w/w).

7. The method of claim 1, wherein the particles are partially filled into one or more crevices in the irregular surface of the substrate, allowing the coating of particles to selectively capture a size-limited dimension of the irregular surface.

8. The method of claim 1, wherein the particles have a diameter of 1 nm to 10 microns.

9. The method of claim 1, wherein the substrate is an organic substrate or a biological substrate.

10. The method of claim 1, wherein the substrate comprises a bone, a vitrified surface, a mineralized surface, or a combination thereof.

11. The method of claim 1, wherein
    the substrate is an organic substrate from a human, animal, mammal, fish, or insect; or
    the substrate is an organic substrate comprising a tissue, an organ, a skin, a bone, an insect, a reptile skin, a plant, a flower, a tree, a marine animal skin, or a combination thereof, or
    a combination thereof.

12. The method of claim 1, wherein the metallic inverse surface replica has a thickness of 10 nm to 100 microns.

13. The method of claim 1, wherein the method is a method of forming a surface replica, the method further comprising:
    applying a solid material or a precursor thereof to the metallic inverse surface replica;
    optionally allowing the precursor to react or set to form the solid material; and
    removing the metallic film from the solid material to form the surface replica, wherein the surface replica comprises the solid material that comprises a surface comprising a non-inverted replica of the irregular surface of the substrate.

14. The method of claim 13, wherein the solid material comprises a metal, a metal alloy, a polymer, or a combination thereof.

15. The method of claim 13, wherein the solid material comprises a crosslinked PDMS.

16. The method of claim 1, wherein the solution comprises a polydispersity ($\delta$) of the undercooled liquid metallic particles of greater than 0.

17. The method of claim 1, wherein the solution and the irregular surface are free of adhesives.

18. The method of claim 1, wherein the applying comprises brushing, spin-coating, spray deposition, or a combination thereof.

* * * * *

UNITED STATES PATENT AND TRADEMARK OFFICE
CERTIFICATE OF CORRECTION

PATENT NO. : 11,752,666 B2
APPLICATION NO. : 17/463248
DATED : September 12, 2023
INVENTOR(S) : Thuo et al.

It is certified that error appears in the above-identified patent and that said Letters Patent is hereby corrected as shown below:

In the Specification

In Column 1, Lines 40-41, delete "energies" and insert --energies;-- therefor

In Column 9, Line 31, delete "Y.'"" and insert --Y,"-- therefor

In Column 14, Line 25, delete "patterning." and insert --patterning,-- therefor

In Column 14, Line 53, delete "relation." and insert --relation,-- therefor

In Column 15, Line 31, delete "red." and insert --red,-- therefor

In Column 15, Line 66, delete "$\tau_s$(spraying)." and insert --$\tau_s$ (spraying).-- therefor In Column 17, Line 11, delete "template:" and insert --template;-- therefor In Column 17, Line 14, delete "cultivar." and insert --cultivar,-- therefor In Column 18, Line 45, delete "replica." and insert --replica,-- therefor In Column 18, Line 48, delete "(FIG. 60." and insert --(FIG. 6*f*).-- therefor In Column 19, Line 8, delete "anatomy." and insert --anatomy,-- therefor In Column 19, Line 38, delete "$\gamma$" and insert --$\dot{\gamma}$-- therefor In Column 19, Line 38, delete "$\dot{\gamma}=K(x)(\mu g H_1/\eta_s)$," and insert --$\dot{\gamma}=K(x)(\rho g H_1/\eta_s)$,-- therefor In Column 19, Line 48, delete "Kulkarni." and insert --Kulkarni,-- therefor Signed and Sealed this
Tenth Day of December, 2024

Katherine Kelly Vidal
*Director of the United States Patent and Trademark Office*

CERTIFICATE OF CORRECTION (continued)
U.S. Pat. No. 11,752,666 B2

In Column 19, Line 48, delete "Metzger." and insert --Metzger,-- therefor

In Column 19, Line 57, delete "where." and insert --where,-- therefor

In Column 21, Line 21, delete "10.000" and insert --10,000-- therefor

In Column 24, Lines 10-14, delete " $\phi_{out} = \dfrac{\phi_{in}}{1 + A\dfrac{\pi_2}{\rho g H_1}(1 - \phi_{in})}$ " and insert -- $\phi_{out} = \dfrac{\phi_{in}}{1 + A\dfrac{\pi_2}{\rho g H_1}(1 - \phi_{in})}$ -- therefor In Column 24, Line 16, delete "solution." and insert --solution,-- therefor In Column 24, Line 16, delete "fraction." and insert --fraction,-- therefor In Column 25, Line 9, delete "forces." and insert --forces,-- therefor In Column 25, Line 36, delete "(FIG. 9c)," and insert --(FIG. 9c).-- therefor In Column 28, Line 37, delete ">1.000" and insert -->1,000-- therefor In the Claims In Column 34, Line 21, in Claim 11, delete "thereof," and insert --thereof;-- therefor